(12) United States Patent
Bradley et al.

(10) Patent No.: US 11,115,818 B2
(45) Date of Patent: Sep. 7, 2021

(54) TECHNIQUES FOR ENABLING COMPUTING DEVICES TO IDENTIFY WHEN THEY ARE IN PROXIMITY TO ONE ANOTHER

(71) Applicant: Apple Inc., Cupertino, CA (US)

(72) Inventors: Bob Bradley, San Jose, CA (US); Marc J. Krochmal, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 105 days.

(21) Appl. No.: 16/428,683

(22) Filed: May 31, 2019

(65) Prior Publication Data

US 2019/0373469 A1    Dec. 5, 2019

Related U.S. Application Data

(60) Provisional application No. 62/679,719, filed on Jun. 1, 2018.

(51) Int. Cl.
*H04W 12/06* (2021.01)
*H04L 29/06* (2006.01)
(Continued)

(52) U.S. Cl.
CPC ......... *H04W 12/068* (2021.01); *H04L 9/3242* (2013.01); *H04L 63/061* (2013.01);
(Continued)

(58) Field of Classification Search
CPC ......... H04W 12/0608; H04W 12/0602; H04W 8/005; H04W 92/18; H04W 12/04033;
(Continued)

(56) References Cited

U.S. PATENT DOCUMENTS 7,958,368 B2   6/2011  Dewey et al.
8,271,662 B1   9/2012  Gossweiler, III et al.
(Continued)

OTHER PUBLICATIONS

PCT Patent Application No. PCT/US2018/032426—International Search Report and Written Opinion dated Sep. 27, 2018.
(Continued)

*Primary Examiner* — Nimesh Patel
(74) *Attorney, Agent, or Firm* — Dickinson Wright RLLP

(57) ABSTRACT

The embodiments set forth a technique for securely identifying relevant computing devices that are nearby. The technique can be implemented at a first computing device, and include the steps of (1) receiving, from a second computing device, an advertisement packet that includes: (i) a network address that is associated with the second computing device, and (ii) a hash value that is calculated using the network address and an encryption key that is associated with the second computing device, and (2) for each known encryption key in a plurality of known encryption keys that are accessible to the first computing device: (i) calculating a temporary hash value using the network address and the known encryption key, and (ii) in response to identifying that the temporary hash value and the hash value match: carrying out an operation associated with the second computing device.

22 Claims, 29 Drawing Sheets

(51) Int. Cl.
  *H04L 9/32* (2006.01)
  *H04W 8/00* (2009.01)
  *H04W 12/062* (2021.01)
  *H04W 92/18* (2009.01)

(52) U.S. Cl.
  CPC ......... *H04W 8/005* (2013.01); *H04W 12/062* (2021.01); *H04W 92/18* (2013.01)

(58) Field of Classification Search
  CPC ..... H04W 12/0609; H04W 4/50; H04W 4/80; H04W 4/21; H04W 4/70; H04W 12/003; H04W 4/029; H04W 88/06; H04W 88/02; H04W 76/14; H04W 84/12; H04W 12/08; H04W 84/18; H04W 12/00503; H04W 12/02; H04W 4/02; H04W 4/023; H04W 48/18; H04W 4/00; H04W 4/06; H04W 12/06; H04W 12/04; H04W 64/00; H04W 12/12; H04W 12/00505; H04W 12/0401; H04W 12/00522; H04W 88/08; H04W 12/0052; H04W 12/04031; H04W 12/0027; H04W 88/04; H04W 12/1202; H04W 64/003; H04W 28/16; H04W 48/16; H04W 36/0011; H04W 88/16; H04W 12/00403; H04W 12/00502; H04W 12/04071; H04W 48/08; H04W 4/021; H04W 12/001; H04L 63/061; H04L 9/3242; H04L 67/18; H04L 67/141; H04L 9/3226; H04L 2209/42; H04L 2209/46; H04L 67/16; Y10S 707/99939; Y10S 977/839; Y10S 707/99934; Y10S 707/99936; Y10S 707/99945; Y10S 707/99938; Y10S 707/99943; Y10S 707/99931; Y10S 707/99933; Y02D 30/70; H04M 1/7253; H04M 2250/52; H04M 11/00; H04M 1/21; H04M 1/2755; G06N 20/00; G06N 3/006; G06N 3/02; G06N 3/0454; G06N 3/08; G06N 5/02; G06N 5/022; G06N 20/20; G06N 5/003; G06N 5/025
  See application file for complete search history.

(56) References Cited

U.S. PATENT DOCUMENTS

| | | | |
|---|---|---|---|
| 8,572,387 B2 | 10/2013 | Narayanan et al. | |
| 8,727,216 B2 | 5/2014 | Graves et al. | |
| 8,750,797 B2 | 6/2014 | Ketari | |
| 9,247,377 B2 | 1/2016 | Pai et al. | |
| 9,294,562 B2 | 3/2016 | Gong | |
| 9,801,158 B1 | 10/2017 | Yuan et al. | |
| 10,032,358 B2 | 7/2018 | Raniere | |
| 10,231,128 B1 | 3/2019 | Ziraknejad et al. | |
| 10,313,264 B2 | 6/2019 | Whalley et al. | |
| 10,680,811 B1 | 6/2020 | Stanton | |
| 2010/0104099 A1 | 4/2010 | Kim | |
| 2013/0053109 A1 | 2/2013 | Spencer et al. | |
| 2013/0058274 A1* | 3/2013 | Scherzer | H04W 12/08 370/328 |
| 2014/0007209 A1 | 1/2014 | Zucker | |
| 2014/0189808 A1* | 7/2014 | Mahaffey | H04L 63/0853 726/4 |
| 2014/0233545 A1 | 8/2014 | Ferguson-Jarnes et al. | |
| 2014/0323155 A1 | 10/2014 | Hewitt et al. | |
| 2015/0124791 A1 | 5/2015 | Mazandarany et al. | |
| 2015/0278510 A1 | 10/2015 | Alexander | |
| 2015/0351004 A1 | 12/2015 | Ko et al. | |
| 2016/0037317 A1 | 2/2016 | Hutchison et al. | |
| 2016/0057608 A1 | 2/2016 | Hu | |
| 2016/0095017 A1 | 3/2016 | Ely et al. | |
| 2016/0099973 A1 | 4/2016 | Tipton et al. | |
| 2016/0205087 A1* | 7/2016 | An | H04W 12/08 726/7 |
| 2016/0337853 A1* | 11/2016 | Abdulrahiman | H04W 12/06 |
| 2017/0034191 A1 | 2/2017 | Lee et al. | |
| 2017/0034703 A1* | 2/2017 | Dimatteo, III | H04L 63/101 |
| 2017/0054711 A1 | 2/2017 | Shen et al. | |
| 2017/0180912 A1 | 6/2017 | Shiro et al. | |
| 2017/0272528 A1 | 9/2017 | Omelas et al. | |
| 2017/0337791 A1 | 11/2017 | Gordon-Carroll | |
| 2017/0353829 A1 | 12/2017 | Kumar et al. | |
| 2018/0204186 A1 | 7/2018 | Kwak | |
| 2018/0337785 A1* | 11/2018 | Sanciangco | H04L 63/10 |
| 2019/0373469 A1* | 12/2019 | Bradley | H04W 12/04033 |

OTHER PUBLICATIONS

PCT Patent Application No. PCT/US2018/035035—International Search Report and Written Opinion dated Sep. 27, 2019.
European Patent Application No. 18802047.3—Extended European Search Report dated Oct. 16, 2020.
U.S. Appl. No. 15/721,133, Non-Final Office Action dated Jun. 14, 2021, 35 pages.

\* cited by examiner

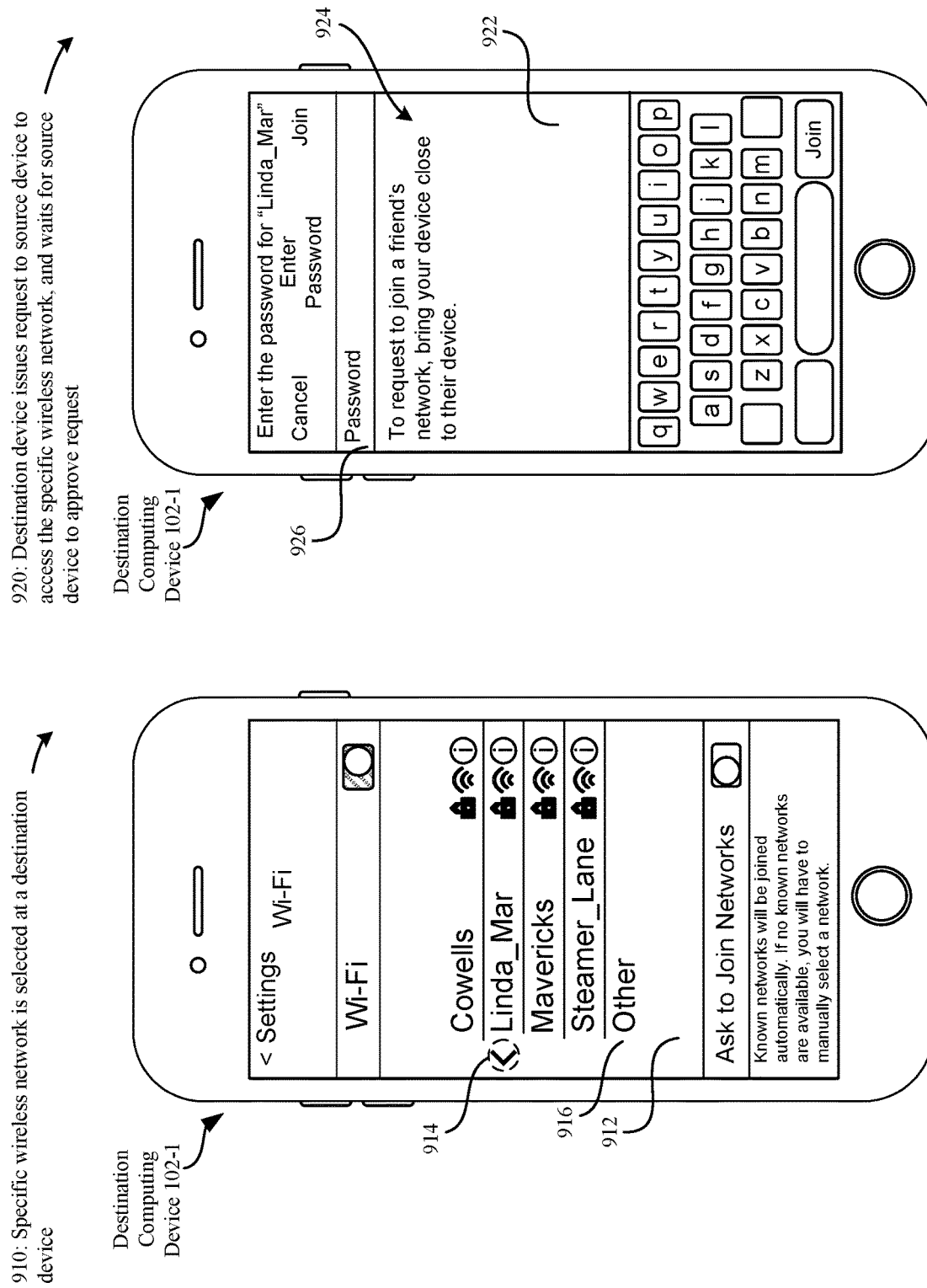

TECHNIQUES FOR ENABLING COMPUTING DEVICES TO IDENTIFY WHEN THEY ARE IN PROXIMITY TO ONE ANOTHER

CROSS-REFERENCE TO RELATED APPLICATIONS

The present application claims the benefit of U.S. Provisional Application No. 62/679,719, entitled "TECHNIQUES FOR ENABLING COMPUTING DEVICES TO IDENTIFY WHEN THEY ARE IN PROXIMITY TO ONE ANOTHER WHILE PRESERVING PRIVACY," filed Jun. 1, 2018, the content of which is incorporated herein by reference in its entirety for all purposes.

FIELD

The described embodiments relate generally to sharing information between nearby computing devices.

BACKGROUND

Conventional approaches for sharing data between computing devices are prone to security issues. For example, a widespread approach for sharing a given password involves including the password within a communication to another person, e.g., an e-mail, a text message, or speaking the password directly to another person. This widespread approach is unfortunate, especially when considering that an unauthorized person in possession of the password can easily gain access to potentially sensitive data that is accessible using the password. However, it is also undesirable to substantially increase the difficulty of sharing passwords in attempt to thwart malicious users, e.g., implementing lengthy passwords that are difficult to enter, implementing frequently-changing passwords, and so on.

Accordingly, there exists a need for a more efficient and secure technique for sharing data between computing devices.

SUMMARY

To cure the foregoing deficiencies, the representative embodiments set forth herein disclose various techniques for enabling a computing device to share information with a nearby computing device that is known to the computing device.

According to some embodiments, a computing device can be configured to implement a method for enabling a nearby computing device to access a wireless network by carrying out the techniques described herein. In particular, the method can include the steps of (1) receiving a request from the nearby computing device to access the wireless network, where the request includes user information associated with the nearby computing device, (2) presenting a notification associated with the request in response to determining, based on the user information, that the nearby computing device is recognized by the computing device, and (3) in response to receiving an approval for the nearby computing device to access the wireless network: providing, to the nearby computing device, a password for accessing the wireless network.

According to some embodiments, a computing device can be configured to implement another method for enabling a nearby computing device to access a wireless network by carrying out the techniques described herein. In particular, the method can include the steps of (1) receiving an encrypted request from the nearby computing device, where the encrypted request includes an indication that the nearby computing device is seeking to access the wireless network, (2) identifying a key for decrypting the encrypted request, (3) decrypting the encrypted request using the key to extract the indication, (4) displaying a notification in accordance with the indication, and (5) in response to receiving an approval for the nearby computing device to access the wireless network: providing, to the nearby computing device, a password for accessing the wireless network.

According to some embodiments, a computing device can be configured to implement another method for enabling a nearby computing device to access data items by carrying out the techniques described herein. In particular, the method can include the steps of (1) receiving an encrypted request from the nearby computing device, wherein the encrypted request includes an indication that the nearby computing device is seeking to access one or more data items that are accessible to the computing device, (2) identifying a key for decrypting the encrypted request, (3) decrypting the encrypted request using the key to extract the indication, (4) displaying a notification in accordance with the indication, and (5) in response to receiving an approval for the nearby computing device to access the one or more data items: providing, to the nearby computing device, the one or more data items.

Additionally, the embodiments set forth a method for securely identifying relevant computing devices that are nearby. According to some embodiments, the method can be implemented at a first computing device, and include the steps of (1) receiving, from a second computing device, an advertisement packet that includes: (i) a network address that is associated with the second computing device, and (ii) a hash value that is calculated using the network address and an encryption key that is associated with the second computing device, and (2) for each known encryption key in a plurality of known encryption keys that are accessible to the first computing device: (i) calculating a temporary hash value using the network address and the known encryption key, and (ii) in response to identifying that the temporary hash value and the hash value match: carrying out an operation associated with the second computing device.

Additionally, the embodiments set forth a method for enabling computing devices to exchange encryption keys with one another by way of a server computing device. According to some embodiments, the method can be implemented at a server computing device, and include the steps of (1) receiving, from a first computing device, a data item that includes: (i) a computing device identifier (ID) that is unique to the first computing device, (ii) a person identifier (ID) that is unique to an individual associated with the first computing device, and (iii) an encryption key that is associated with the first computing device, (2) identifying, based one or more of the computing device ID or the person ID, at least one computing device that is relevant to the first computing device, and (3) providing the data item to the at least one computing device, wherein the at least one computing device stores the encryption key as a known encryption key that is linked to the computing device ID and the person ID.

Additionally, the embodiments set forth another method for enabling computing devices to directly exchange encryption keys with one another. According to some embodiments, the method can be implemented at a first computing device, and include the steps of (1) identifying a condition to enable a second computing device to be aware of when the first computing device is nearby the second computing device, (2) providing, to the second computing device, a data item that includes: (i) a computing device identifier (ID) that is unique to the first computing device, (ii) a person identifier (ID) that is unique to an individual associated with the first computing device, and (iii) an encryption key that is associated with the first computing device, and (3) periodically generating advertisement packets that include: (i) a network address that is associated with the first computing device, and (ii) a hash value that is calculated using the network address and the encryption key that is associated with the first computing device.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

FIGS. 9A-9D illustrate conceptual diagrams of example user interfaces that can be configured to service a request to access a specific wireless network, according to some embodiments.

DETAILED DESCRIPTION

Figure 1:
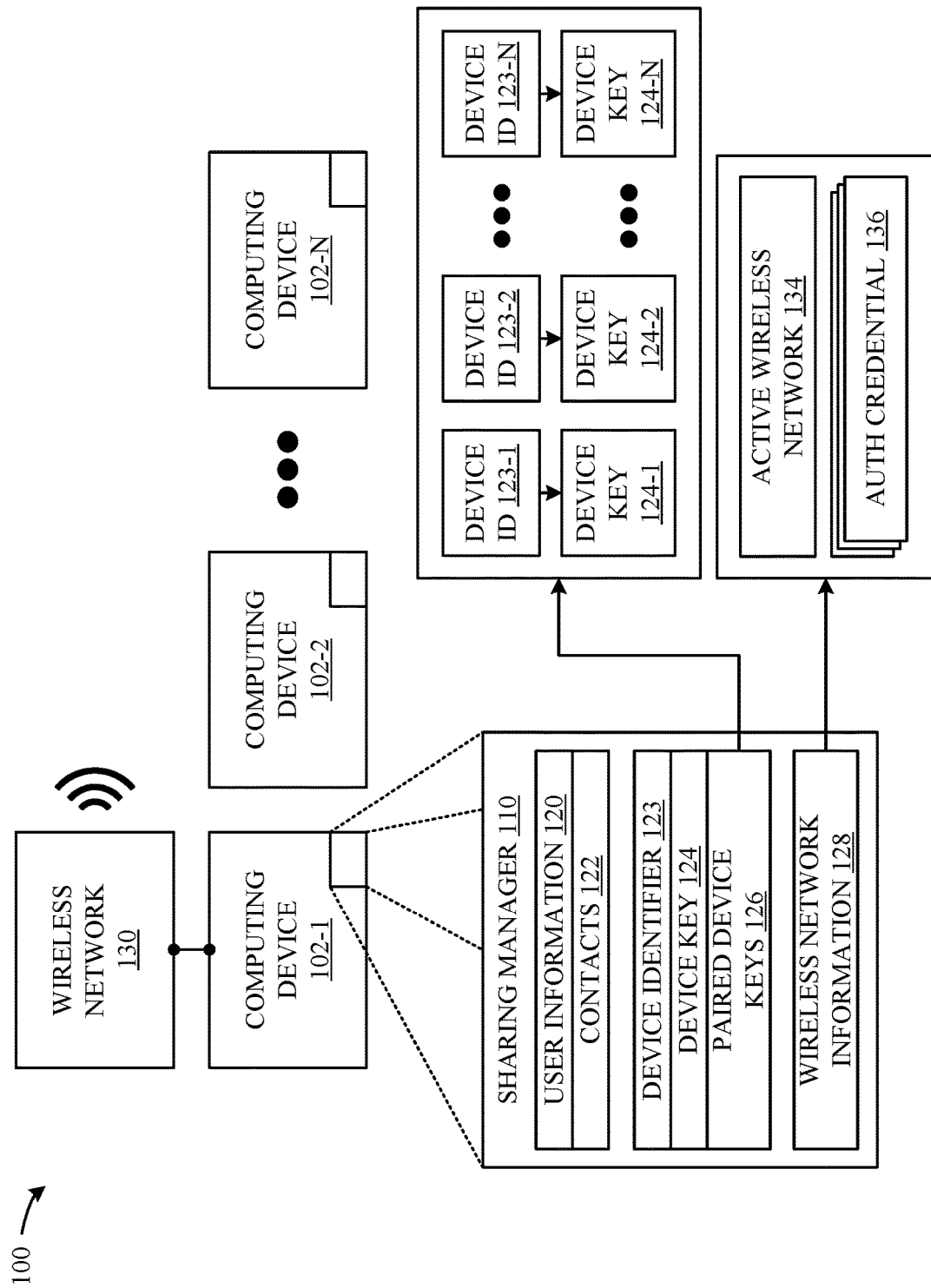
FIG. 1 illustrates a block diagram of different computing devices that can be configured to implement different aspects of the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The embodiments described herein set forth techniques for enabling a computing device to discover a nearby computing device that is known to the computing device by determining whether a pre-existing relationship exists between these two computing devices. Subsequently, when the computing device determines that the pre-existing relationship exists, the computing device can share, with the nearby computing device, one or more data items that are accessible to the computing device (e.g., managed by the computing device, stored at the computing device, stored at a cloud networking storage device, etc.). In some examples, the computing device can share a wireless network password with the nearby computing device. In other examples, the computing device can share media items (e.g., document files, picture files, music files, video files, website links, etc.) with the nearby computing device. Consider, for example, a scenario where the computing device receives a request from the nearby computing device to share a particular photo (e.g., Fiji surf trip, etc.) with a user of the nearby computing device. In response to determining that the preexisting relationship exists between these two computing devices, the computing device can present a notification (in accordance with the request) to a user of the computing device to launch a photo application that has access to the particular photo. Subsequently, the user of the computing device can utilize the photo application to grant the nearby computing device access to the particular photo. Alternatively, if the computing device does not recognize the nearby computing device, the computing device can prevent the notification from being presented. Thus, the computing device can utilize the techniques as described in greater detail herein to provide an additional layer of security and privacy when sharing one or more data items with the nearby computing device.

According to some embodiments, in response to receiving a request from a nearby computing device to access a wireless network, a computing device (having access to the wireless network) can identify whether a pre-existing relationship exists between these two computing devices. In particular, prior to receiving the request, the computing device can initially establish communication with the nearby computing device. In some examples, the computing device can store user information associated with the nearby computing device and establish a contact card based on at least a subset of the user information for the nearby computing device. In other examples, subsequent to the computing device establishing an initial pairing with the nearby computing device, the computing device can receive access to a device key associated with the nearby computing device. In turn, the computing device can correlate the device key to a device identifier (ID) associated with the nearby computing device. In either case, in response to receiving the request from the nearby computing device, the computing device can access at least one of (1) the user information or (2) the correlated device key to identify whether these computing devices are known to each other. Thus, the computing device can prevent a user of the computing device from being bothered by unknown/irrelevant computing devices.

Next, the computing device can determine whether the request provided by the nearby computing device indicates a specific wireless network. According to some embodiments, the user of the computing device can suggest an available wireless network if the specific wireless network is not indicated in the request. In either case, the user of the computing device can determine whether to grant the nearby computing device access to the wireless network. Additionally, in conjunction with granting the nearby computing device access to the wireless network, the computing device can provide a password associated with the wireless network in a format that prevents the nearby computing device from sharing the password with another computing device. In this manner, the computing device can prevent an unauthorized person in possession of the password from gaining access to potentially sensitive data that is accessible via the wireless network.

A more detailed discussion of these techniques is set forth below and described in conjunction with FIGS. 1, 2A-2B, 3-8, 9A-D, 10A-D, and 11-15, which illustrate detailed diagrams of systems and methods that can be used to implement these techniques.

FIG. 1 illustrates a block diagram 100 of different computing devices that can be configured to implement various aspects of the techniques described herein, according to some embodiments. Specifically, FIG. 1 illustrates a high-level overview of a computing device 102-1 that is configured to communicate with and enable different computing devices 102 (e.g., 102-2 through 102-N) to access (at least one) wireless network 130. Although not illustrated in FIG. 1, it is understood that each of the computing devices 102 can include at least one processor, at least one memory, and at least one storage device that collectively enable these computing devices to operate in accordance with this disclosure. For example, in a given computing device 102, the at least one processor, in conjunction with the at least one memory, can load instructions that are stored in the at least one storage device into the at least one memory to enable the techniques described herein to be implemented. In particular, an operating system (OS) that includes a variety of applications/kernels can be executed by the at least one processor in order to implement the various techniques described herein.

For example, the OS can enable a sharing manager 110 to execute on the computing device 102-1. According to some embodiments, the sharing manager 110 can be configured to service requests received from the different computing devices 102 to obtain access to the wireless network 130. In particular, the sharing manager 110 can be configured to access various data structures (e.g., stored in the at least one memory/at least one storage device of the computing device 102-1) that enable the sharing manager 110 to determine whether to grant the different computing devices 102 access to the wireless network 130. For example, the data structures can include user information 120, contacts 122, a device identifier 123, a device key 124, paired device keys 126, and wireless network information 128, the purposes of which are described below in greater detail.

According to some embodiments, the sharing manager 110 can be configured to access user information 120 and contacts 122 when attempting to identify whether preexisting relationships exist between the computing devices 102. For example, user information 120 can store data that is descriptive of a registered user of the computing device 102-1, and can take any form that enables the computing device 102-1 to be recognizable to other computing devices 102. According to some embodiments, the user information 120 can also be based on hardware/software properties associated with the computing device 102-1. For example, the user information 120 can be based on a phone number, a user ID associated with a single sign-on service (e.g., Apple ID), an e-mail account, a social network account, a social media account, a subscriber identity module (SIM)

card, and so on, associated with the computing device 102-1. In some cases, when the computing device 102-1 establishes communication with other computing devices 102, the sharing manager 110 can provide the respective user information 120 for the computing device 102-1 to the other computing devices 102. In turn, when establishing communication with the other computing devices 102, the sharing manager 110 can also receive respective user information 120 associated with the other computing devices 102. In this manner, the computing devices 102 can mutually identify one another in conjunction with carrying out the techniques set forth herein.

According to some embodiments, when the computing device 102-1 stores user information 120 for a given computing device 102 (e.g., the different computing device 102-2), the sharing manager 110 of the computing device 102-1 can establish the different computing device 102-2 as a contact that is recognized or known by the sharing manager 110. This can involve, for example, establishing a contact card in the contacts 122 that is based on at least a subset of the user information 120 for the different computing device 102-2. The subset can include, for example, a first name, a last name, an alias, a physical address, a phone number, a photo, and so on, associated with the different computing device 102-2. As described in greater detail herein, storing user information 120 for the other computing devices 102 can enable the sharing manager 110 to appropriately respond to or ignore requests from the other computing devices 102 to access the wireless network 130.

For example, when the computing device 102-1 receives a request from an unknown computing device 102 to access the wireless network 130 (to which the computing device 102-1 has access), the sharing manager 110 can prevent presenting a notification of the request at a display of the computing device 102-1. In particular, the computing device 102-1 can choose to ignore the request upon identifying that the user information 120 associated with the unknown computing device 102 is not included in the contacts 122 managed by the computing device 102-1. This beneficially provides enhanced granularity in presenting only relevant notifications to a user of the computing device 102-1. Alternatively, when the computing device 102-1 receives a request from a known computing device 102 (e.g., a friend, a relative, a colleague, etc.) to access the wireless network 130, the sharing manager 110 can verify the known computing device 102 based on the user information 120 associated with the known computing device 102. Subsequently, the sharing manager 110 can present a notification that the known computing device 102 is requesting to access the wireless network 130.

Additionally, it is noted that the sharing manager 110 included in the computing device 102-1 can utilize the respective user information 120 and contacts 122 to avoid presenting information about irrelevant computing devices 102 that are seeking to access the wireless network 130. Consider, for example, when the computing device 102-1 receives a request from a different computing device 102-2 to access the wireless network 130, where the request includes the user information 120 associated with the different computing device 102-2. In this example, when the computing device 102-1 has not previously communicated with the different computing device 102-2, the sharing manager 110 of the computing device 102-1 can avoid presenting a notification at the computing device 102-1, thereby protecting the privacy of the different computing device 102-2. Accordingly, the sharing manager 110 can be configured to enforce particular restrictions and limits on the types of requests that are presented to a user of the computing device 102-1, thereby enhancing the overall user experience.

Accordingly, as described above, the sharing manager 110 can be configured to access the user information 120 and contacts 122 when servicing requests from the different computing devices 102 to obtain access to the wireless network 130. A more detailed description of this technique is provided below in conjunction with FIG. 2A. Notably, additional embodiments are described below that can provide additional security and enhancements when servicing requests from the different computing devices 102 to obtain access to the wireless network 130. In particular, the sharing manager 110 of the computing device 102-1 can be configured to utilize the device identifier 123, the device key 124, and the paired device keys 126 to identify whether pre-existing relationships exist between the computing devices 102.

According to some embodiments, the device identifier (ID) 123 for the computing device 102-1 can take any form that enables the computing device 102-1 to be recognizable to other computing devices 102. According to some embodiments, the device ID 123 can be based on hardware/software properties associated with the computing device 102-1. For example, the device ID 123 can be based on a phone number, a subscriber identity module (SIM) card, a manufacturer's serial number, and so on. Additionally, the device key 124 for the computing device 102-1 can take the form of an encryption key that is utilized by the computing device 102-1 to encrypt messages that are transmitted by the computing device 102-1 to the other computing devices 102.

According to some embodiments, respective device IDs 123/device keys 124 can be shared between two computing devices 102 via a cloud storage system or during an initial pairing (e.g., via Bluetooth, NFC, WiFi, etc.) to enable the two computing devices 102 to identify one another at a later time in a secure manner. In one example, the computing device 102-1 can store its respective device key 124 at the cloud storage system. Subsequently, the different computing device 102 can retrieve the device key 124 from the cloud storage system, and subsequently store the device key 124. In another example, when the computing device 102-1 initially communicates with a different computing device 102, the computing device 102-1 can provide its respective device ID 123 to the different computing device 102 for storage. Additionally, the computing device 102-1 can provide its respective device key 124 to the different computing device 102 for storage. In any event, when the different computing device 102 obtains access to the device key 124, the different computing device 102 can establish a note of a correlation between the device ID 123 and the device key 124 of the computing device 102-1. Similarly, the computing device 102-1 can receive (1) a respective device ID 123 for the different computing device 102, and (2) a respective device key 124 for the different computing device 102. In turn, the computing device 102-1 can establish a note of the correlation between the device ID 123 and the device key 124 of the different computing device 102-2.

According to some embodiments, the above-described correlations can be managed at each computing device 102 within the paired device keys 126. In particular, and as illustrated in FIG. 1, the paired device keys 126 for a given computing device 102, e.g., the computing device 102-1, can store an entry for each different computing device 102 with which the computing device 102-1 has previously established communication (e.g., paired with, stored a phone number, sent a text message, etc.). In this manner, the computing device 102-1 can receive an encrypted message from a different computing device 102, identify a device key 124 (within the paired device keys 126) that successfully decrypts the message, and then identify of the device ID 123 that corresponds to the device key 124. Importantly, this approach enables the computing device 102-1 to effectively identify the different computing device 102-2 that transmits the encrypted message, while preventing other computing devices 102—specifically, those that have not previously established communication with the different computing device 102-2—from decrypting the encrypted message. A more detailed description of this technique is provided below.

Consider, for example a scenario in which the computing device 102-1 receives an encrypted message from a different computing device 102, where the underlying content of the encrypted message indicates a request to obtain access to the wireless network 130 (to which the computing device 102-1 has access). In this example, the computing device 102-1 can attempt to decrypt the encrypted message using the different device keys 124 that are known to (i.e., previously stored by) the computing device 102-1. When the computing device 102-1 successfully identifies a device key 124 (e.g., an encryption key) for decrypting the encrypted message, the computing device 102-1 can also identify the device ID 123 that corresponds to the device key 124, and effectively identify details (based on the device ID 123) about the different computing device 102 that is transmitting the encrypted message (e.g., "Jennifer's iPhone). Notably—and beneficially—the encrypted message transmitted by the different computing device 102 presumably cannot be decrypted by other computing devices 102 with which the different computing device 102 has not previously established communication (e.g., paired with, etc.), as those computing devices should not possess the device key 124 that is utilized by the different computing device 102 for encrypting messages. In this manner, the privacy of the different computing device 102 is enhanced as irrelevant/potentially malicious computing devices 102 are unable to immediately decrypt the encrypted message. A more detailed description of this technique is provided below in conjunction with FIG. 2B.

As previously described herein, the computing devices 102 can be configured to share WiFi information—illustrated in FIG. 1 as authentication credentials 136—with one another under appropriate scenarios. According to some embodiments, the authentication credentials 136 can represent an SSID associated with a wireless network 130, as well as a password, a passcode, a passphrase, a hexadecimal string, etc., that can be used to authenticate with and gain access to the wireless network 130. According to some embodiments, sharing authentication credentials 136 between computing devices 102 can involve, for example, a different computing device 102-2 issuing a request to a computing device 102-1 to access a specific wireless network 130 (to which the computing device 102-1 has access). Alternatively, the different computing device 102-2 can issue a request to the computing device 102-1 for a recommendation on an appropriate WiFi network 130 to access. In either case, the computing device 102-1 can access the authentication credentials 136 for a wireless network 130 within its respective wireless network information 128, and provide the authentication credentials 136 to the different computing device 102-2. In turn, the different computing device 102-2 can store the authentication credentials 136 within its respective wireless network information 128, and utilize the authentication credentials 136 to access the WiFi network 130.

According to some embodiments, the wireless network information 128 of the computing device 102-1 can indicate an active wireless network 134 that is currently being accessed by the computing device 102-1. For example, the sharing manager 110 can differentiate between the active wireless network 134 and other wireless networks 130 that the computing device 102-1 is capable of accessing. According to some embodiments, the sharing manager 110 can determine whether a specific wireless network 130 requested by the different computing device 102-2 is active. For example, when the specific wireless network 130 requested by the different computing device 102-2 is inactive, the sharing manager 110 can refer to the active wireless network 134 to suggest an alternative wireless network 130 that the different computing device 102-2 should access. In another example, when there are multiple available wireless networks 130 known to the sharing manager 110, the sharing manager 110 can recommend the different computing device 102-2 to access the available wireless network 130 having the strongest signal strength. In yet another example, where the request from the different computing device 102-2 does not indicate a specific wireless network 130, the sharing manager 110 can suggest that the different computing device 102-2 access the active wireless network 134 (to which the computing device 102-1 is presently connected) or an alternative wireless network 130. Additionally, the sharing manager 110 can suggest a wireless network 130 from among several available wireless networks 130 according to several wireless network factors, such as signal strength, usage statistics, usage frequency, bandwidth, and so on. Subsequently, the sharing manager 110 can provide the different computing device 102-2 with the appropriate authentication credentials 136 to enable access to the active wireless network 134 or the alternative wireless network 130.

According to some embodiments, in conjunction with providing the password to the different computing device 102-2, a user of the computing device 102-1 can stipulate a temporal limit in which the password will remain valid on the different computing device 102-2. In particular, the computing device 102-1 can bundle the password with a bit flag (e.g., temporal limit indication) in an encrypted message that is provided to the different computing device 102-2. For example, the temporal limit indication can stipulate that the password will remain valid on the different computing device 102-2 for a period of only 24 hours. In this manner, after the period of 24 hours lapses, the temporal limit indication can provide an instruction that causes the password to be rendered invalid/deleted, thereby preventing the different computing device 102-2 from being able to continue to access the wireless network 130.

According to some embodiments, the computing device 102-1 can prevent the different computing device 102-2 from sharing received authentication credentials 136 with other computing devices 102. For example, the authentication credentials 136 can be stored in a format within the wireless network information 128 that prevents the different computing device 102-2 from sharing the authentication credentials 136. To implement the aforementioned security techniques, the authentication credentials 136 can shared with other computing devices 102 in a pre-shared key (PSK) format, as described in greater detail below in conjunction with FIG. 8.

Additionally, and according to some embodiments, the wireless network 130 can include security protocols such as Wi-Fi Protected Access (WPA), Wi-Fi Protected Access II (WPA2), Wired Equivalent Privacy (WEP), Enterprise Server Networks, Extensible Authentication Protocol (EAP), and so on. Although not illustrated in FIG. 1, the computing device 102 can include various hardware components, e.g., one or more wireless communications components. In particular, the wireless communications components can include at least one of a wireless local area network (Wi-Fi) component, a global positioning system (GPS) component, a cellular component, an NFC component, an Ethernet component, or a Bluetooth component. According to some embodiments, data can be transmitted between the computing devices 102 using any wireless communications protocol implemented by the wireless communications components. It will be understood that the various computing devices 102 can include hardware/software elements that enable the computing devices 102 to implement the techniques described herein at varying levels.

According to some embodiments, the sharing manager 110 of a computing device 102 can communicate with the wireless communications components to both issue requests and service requests received from different computing devices 102. According to some embodiments, the wireless communications components can specify a requisite signal strength threshold to be satisfied in order to establish a proximity requirement for the computing devices 102 to communicate with one another. For example, the requisite signal strength threshold can be associated with a fixed and/or an adjustable Received Signal Strength Indication (RSSI) level. In response to determining that the signal strength of the request satisfies the RSSI level, the wireless communications components can indicate to the sharing manager 110 that a request is received from a different computing device 102. By monitoring the signal strength of the request, the computing device 102 can provide enhanced granularity in presenting relevant notifications at the computing device 102 that satisfy the RSSI level. This beneficially prevents other computing devices 102 that are not near the computing device 102 from burdening users with unwanted or irrelevant requests. Thus, the techniques described herein can provide an additional layer of security and privacy to increase the overall user experience. Accordingly, FIG. 1 sets forth an overview of different components/entities that can be included in the computing devices 102 to enable the embodiments described herein to be properly implemented.

Figure 2A:
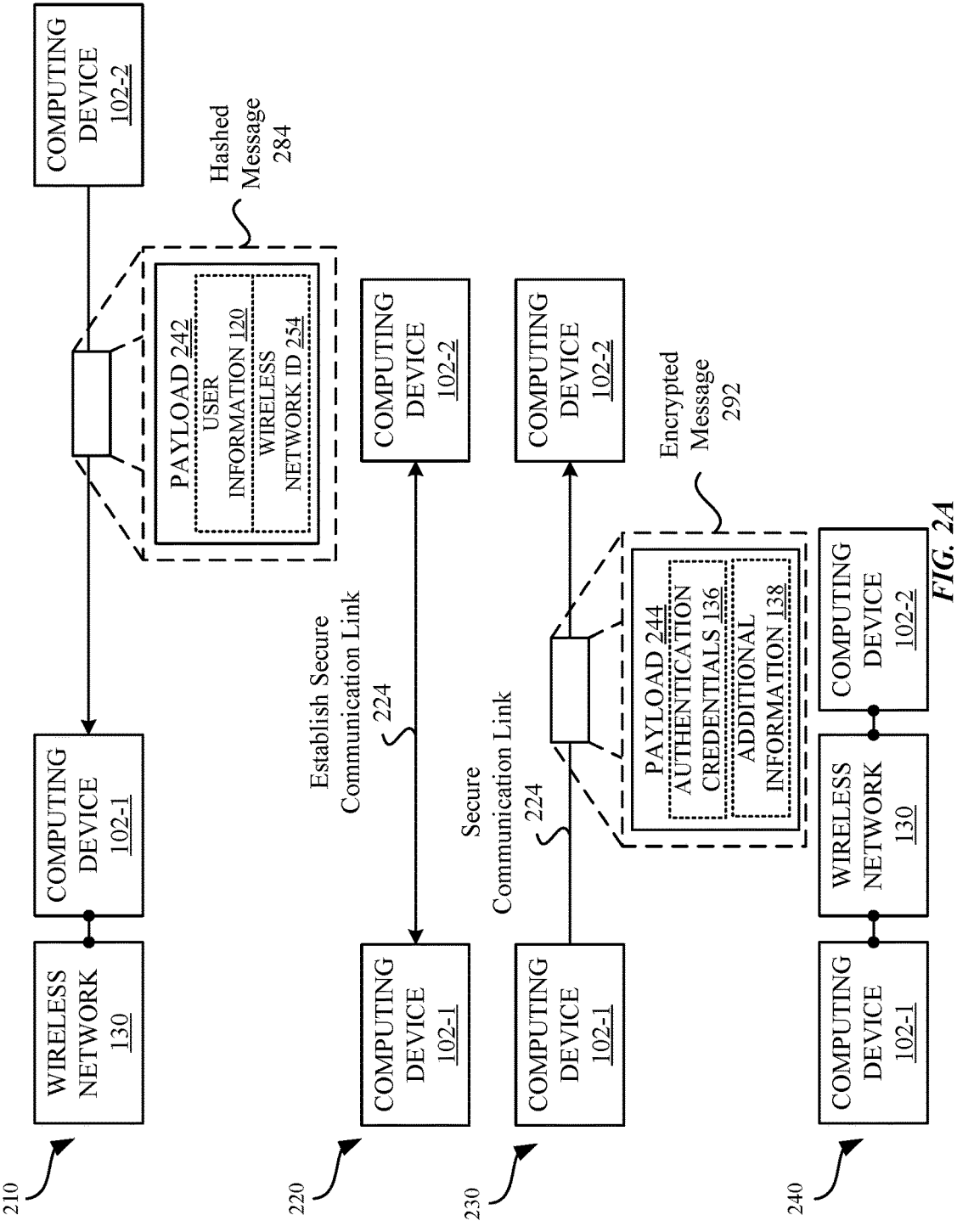
FIGS. 2A-2B illustrate conceptual diagrams of example computing devices that can be configured to service a request to access a wireless network, according to some embodiments.
Figure 2B:
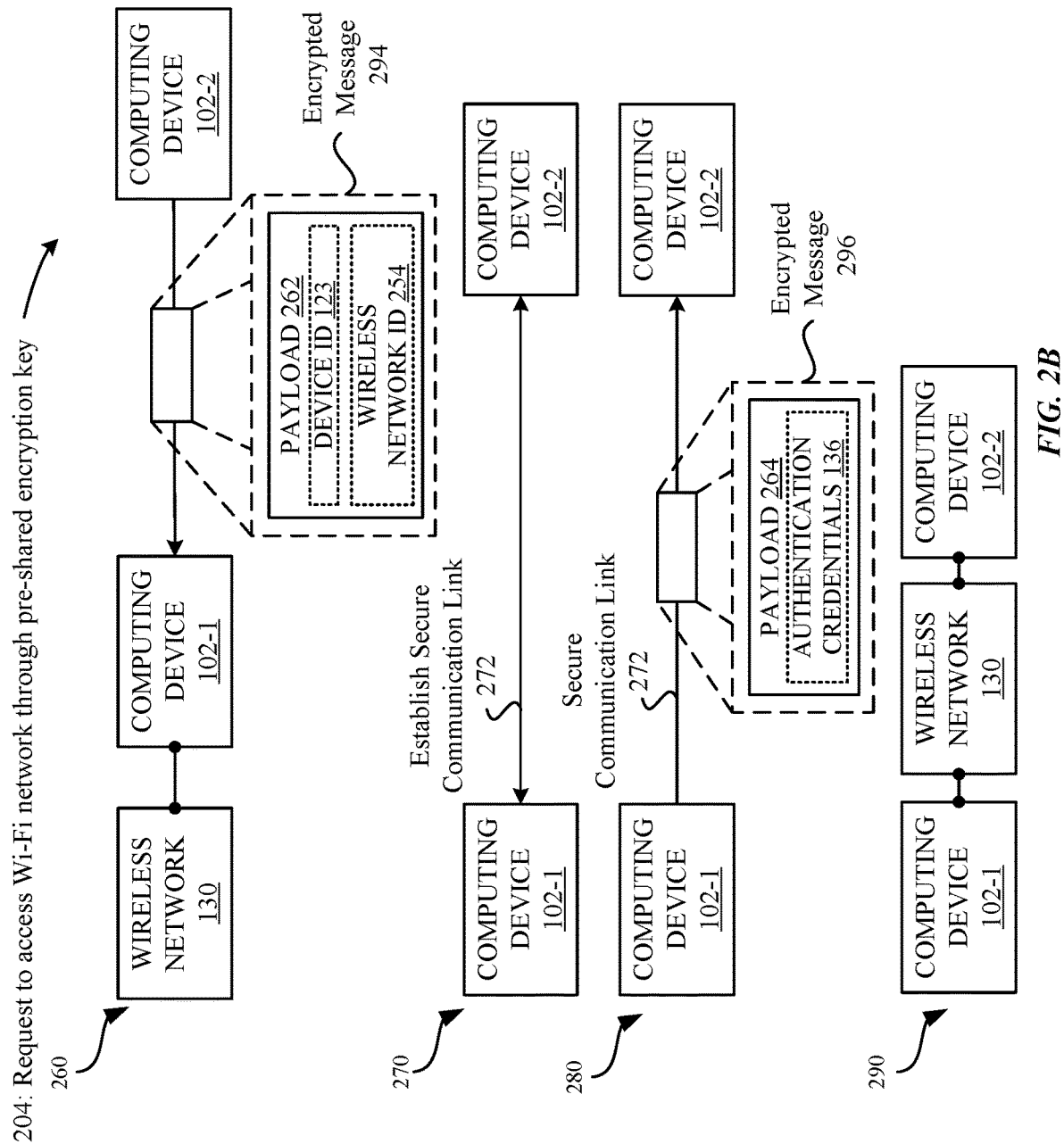

FIGS. 2A-2B illustrate conceptual diagrams of a computing device 102-1 servicing a request to access a wireless network 130, according to some embodiments. Specifically, FIG. 2A illustrates a conceptual diagram 202 of an example scenario in which a different computing device 102-2 requests to access a wireless network 130 through the utilization of user information 120 that is stored by the computing device 102-1, as previously described herein. In this scenario, the computing device 102-1 is communicatively coupled to the wireless network 130 (to which the different computing device 102-2 seeks access).

According to some embodiments, the steps 210, 220, 230, and 240 illustrated in the conceptual diagram of FIG. 2A can be preceded by the computing device 102-1 storing user information 120 associated with the different computing device 102-2. For example, as part of establishing communication (e.g., sending a text message, sending an e-mail, etc.) between these two computing devices 102, each of the computing devices 102-1,2 can provide the other with user information 120. In turn, each of the computing devices 102-1,2 can store the user information 120 and establish a contact card in its contacts 122 that is based on at least a subset (e.g., a first name, a photo, etc.) of the user information 120.

Additionally, subsequent to storing user information 120 associated with the different computing device 102-2, the computing device 102-1 can generate a unique hash value for the user information 120 that is stored in the computing device 102-1. In particular, the computing device 102-1 can utilize a hash algorithm (to which the different computing device 102-2 also has access) to generate the unique hash value for the user information 120. In turn, the computing device 102-1 can make note of the correlation between the unique hash value and the user information 120. For example, subsequent to correlating the unique hash value to the user information 120, the computing device 102-1 can establish a hash table to provide an index between the correlated unique hash value and the user information 120. According to some examples, so long as the user information 120 associated with the computing device 102 remains static (i.e., unchanged) then the unique hash value for the user information 120 also remains fixed. However, in other examples, the unique hash value for the user information 120 can also continually rotate (i.e., altering).

Additionally, the computing device 102-1 can utilize the hash table to establish a data cache. In this manner, when the computing device 102-1 receives a hashed message from the different computing device 102-2, the computing device 102-1 can access the data cache (instead of re-computing the unique hash values for each of the stored user information 120) to identify the hashed message as being provided by a known computing device 102 (e.g., a friend, a relative, a colleague, etc.). Notably—and—beneficially—the data cache can significantly increase the processing speed in which the computing device 102-1 identifies the different computing device 102-2 that provided the hashed message.

As illustrated in FIG. 2A, a first step 210 can involve the computing device 102-1 receiving, from the different computing device 102-2, a hashed message 284 that includes a payload 242. Although not illustrated in FIG. 2A, it is noted that other (e.g., nearby) computing devices 102 can also be configured to receive the hashed message 284 from the different computing device 102-2. In one example, the wireless components of the computing devices 102 can specify a RSSI level that is required to be satisfied in order for the computing device 102 to process the hashed message 284.

According to some embodiments, the payload 242 can include user information 120 associated with the different computing device 102-2. As previously described herein, the computing device 102-1 and the different computing device 102-2 have access to the same hashing algorithm. Accordingly, the different computing device 102-2 can utilize the hashing algorithm to generate a unique hash value of the user information 120. In some examples, the hashing algorithm utilizes short hashes (e.g., 2 characters, etc.). In turn, the computing device 102-1 can be configured to utilize the same hashing algorithm to identify the user information 120 of the different computing device 102-2, as described in greater detail herein.

According to some embodiments, the payload 242 can further include an indication that the different computing device 102-2 is seeking to access a wireless network 130. In particular, the different computing device 102-2 can seek to access (1) a specific wireless network 130, or (2) any wireless network 130 (e.g., a wireless network 130 recommended by the computing device 102-1) that might be available. When the different computing device 102-2 seeks to access the specific wireless network 130, the payload 242 can specify a unique wireless network identifier 254 (e.g., an SSID, etc.) associated with the specific wireless network 130. Alternatively, when the different computing device 102-2 seeks to access any wireless network 130, then the unique wireless network identifier 254 can take on a particular value to indicate that a recommendation for a wireless network 130 is being requested, e.g., a null value.

In the instance that the payload 242 specifies a unique wireless network identifier 254 associated with the specific wireless network 130, the different computing device 102-2 can utilize the same hashing algorithm (to which the computing device 102-1 has access to) to generate a unique hash value for the unique wireless network identifier 254 to be included in the payload 242. Notably, should the computing device 102-1 have access to the specific wireless network 130, the computing device 102-1 can be configured to verify that the unique hash value for the SSID (provided by the different computing device 102-2) corresponds to a unique hash value for the SSID (associated with the specific wireless network 130 that is stored in the wireless network information 128), as will be described in greater detail herein.

According to some examples, each of the user information 120 and the unique wireless network identifier 254 can be individually hashed by the different computing device 102-2. In some examples, the user information 120 and the unique wireless network identifier 254 can be provided in a single hashed message or provided in separate hashed messages.

As illustrated in FIG. 2A, a second step 220 can involve the computing device 102-1 establishing a secure communication link 224 (e.g., Transport Layer Security (TLS) protocol) with the different computing device 102-2 in response to identifying that a pre-existing relationship exists between these two computing devices 102-1,2. In conjunction with a process for identifying whether the pre-existing relationship exists, the computing device 102-1 can compare (e.g., via a hash table, a data cache, etc.) the unique hash value for the user information 120 (included in the payload 242) corresponds to a unique hash value for the user information 120 stored in the computing device 102-1. In response to determining that the unique hash values correspond to each other, the computing device 102-1 can correlate the unique hash value to the user information 120 of a known computing device 102. Accordingly, the computing device 102-1 can determine the identity of the known computing device 102.

Returning back to establishing the secure communication link 224, the computing device 102-1 can share a symmetric key with the different computing device 102-2 in conjunction with establishing the secure communication link 224. In turn, the symmetric key can be utilized to encrypt/decrypt messages transmitted between these two computing devices 102-1,2 via the secure communication link 224.

As illustrated in FIG. 2A, a third step 230 can involve the computing device 102-1 providing the authentication credentials 136 associated with the wireless network 130 to the different computing device 102-2. According to some embodiments, the computing device 102-1 can extract the unique wireless network identifier 254 to determine whether the different computing device 102-2 is seeking to access (1) a specific wireless network 130, or (2) any wireless network 130 that might be available. In particular, identifying the SSID associated with the specific wireless network 130 requested by the different computing device 102-2 can involve performing a hash value comparison on the unique wireless network identifier 254 (e.g., SSID) included in the payload 242 to the SSID stored in the authentication credentials 136. Subsequent to identifying the SSID requested, the computing device 102-1 can present a notification (in accordance with the indication) to a user of the computing device 102-1. For example, when the unique wireless network identifier 254 indicates a specific wireless network 130, the notification can request the user to grant the different computing device 102-2 access to the specific wireless network 130. In another example, when the unique wireless network identifier 254 does not indicate a specific wireless network 130, the notification can request the user to select from available wireless networks 130 to which the computing device 102-2 should connect. In either case, in response to receiving an approval from the user to grant the different computing device 102-2 access to a wireless network 130, the computing device 102-1 can access the authentication credentials 136 for the wireless network 130 (within its respective wireless network information 128), and provide the authentication credentials 136 to the different computing device 102-2 in a payload 244.

According to some embodiments, subsequent to establishing the secure communication link 224, but prior to providing the authentication credentials 136 in the payload 244, the different computing device 102-2 can provide a larger hash value (e.g., 32 characters) of its user information 120 to the computing device 102-1 that can be more difficult for an unknown computing device to fabricate than a shorter hash value. Beneficially, in this manner, by requiring that the different computing device 102-2 provide the larger hash value of its user information 120, the computing device 102-1 can ensure that the different computing device 102-2 is indeed known or recognizable to the computing device 102-1. In contrast, the user information 120 hashed using the shorter hash value that was included in the payload 242 may be preferential in enabling the different computing device 102-2 to process the hashed message 284 more quickly.

According to some embodiments, the computing device 102-1 can establish an encrypted message 292 using the symmetric key shared between these two computing devices 102-1,2. In particular, the encrypted message 292 can include the payload 244. In some examples, the payload 244 can also include additional information 138 that can facilitate in enabling the different computing device 102-2 to access the specific wireless network 130 that the computing device 102-1 has access to. For example, the additional information 138 can indicate the specific wireless channel that the computing device 102-1 has access to. In turn, the different computing device 102-2 can obtain the authentication credentials 136 by decrypting the encrypted message 292 using the symmetric key.

As illustrated in step 240 of FIG. 2A, the different computing device 102-2 can utilize the authentication credentials 136 to access the specific wireless network 130.

Specifically, FIG. 2B illustrates a conceptual diagram 204 of an example scenario in which a different computing device 102-2 requests to access a wireless network 130 through utilization of a device key 124 that is shared between the computing device 102-1 and the different computing device 102-2, as previously described herein. In this scenario, the computing device 102-1 is communicatively coupled to the wireless network 130 (to which the different computing device 102-2 seeks access).

According to some embodiments, the steps 260, 270, 280, and 290 illustrated in the conceptual diagram 204 can be preceded by the computing device 102-1 receiving access to a device key 124 associated with the different computing device 102-2 to enable the two computing devices 102 to identify one another at a later time in a secure manner. In particular, the computing devices 102-1,2 can establish bi-directional correlation of their respective device keys 124. In one example, in conjunction with an initial pairing process (e.g., Bluetooth, etc.), each of the computing devices 102-1,2 can provide the other with (1) a respective ID 123, and (2) a respective device key 124 (e.g., an encryption key). In another example, each of the computing devices 102-1,2 can provide the other with the respective device key 124 in conjunction with having established prior communication between each other (e.g., e-mail message, phone call, etc.). In particular, a cloud storage system can be utilized to provide each other device with access to the respective device key 124. In turn, each of the computing devices 102,1-2 can make note of the correlation between the respective device key 124 and the respective device ID 123. In this manner, and as described in greater detail herein, when the computing device 102-1 receives an encrypted message (including the device ID 123) from the different computing device 102-2, the computing device 102-1 can identify the device key 124 for decrypting the encrypted message. In turn, the computing device 102-1 can correlate the device key 124 to the device ID 123, thereby enabling the computing device 102-1 to identify the different computing device 102-2 in a secure manner. Additionally, the correlation between the respective device key 124 and the respective device ID 123 can also be single-direction. For example, when the computing device 102-1 receives the respective ID 123 and respective device key 124 associated with the different computing device 102-2, the computing device 102-1 can make note of this correlation, but it does not provide its respective ID 123 and respective device key 124 to the different computing device 102-2. Beneficially, this imparts an additional layer of privacy for the computing device 102-1 that afterwards grants the different computing device 102-2 access to a specific wireless network 130. Additionally, an additional layer of privacy can be imparted by enabling these computing devices 102-1,2 to rotate their respective device keys 124 so that their respective device keys 124 are not fixed to their respective device ID 123. In this manner, users of computing devices 102 who have not maintained communication with each other (e.g., e-mail, text message, phone call, etc.) over a predetermined period of time may not be in possession of the most current device key 124 that is associated with the respective computing device 102.

As illustrated in FIG. 2B, a first step 260 can involve the computing device 102-1 receiving, from the different computing device 102-2, an encrypted message 294 that includes a payload 262. According to some embodiments, the encrypted message 294 can be established using the device key 124 (e.g., encryption key) that is accessible to the different computing device 102-2. In particular, the payload 262 can include the device ID 123 associated with the different computing device 102-2. In some examples, the device ID 123 can be periodically updated to inform other computing devices 102 with which the different computing device 102-2 is associated. For example, the different computing device 102-2 can update the device ID 123 (e.g., randomly generate a value for the device ID 123) and provide the updated device ID 123 to a cloud service to which the different computing device 102-2 and the other computing devices 102 are communicably coupled. In turn, the cloud service can distribute the updated device ID 123 to the other computing devices 102. Using this approach, the other computing devices 102 can remain capable of identifying the different computing device 102-2 by utilizing the updated device ID 123 (as well as the device key 124). In this manner, the overall security can be enhanced as malicious/unrelated computing devices 102 who are in possession of the device ID 123 will be unable to identify the different computing device 102-2 when the device ID 123 is updated (and presumably not provided to the malicious computing devices 102).

According to some embodiments, the payload 262 can further include a unique wireless network identifier 254 (e.g., an SSID, etc.) associated with a specific wireless network 130. For example, when the computing device 102-2 seeks to access the specific wireless network 130, the payload 262 can indicate a unique wireless network identifier 254 (e.g., an SSID) associated with the specific wireless network 130. Alternatively, when the different computing device 102-2 seeks to access any wireless network 130, then the unique wireless network identifier 254 can take on a particular value to indicate that a recommendation for a wireless network 130 is being requested, e.g., a null value. According to some embodiments, each of the user information 120 and the unique wireless network identifier 254 can be transmitted in a single encrypted message or sent in separate encrypted messages.

As illustrated in FIG. 2B, a second step 270 can involve the computing device 102-1 establishing a secure communication link 272 (e.g., Transport Layer Security (TLS) protocol) with the different computing device 102-2. In establishing the secure communication link 272, the computing device 102-1 can share a symmetric key with the different computing device 102-2 in conjunction with establishing a secured session for the secure communication link 272. According to some embodiments, the secure communication link 272 can be established subsequent to identifying that a pre-existing relationship exists between these two computing devices 102-1,2. In conjunction with a process for identifying whether the pre-existing relationship exists, the computing device 102-1 can attempt to decrypt the contents of the encrypted message 294 using the different device keys 124 that are known (i.e., previously stored by) the computing device 102-1. When the computing device 102-1 successfully identifies a device key 124 for decrypting the encrypted message 294, the computing device 102-1 can identify the device ID 123, and effectively identify details (e.g., based on the device ID 123) about the different computing device 102-2.

As illustrated in FIG. 2B, a third step 280 can involve the computing device 102-1 providing the authentication credentials 136 associated with the wireless network 130 to the different computing device 102-2. Subsequent to decrypting the encrypted message 294, the computing device 102-1 can extract the unique wireless network identifier 254 to determine whether the different computing device 102-2 indicates that it is seeking to access (1) a specific wireless network 130, or (2) any wireless network 130 that might be available. In turn, the sharing manager 110 of the computing device 102-1 can present a notification (in accordance with the indication) to a user of the computing device 102-1. For example, when the unique wireless network identifier 254 indicates a specific wireless network 130, the notification can request the user to grant the different computing device 102-2 access to the specific wireless network 130. In another example, when the unique wireless network identifier 254 does not indicate a specific wireless network 130, the notification can request the user to select from available wireless networks 130 to which the computing device 102-2 should connect.

In either case, in response to receiving an approval from the user to grant the different computing device 102-2 access to a wireless network 130, the computing device 102-1 can access the authentication credentials 136 for the wireless network 130 (within its respective wireless network information 128), and provide the authentication credentials 136 to the different computing device 102-2 in a payload 264 that is included in an encrypted message 296. According to some embodiments, the encrypted message 296 can be established using the symmetric key shared between these two computing devices 102-1,2 in conjunction with establishing the secure communication link 272. Next, the computing device 102-1 can establish the encrypted message 296 using the symmetric key shared between these two computing devices 102-1,2. In turn, the different computing device 102-2 can obtain the authentication credentials 136 by decrypting the encrypted message 296 using the symmetric key.

As illustrated in step 290 of FIG. 2B, the different computing device 102-2 can utilize the authentication credentials 136 to access the specific wireless network 130.

Figure 3:
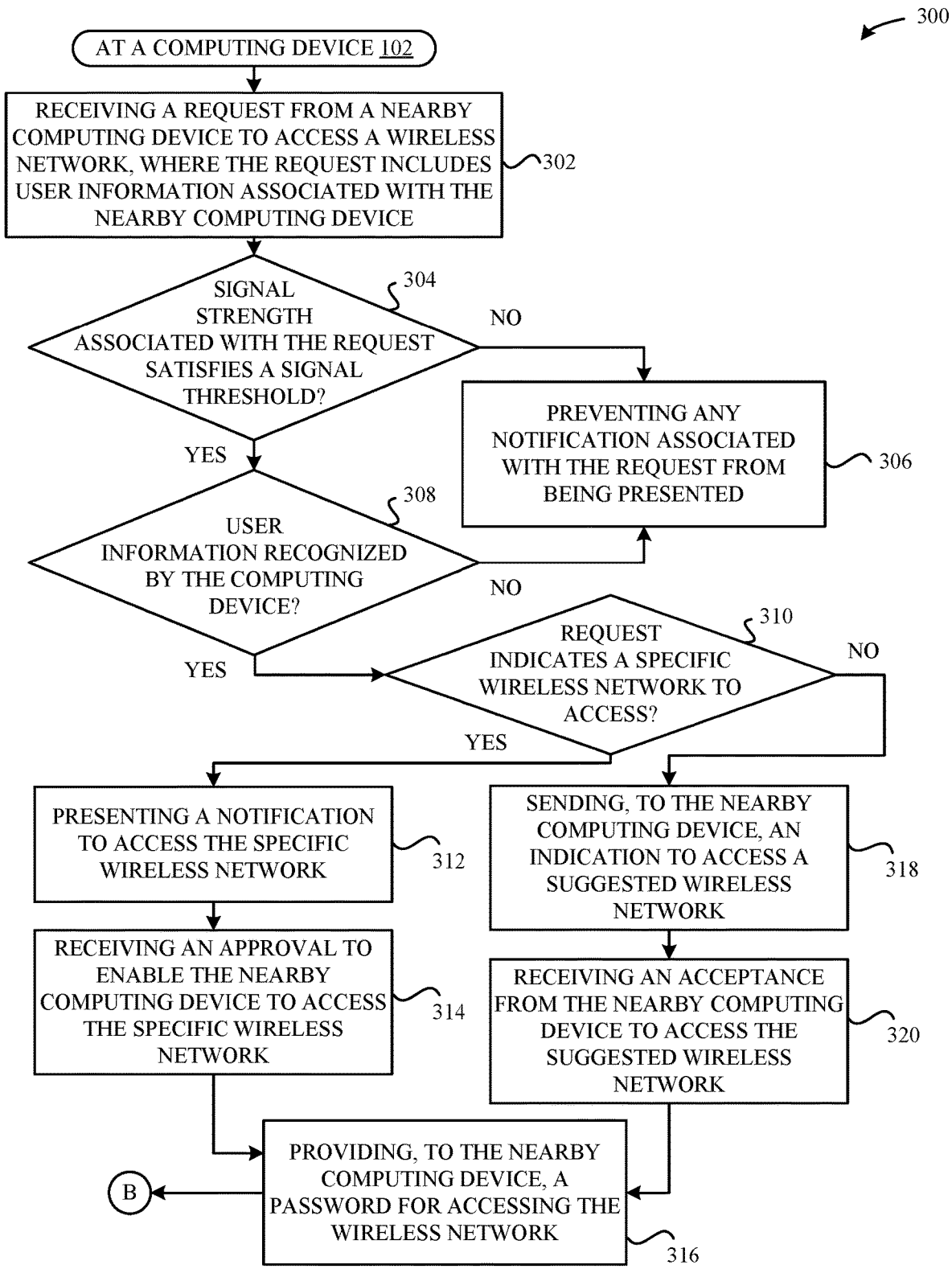
FIG. 3 illustrates a method for servicing a request to access a wireless network, according to some embodiments.

FIG. 3 illustrates a method 300 for servicing a request issued by a nearby computing device to access a wireless network, according to some embodiments. As illustrated in FIG. 3, the method 300 begins at step 302, where the computing device—e.g., a computing device 102-1—receives a request from a nearby computing device—e.g., a nearby computing device 102-2—to access a wireless network 130, where the request includes user information 120 associated with the nearby computing device 102-2. This can occur, for example, subsequent to the computing device 102-1 storing user information 120 for the nearby computing device 102-2 as a result of communications between these two computing devices 102.

At step 304, the computing device 102-1 can determine whether a signal strength associated with the request satisfies a signal threshold. As previously described herein, the sharing manager 110 of the computing device 102-1 can interface with the wireless communications components to determine whether the signal strength of the request satisfies a requisite RSSI level to process the request. If the computing device 102-1 determines that the signal strength associated with the request does not satisfy the signal threshold, then the computing device 102-1 can prevent any notification associated with the request from being presented to a user of the computing device 102-1, as indicated by step 306. This can beneficially prevent the user of the computing device 102-1 from being bothered by unknown/irrelevant computing devices 102.

Alternatively, in response to the computing device 102-1 determining that the signal strength of the request satisfies the requisite RSSI level, the computing device 102 can determine whether the user information 120 included in the request is recognized by the computing device 102-1, as indicated by step 308. In particular, the computing device 102-1 can identify whether a pre-existing relationship exists with the nearby computing device 102-2 by comparing the user information 120 included in the request to the contacts 122 managed by the computing device 102-1. Upon determining that the user information 120 is not included in the contacts 122, the computing device 102-1 can prevent any notification associated with the request from being presented to a user of the computing device 102-1, as indicated by step 306.

Otherwise, when the computing device 102-1 determines that the user information 120 is included in its contacts 122, the computing device 102-1 can determine, at step 310, whether the request indicates a specific wireless network 130 that the nearby computing device 102-2 seeks to access. As previously described above with reference to FIGS. 2A-2B, the nearby computing device 102 can specify a specific wireless network 130 using, for example, an SSID for the specific wireless network 130. At step 312, in response to determining that the request indicates the specific wireless network 130, the computing device 102-1 can present a notification to inquire about whether the user of the computing device 102-1 approves of granting the nearby computing device 102-2 access to the specific wireless network 130. In one example, the notification presented to the user can include a contact card that is based on at least a subset of the user information 120 for the nearby computing device 102-2. In this manner, the notification can include, for example, a first name, a photo, etc., to inform the user of an identity of the nearby computing device 102-2 (and the user who presumably is operating it).

At step 314, the computing device 102-1 can receive an approval from the user to enable the nearby computing device 102-2 to access the specific wireless network 130. In turn, the computing device 102-1 can provide authentication credentials 136 (e.g., a password, a passcode, etc.) associated with the specific wireless network 130, which can be used by the nearby computing device 102-2 to authenticate with and gain access to the specific wireless network 130, as indicated by step 316.

Returning back now to step 310, if a specific wireless network 130 is not indicated by the nearby computing device 102-2, the computing device 102-1 can provide the nearby computing device 102-2 with a suggestion to access, for example, an active wireless network 134 (to which the computing device 102-1 is presently connected) or an alternative wireless network 130 that is available to be accessed, etc., as indicated by step 318. At step 320, the computing device 102-1 can provide, in response to receiving an acceptance from the nearby computing device 102-2, authentication credentials 136 associated with the suggested wireless network 130. In turn, at step 316, the nearby computing device 102-2 can utilize the authentication credentials 136 to authenticate with and gain access to the suggested wireless network 130. In turn, the method 300 can proceed to the method 800 of FIG. 8, which is described below in greater detail.

Figure 4:
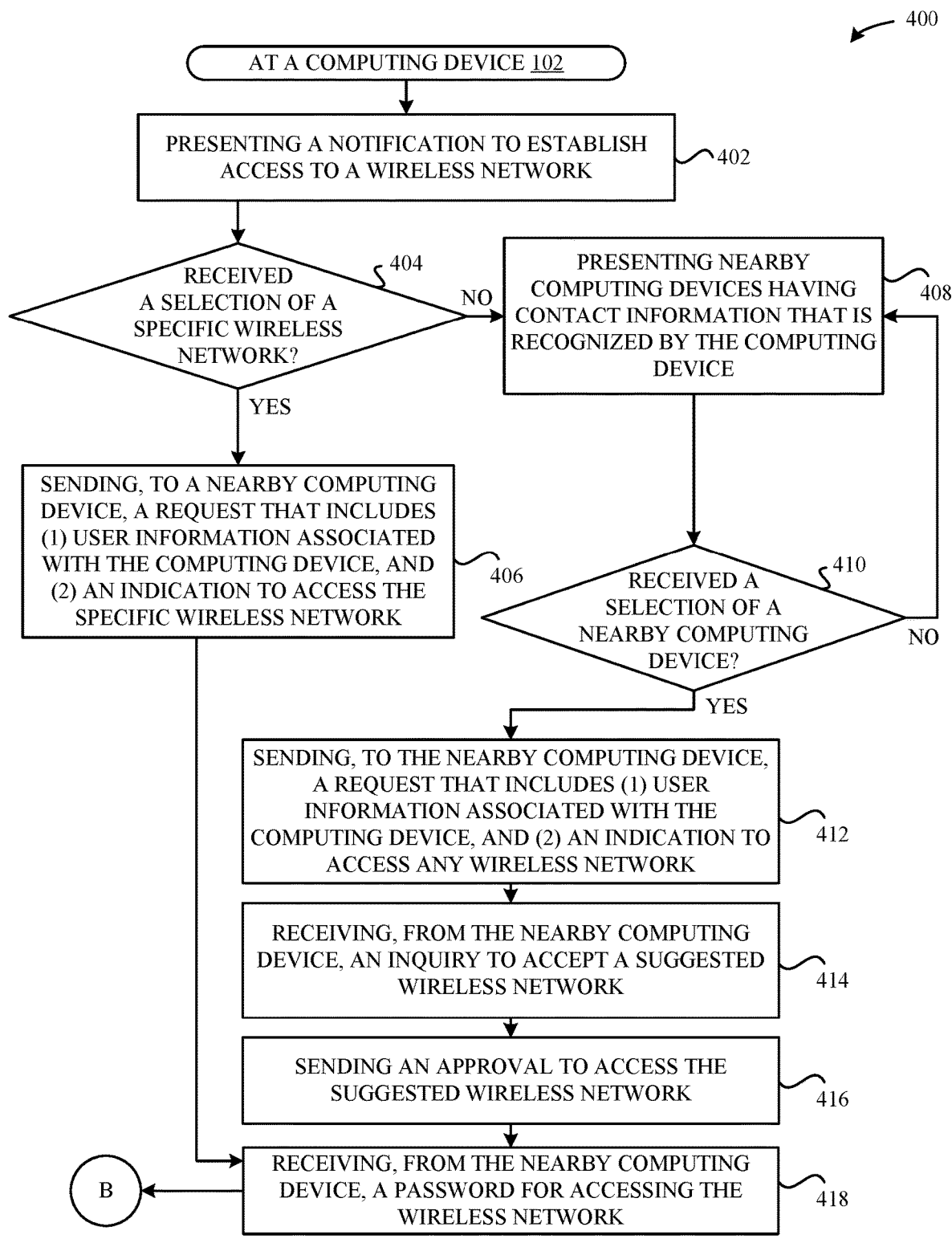
FIG. 4 illustrates a method for enabling a computing device to issue a request to access a wireless network, according to some embodiments.

FIG. 4 illustrates a method 400 for enabling a computing device to issue a request to a nearby computing device to access a wireless network, according to some embodiments. As illustrated in FIG. 4, the method 400 begins at step 402, where a computing device—e.g., a computing device 102-2—presents a notification at a display of the computing device 102-2 to establish access to a wireless network 130. This can occur, for example, when a user of the computing device 102-2 attempts to access a wireless network 130 but lacks the authentication credentials 136 to access the wireless network 130. The notification can also include a listing of other wireless networks 130 that are available in the current location in which the computing device 102-2 is disposed. At step 404, the computing device 102-2 can determine whether a selection (e.g., by a user) of a specific wireless network 130 is received. In response to determining that the selection of the specific wireless network 130 is received, the computing device 102-2 can issue, to at least one nearby computing device 102—e.g., a nearby computing device 102-1—a request that includes (1) user information 120 associated with the computing device 102-2, and (2) an indication to access the specific wireless network 130, as indicated by step 406.

When the nearby computing device 102-1 receives the request, the nearby computing device 102-1 can compare the user information 120 associated with the computing device 102-2 to the contacts 122 managed by the computing device 102-2 to identify whether a pre-existing relationship exists between these two computing devices 102-1,2. In turn, the nearby computing device 102-1 can receive an approval by the user of the nearby computing device 102-1 to grant the computing device 102-2 access to the specific wireless network 130. As indicated by step 418, the computing device 102-2 can receive a password (e.g., via authentication credentials 136) associated with the specific wireless network 130 to enable the computing device 102-2 to access the specific wireless network 130.

Referring back now to step 404, when a selection of a specific wireless network is not received, the method 400 can proceed to step 408, which involves identifying nearby computing devices 102 that are recognizable to the computing device 102-2. For example, the computing device 102-2 can compare respective user information 120 associated with the nearby computing devices 102 to its contacts 122. In turn, the nearby computing devices 102 that are recognized by the computing device 102-2 can be presented at the display of the computing device 102-2. In turn, the computing device 102-2 can wait for the user to select one of the recognized nearby computing devices 102.

Next, at step 410, the computing device 102-2 can receive a selection of a nearby computing device 102—e.g., a nearby computing device 102-3—that can potentially service the request issued by the computing device 102-2 to access the wireless network 130. At step 412, the computing device 102-2 can send, to the nearby computing device 102-3, a request to access a wireless network 130. The request can include (1) user information 120 associated with the computing device 102-2, and (2) an indication of the desire to access any available wireless network 130 (to which the nearby computing device 102-3 has access). In turn, the nearby computing device 102-3 can indicate a suggested wireless network 130 to the computing device 102-2. At step 414, the computing device 102-2 can receive, from the nearby computing device 102-3, an inquiry to accept the suggested wireless network 130. In turn, at step 416, the computing device 102-2 can accept the inquiry by sending an approval to the nearby computing device 102-3 to access the suggested wireless network. Finally, at step 418, the computing device 102-2 can receive a password (e.g., via authentication credentials 136) associated with the suggested wireless network 130 to enable the computing device 102-2 to access the suggested wireless network 130. In turn, the method 400 can also proceed to the method 800 of FIG. 8, which is described below in greater detail.

Figure 5:
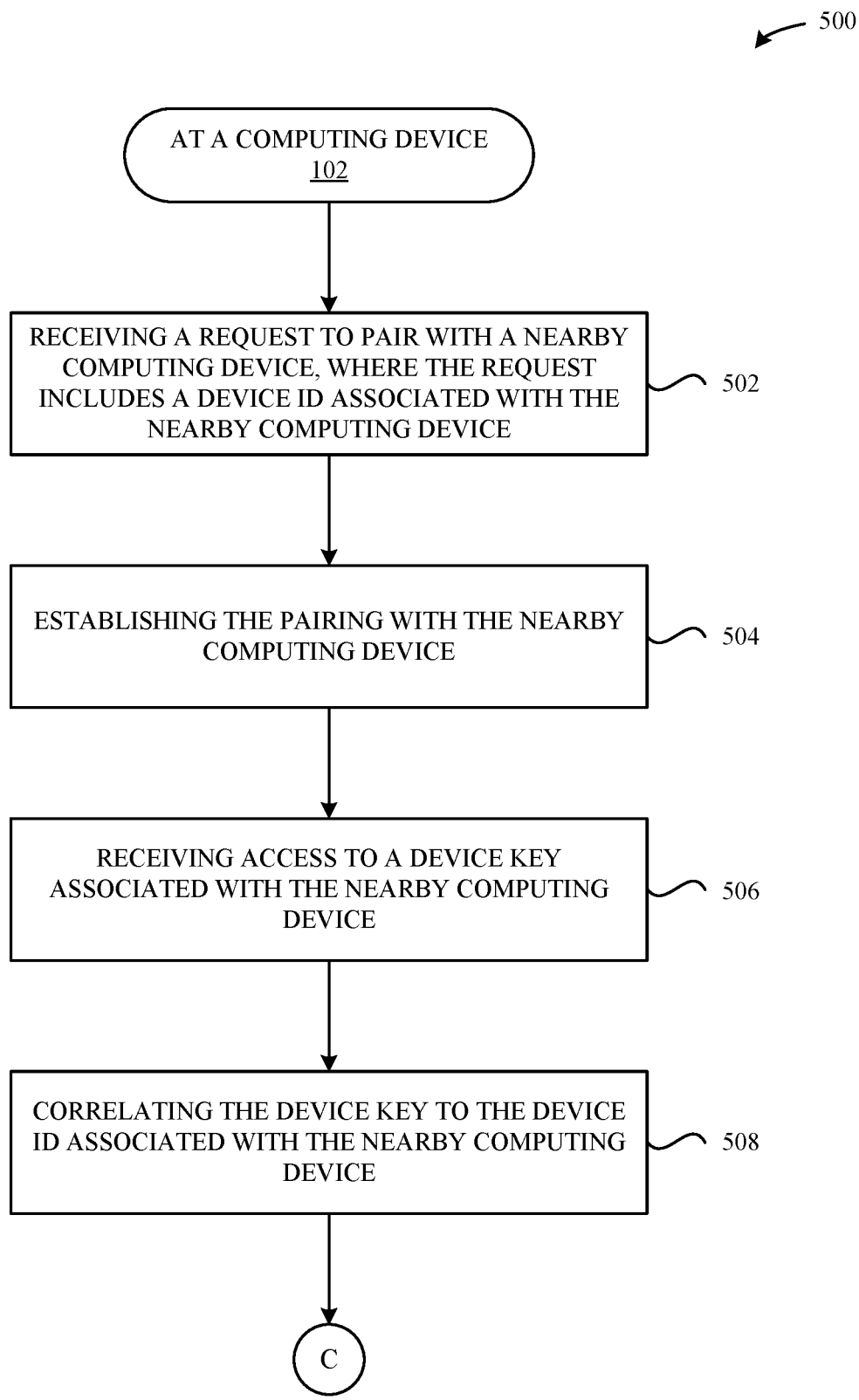
FIG. 5 illustrates a method for sharing a device key between different computing devices, according to some embodiments.

FIG. 5 illustrates a method 500 for sharing a device key between two computing devices for identifying one another at a later time, according to some embodiments. As illustrated in FIG. 5, the method 500 begins at step 502, where a computing device—e.g., a computing device 102-1—receives a request from a nearby computing device—e.g., a nearby computing device 102-2—to establish an initial pairing. According to some embodiments, the request can include a device ID 123 associated with the nearby computing device 102-2. In turn, the computing device 102-1 can present a notification at a display of the computing device 102-1 to inquire about whether a user of the computing device 102-1 approves of establishing the initial pairing.

At step 504, the computing device 102-1 can receive an approval from the user to enable the computing device 102-1 to establish the initial pairing with the nearby computing device 102-2. In turn, the device ID 123 associated with the nearby computing device 102-2 can be stored in the paired device keys 126 of the computing device 102-1.

At step 506, subsequent to establishing the initial pairing, the computing device 102-1 can receive a device key 124 (e.g., an encryption key) associated with the nearby computing device 102-2. In some examples, the nearby computing device 102-2 can directly provide the device key 124 to the computing device 102-1. In some examples, the nearby computing device 102-2 can provide the device key 124 to a cloud networking storage system (to which the computing device 102-1 has access). In turn, the cloud networking storage system can distribute the device key 124 to the computing device 102-1. In some examples, each of the computing devices 102-1,2 can provide the other with (1) a respective ID 123, and (2) a respective device key 124 (e.g., an encryption key) as a result of the initial pairing process.

Although not illustrated in FIG. 5, in some embodiments, the nearby computing device 102-2 can provide its device key 124 to known computing devices 102-N, in which an initial pairing between these two computing devices 102 cannot be established. In particular, the nearby computing device 102-2 can provide its (1) device ID 123 and (2) device key 124 to any selection of known computing devices 102-N (e.g., respective user information 120 associated with the known computing devices 102-N is stored in the contacts 122 of the nearby computing device 102-2). Consider, for example, if a user of the nearby computing device 102-2 lives in Cupertino, and the user's friend—e.g., known computing device 102-3—lives in Tokyo and whose user information 120 is stored in the nearby computing device 102-2. Due to lack of close geographical proximity, there may not be an opportunity for these two computing devices 102 to utilize an initial pairing process as a mechanism for sharing a device key 124. In addressing this example scenario, the user of the nearby computing device 102-2 can distribute its device key 124 to the known computing device 102-3 (and any other selection of known computing devices 102-N having user information 120 that is stored in the nearby computing device 102-2) by using the cloud networking storage system.

In either case, at step 508, the computing device 102 can make note of the correlation between the respective device ID 123 and the respective device key 124 associated with the nearby computing device 102-2, thereby enabling the computing device 102 to identify the nearby computing device 102-2 at a later time in a secure manner. In this manner, and as described in greater detail herein, when the computing device 102 receives an encrypted message from the nearby computing device 102-2, the computing device 102 can identify the device key 124 for decrypting the encrypted message so as to identify details (e.g., based on the device ID 123) about the nearby computing device 102-2. In turn, the method 500 can also proceed to any one of method 600 of FIG. 6 or method 700 of FIG. 7, which is described below in greater detail.

Figure 6:
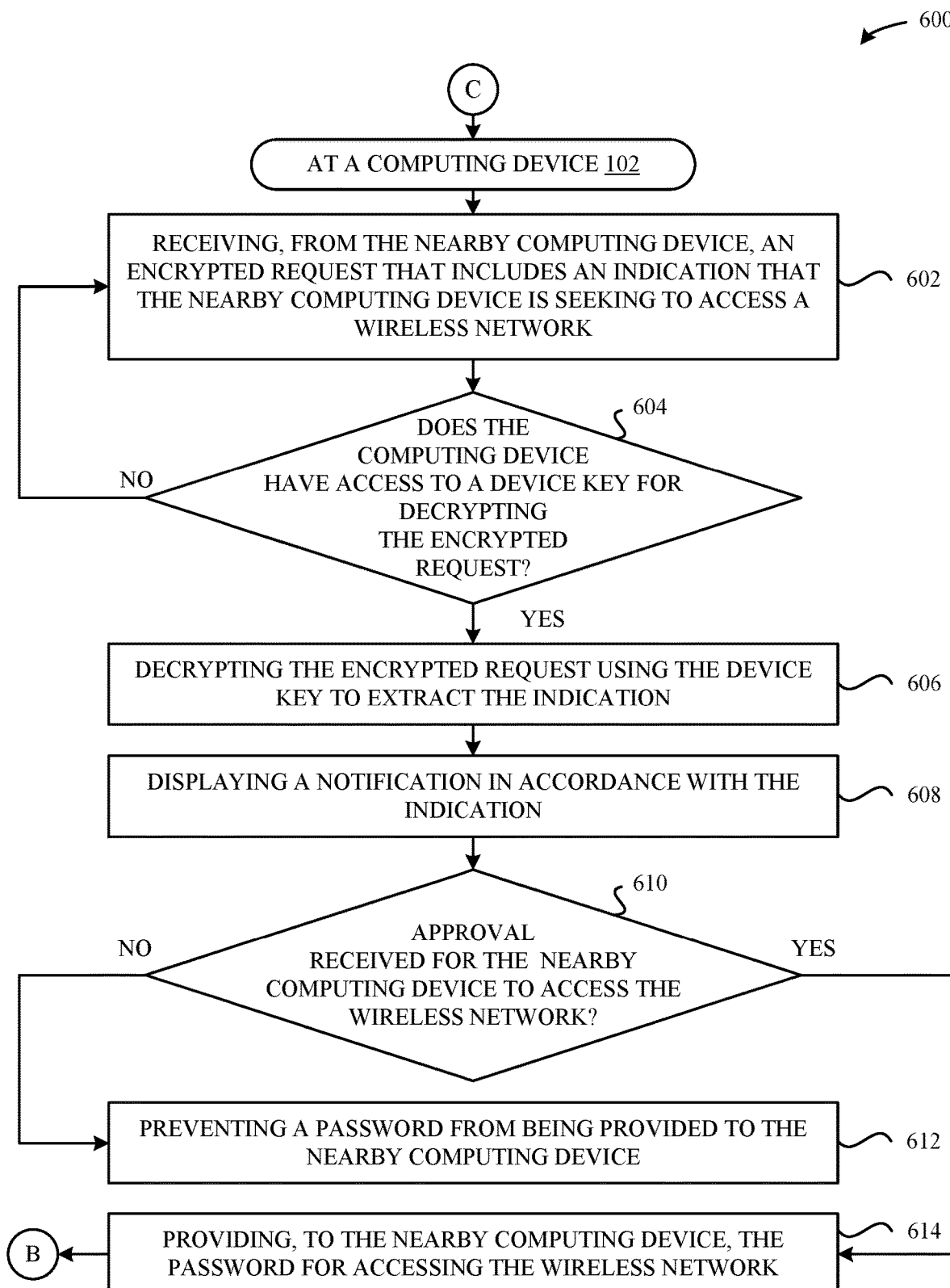
FIG. 6 illustrates a method for servicing a request to access a wireless network, according to some embodiments.

FIG. 6 illustrates a method 600 for servicing a request issued by a nearby computing device to access a wireless network, according to some embodiments. As illustrated in FIG. 6, the method 600 begins at step 602, where a computing device—e.g., a computing device 102-1—receives an encrypted request from a nearby computing device—e.g., a nearby computing device 102-2—that includes an indication that the nearby computing device 102-2 is seeking to access a wireless network 130. This can occur, for example, subsequent to the computing device 102-1 receiving (1) a device ID 123 associated with the nearby computing device 102-2, and (2) a device key 124 associated with the nearby computing device 102-2.

At step 604, the computing device 102-1 can determine whether it has access to a device key 124 associated with the nearby computing device 102-2 for decrypting the encrypted request. In particular, the computing device 102-1 can attempt to decrypt the contents of the encrypted request using the different device keys 124 that are known (i.e., previously stored by) the computing device 102-1. If the computing device 102-1 is unable to identify a device key 124 for decrypting the encrypted request, then the computing device 102-1 can continue monitoring for additional encrypted requests.

At step 606, upon successfully identifying a device key 124 for decrypting the encrypted request, the computing device 102-1 can identify the device ID 123 that corresponds to the device key 124, and effectively identify details (e.g., based on the device ID 123) about the nearby computing device 102-2.

At step 608, subsequent to decrypting the encrypted request, the computing device 102-1 can extract an indication (included in the encrypted request) of a unique wireless network identifier associated with a specific wireless network 130 that the nearby computing device 102-2 is seeking to access. Although, in some examples, the unique wireless network identifier does not indicate the specific wireless network 130. In either case, the computing device 102-1 can display a notification (in accordance with the indication) to a user of the computing device 102-1. For example, when the unique wireless network identifier indicates the specific wireless network 130, the notification can request that the user approve the nearby computing device 102-2 access to the specific wireless network 130. Alternatively, when the unique wireless network identifier does not indicate the specific wireless network 130, the notification can request the user to suggest an available wireless network 130 to which the nearby computing device 102-2 should connect.

In either case, at step 610, the computing device 102-1 can determine whether approval is received for the nearby computing device 102-2 to access the wireless network 130. Upon determining that approval is not received, the computing device 102-1 can prevent a password (e.g., via authentication credentials 136) from being provided to the nearby computing device 102-2, at step 612. Otherwise, if approval is received, the computing device 102-1 can provide the password to enable the nearby computing device 102-2 to access the wireless network 130, at step 614. In turn, the method 600 can also proceed to the method 800 of FIG. 8, which is described below in greater detail.

Figure 7:
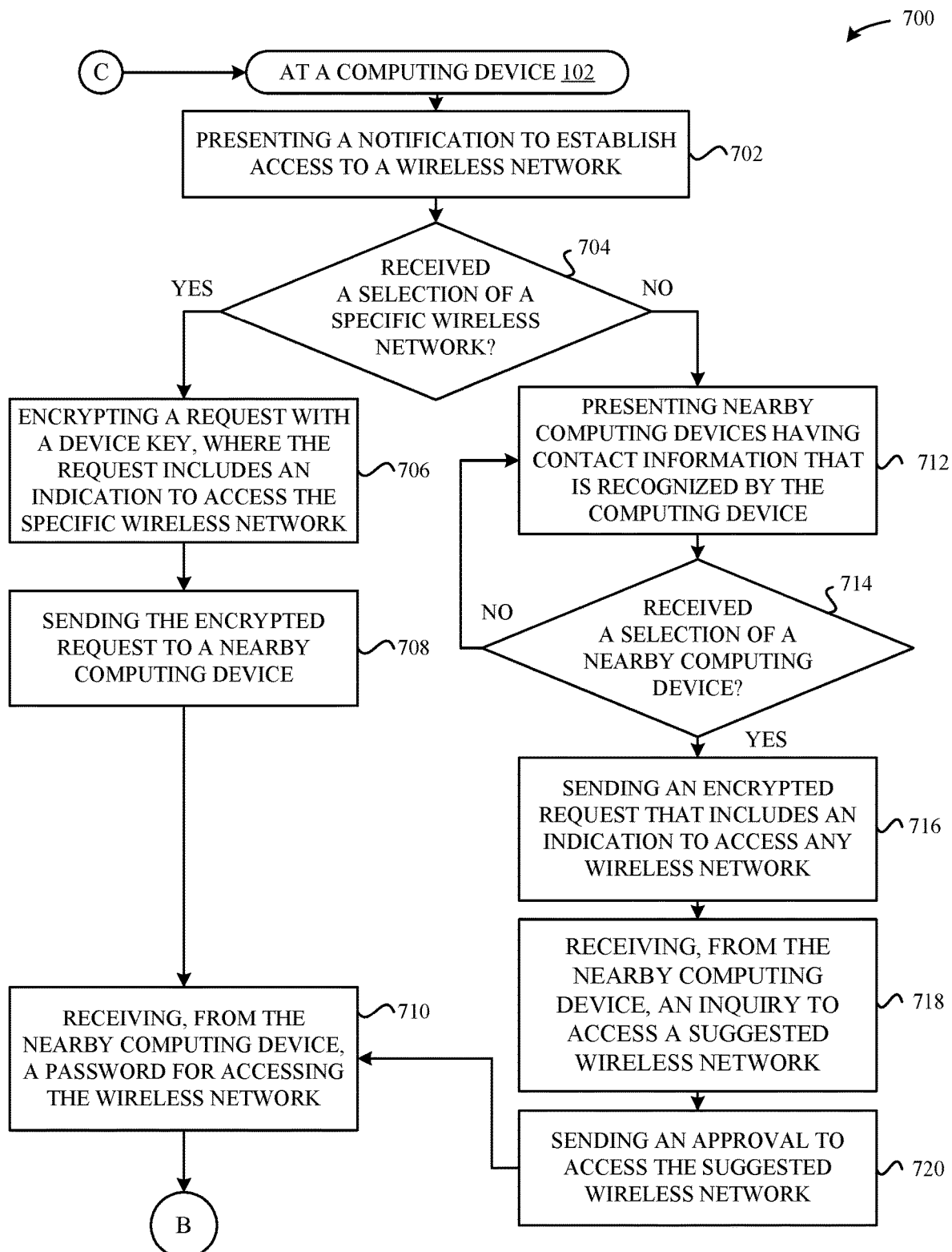
FIG. 7 illustrates a method for enabling a computing device to issue a request to access a wireless network, according to some embodiments.

FIG. 7 illustrates a method 700 for enabling a computing device to issue a request to a nearby computing device to access a wireless network, according to some embodiments. As illustrated in FIG. 7, the method 700 begins at step 702, where a computing device—e.g., a computing device 102-2—presents a notification at a display of the computing device 102-2 for establishing access to a wireless network 130. In some examples, the notification can present a list of one or more available wireless networks in the current location in which the computing device 102-2 is disposed. At step 704, the computing device 102-2 can determine whether a selection of a specific wireless network 130 among the one or more available wireless networks is received. If the selection of the specific wireless network 130 is not received, then the computing device 102-2 can continue monitoring for an additional selection.

At step 706, in response to determining that the selection of the specific wireless network 130 is received, the computing device 102-2 can establish an encrypted request using a device key 124 associated with the computing device 102-2, in which the encrypted request includes an indication to access the specific wireless network 130. The specific wireless network 130 can be indicated by using a unique wireless network identifier. According to some embodiments, the nearby computing device—e.g., 102-1—is communicatively coupled to the specific wireless network 130. In this manner, the nearby computing device 102-1 can be configured to service the request received from the computing device 102-2 to obtain access to the specific wireless network 130.

At step 708, the computing device 102-2 can send the encrypted request to the nearby computing device 102-1. In turn, the nearby computing device 102-1 can attempt to decrypt the contents of the encrypted request using the different device keys 124 that are known (i.e., previously stored by) the nearby computing device 102-1. As previously described herein, the nearby computing device 102-1 received access to a (1) a device key 124 associated with the computing device 102-2, and (2) a device ID 123 associated with the computing device 102-2. Accordingly, the nearby computing device 102-1 can identify details (e.g., based on the device ID 123) about the computing device 102-2 based on the device key 124 that is used for decrypting the encrypted request. Subsequent to decrypting the encrypted request, the nearby computing device 102-1 can determine that the decrypted request indicates the specific wireless network 130. In turn, the nearby computing device 102-1 can present a notification to inquire about whether a user of the nearby computing device 102-1 approves of granting the computing device 102-2 access to the specific wireless network 130.

At step 710, if the user of the nearby computing device 102-1 approves, the computing device 102-2 can receive a password (e.g., via authentication credentials 136) for accessing the specific wireless network 130. Returning back now to step 704, if a selection of the specific wireless network 130 is not received by the computing device 102-2, the computing device 102-2 can present, at the display of the computing device 102-2, nearby computing devices 102 having respective user information 120 that is recognized by the computing device 102-2, as indicated by step 712. In turn, the computing device 102-2 can wait for the user to select one of the nearby computing devices 102. At step 714, the computing device 102-2 can determine whether a selection of one of the nearby computing devices 102 is received. If the selection is not received, then the computing device 102-2 can continue monitoring for an additional selection.

At step 716, in response to receiving the selection of a nearby computing device 102-2, the computing device 102-2 can establish an encrypted request using the device key 124 associated with the computing device 102-2, in which the encrypted request includes an indication to access any wireless network 130 suggested by the nearby computing device 102-1. Next, the computing device 102-2 can send the encrypted request to the nearby computing device 102-3. In turn, the nearby computing device 102-3 can decrypt the encrypted request and present a notification that inquires whether a user of the nearby computing device 102-3 allows or denies the computing device 102-2 access to an active wireless network or an alternative wireless network. In either case, if the user of the nearby computing device 102-3 accepts, the nearby computing device 102-3 can provide a suggested wireless network 130 to the computing device 102-2.

In turn, at step 718, the computing device 102-2 can receive an inquiry, from the nearby computing device 102-3, about whether to accept access to the suggested wireless network 130. At step 720, the computing device 102-2 can accept the inquiry by sending an approval to the nearby computing device 102-3. Finally, at step 710, the computing device 102-2 can receive a password (e.g., via authentication credentials 136) associated with the suggested wireless network 130 to enable the computing device 102-2 to access the suggested wireless network 130. In turn, the method 700 can also proceed to the method 800 of FIG. 8, which is described below in greater detail.

Figure 8:
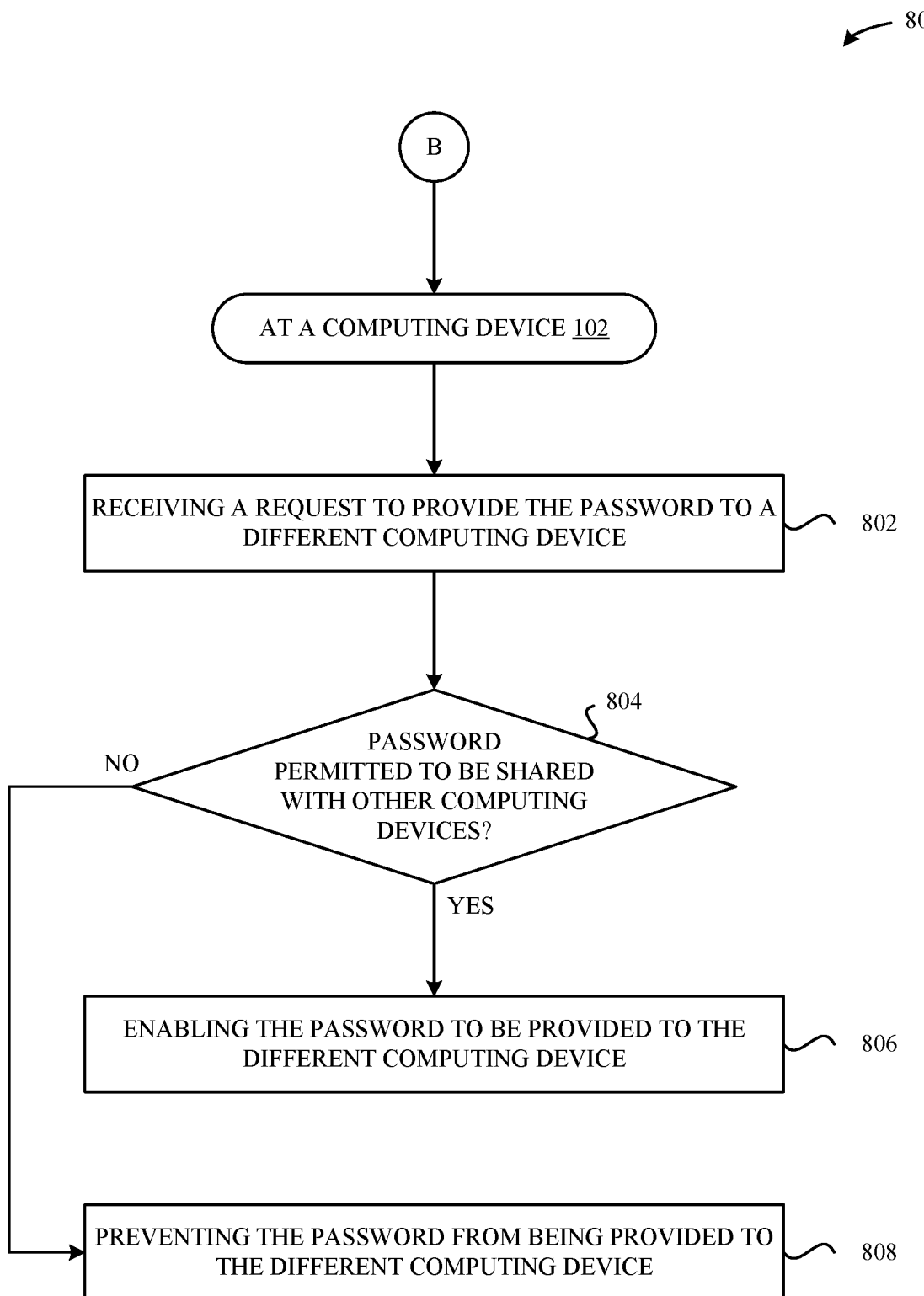
FIG. 8 illustrates a method for servicing a request to share a password for a wireless network, according to some embodiments.

FIG. 8 illustrates a method 800 that can extend any one of the method 300 (described in conjunction with FIG. 3), the method 400 (described in conjunction with FIG. 4), the method 600 (described in conjunction with FIG. 6), or the method 700 (described in conjunction with FIG. 7). The method 800 involves servicing a request by a computing device to share a password for a wireless network with other computing devices, according to some embodiments. As illustrated in FIG. 8, the method 800 begins at step 802, where the computing device—e.g., a computing device 102-2—receives a request to provide a password (e.g., via authentication credentials 136) associated with a wireless network 130 to enable a different computing device—e.g., a different computing device 102-3—to access the wireless network 130. This can occur, for example, subsequent to the computing device 102-2 receiving the password for the wireless network 130 from a nearby computing device—e.g., a nearby computing device 102-1—in response to requesting access to (1) a specific wireless network 130, or (2) any wireless network 130.

At step 804, the computing device 102-2 can determine whether the password is permitted to be shared with other computing devices 102. According to some embodiments, the computing device 102-2 can determine whether the password is stored at the computing device 102-2 is in a pre-shared key (PSK) format. In particular, when the nearby computing device 102-1 provided the password to the computing device 102-2, the plaintext of the password can be converted into the PSK format (e.g., 64 hexadecimal characters) and shared in the PSK format. In some examples, the PSK format can be generated via a hash algorithm. Accordingly, in response to identifying that the password is stored in the PSK format at the computing device 102-2, the computing device 102-2 can determine (1) that the password was provided by another computing device 102 (i.e., the password was not manually entered by a user of the computing device 102-2), (2) that the password cannot be shared with the different computing device 102-3. Notably and beneficially—a user of the nearby computing device 102-1 that shared the password with the computing device 102-2 is unburdened with the concern that the computing device 102-2 can obtain the plaintext version of the password and share the password with unauthorized persons who can gain access to potentially sensitive data that is accessible via the wireless network 130. Additionally, it should be noted that in some examples, the password in the PSK format does not represent a literal readout of the password. Accordingly, the plaintext of the password cannot be derived even if the keychain is inspected.

Although in some embodiments, it should be noted that no restrictions are placed onto the password that would prevent the password from being shared by the computing device 102-2 with the different computing device 102-3.

At step 806, in response to determining that the password is permitted to be shared with other computing devices 102, the computing device 102-2 is enabled to provide the password to the different computing device 102-3. For example, when the computing device 102-2 determines that the password is a passphrase (e.g., 8 to 63 character passphrase), then the computing device 102-2 can determine that the password is permitted to be shared with other computing devices 102.

Returning back now to step 804, if the password is not permitted to be shared with other computing devices 102, then the computing device 102-2 is prevented from providing the password with the different computing device 102-3, as indicated by step 808.

Figure 9D:
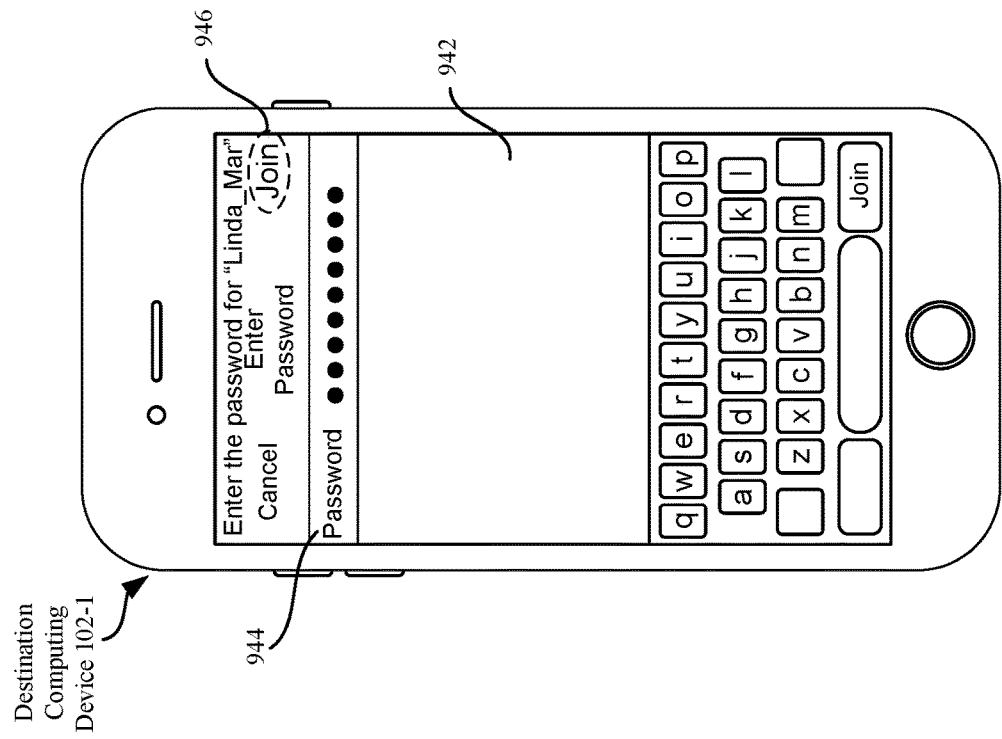

FIGS. 9A-9D illustrate conceptual diagrams of example user interfaces that can be implemented at different computing devices—e.g., 102-1,2—to service a request to access a specific wireless network, according to some embodiments. As illustrated in FIG. 9A, at step 910, a user interface 912 of a computing device—e.g., a destination computing device 102-1—can present a list of available wireless networks in the current location in which the destination computing device 102-1 is disposed. Consider, for example, that the list of available wireless networks presented at the user interface 912 are those that satisfy a requisite wireless signal strength.

FIG. 9A illustrates that the user interface 912 can be configured to receive a selection of a specific wireless network from among the list of available wireless networks. For example, as illustrated in FIG. 9A, the user interface 912 can receive the selection 914 of a specific wireless network ("Linda_Mar") by a user of the destination computing device 102-1. According to some examples, the destination computing device 102-1 can determine whether the specific wireless network ("Linda_Mar") that is selected is capable of being accessed (i.e., shared) by other computing devices 102, such as if the specific wireless network ("Linda_Mar") utilizes a WPA2 security protocol. In response to determining that the specific wireless network ("Linda_Mar") can be accessed by other computing devices 102, the destination computing device 102-1 can transmit the request to a source computing device 102-2 having access to this specific wireless network.

According to some embodiments, the specific wireless network that is desired by the destination computing device 102-1 to be selected may not be initially presented at the user interface 912. Instead the specific wireless network can be requested by selecting the other icon 916. In some examples, the specific wireless network (that is accessible to the source computing device 102-2) may be a hidden network that is not visibly presented at the user interface 912. In accordance with this example, the destination computing device 102-1 can request that the source computing device 102-2 provide the destination computing device 102-1 with a hidden specific wireless network that can be accessed. Subsequently, the source computing device 102-2 can provide the destination computing device 102-1 with a suggested wireless network.

Turning now to FIG. 9B, at step 920, in response to receiving the selection 914 of the specific wireless network ("Linda_Mar"), the destination computing device 102-1 can present a user interface 922 that prompts for a password in order for the destination computing device 102-1 to access the specific wireless network ("Linda_Mar"). In conjunction with presenting the user interface 922, the destination computing device 102-1 can additionally perform a checklist of conditions prior to transmitting the request to the source computing device 102-2 to access the specific wireless network ("Linda_Mar"). In particular, the conditions of the checklist can include at least one of: (1) determining whether the destination computing device 102-1 is signed into a single sign-on service, (2) whether the prompt for the password is presented at the user interface 922, or (3) whether the specific wireless network ("Linda_Mar") can be accessible by other computing devices 102, such as if password associated with this specific wireless network utilizes a password with the WPA2 format. When at least one of these conditions is met, then the destination computing device 102-1 can be enabled to transmit the request to the source computing device 102-2.

Subsequent to transmitting the request, the destination computing device 102-1 can wait for a user of the source computing device 102-2 to accept the request. In particular, a password entry box 926 included in the user interface 922 can be unfilled while the destination computing device 102-1 waits for approval from a user of the source computing device 102-2. In some examples, the password entry box 926 can receive the password via (1) manual entry or (2) auto-fill.

According to some embodiments, the user interface 922 can present instructions 924 that prompts the user to bring the destination computing device 102-1 closer (e.g., in proximity) to the source computing device 102-2. As previously described herein, the source computing device 102-2 can specify a requisite RSSI level that is required to be satisfied in order for the source computing device 102-2 to process the request.

Figure 9C:
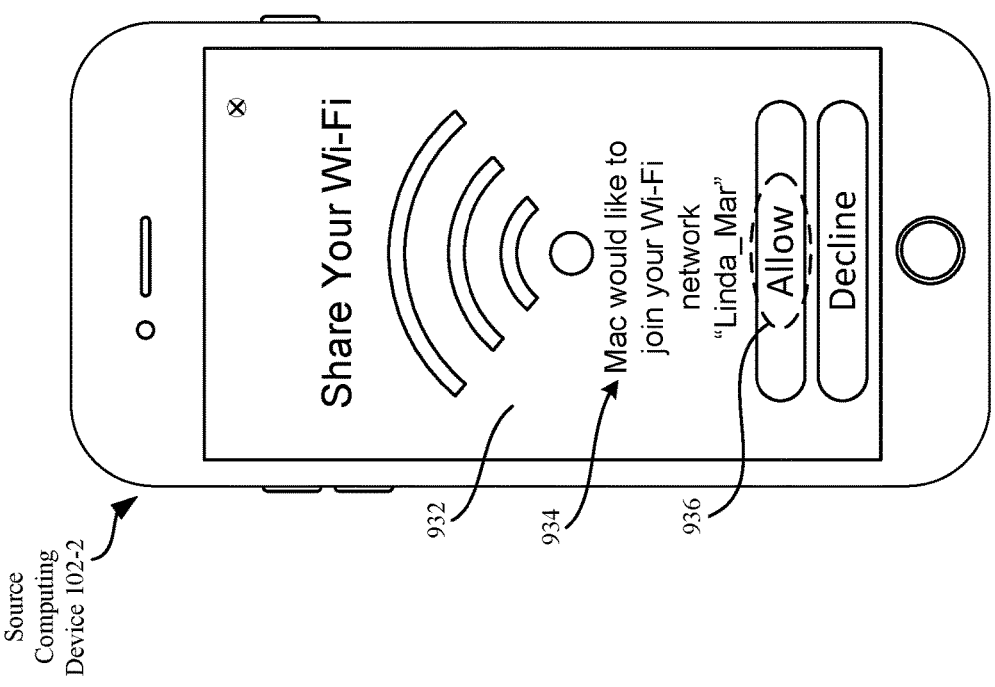

Turning now to the source computing device 102-2 as illustrated in step 930 of FIG. 9C, the source computing device 102-2 can receive the request from the destination computing device 102-1. In response, the source computing device 102-2 can present a user interface 932 that displays a notification 934 to inquire whether the user of the source computing device 102-2 allows or declines the destination computing device 102-1 to access the specific wireless network ("Linda_Mar"). In one example, the notification 934 can include a contact card that is based on at least a subset of the user information 120 for the destination computing device 102-1. The notification 934 can include, for example, a first name, to inform the user of an identity of the destination computing device 102-1 (and the user who presumably is operating it). In turn, the user of the source computing device 102-2 can select an allow icon 936 to accept the request for the destination computing device 102-1 to access the specific wireless network ("Linda_Mar").

Returning to the destination computing device 102-1 as illustrated in step 940 of FIG. 9D, the destination computing device 102-1 can receive the acceptance from the source computing device 102-2. As illustrated in FIG. 9D, a password entry box 944 of a user interface 942 of the destination computing device 102-1 is updated (according to the acceptance) to include an auto-filled password that is associated with the specific wireless network ("Linda_Mar"). In turn, the user can select the join icon 946 to enable the destination computing device 102-1 to access this specific wireless network. Alternatively, the destination computing device 102-1 can automatically join this specific wireless network. Notably and beneficially—the characters of the auto-filled password are hashed to prevent the user of the destination computing device 102-1 from sharing the password with other computing devices 102. It is noted that the user interfaces 912, 922, 932, and 942 illustrated in FIGS. 9A-9D are merely exemplary and that any user interface can be implemented at the computing devices 102-1,2 to provide the same or similar functionality.

Figures 10A, 10B:
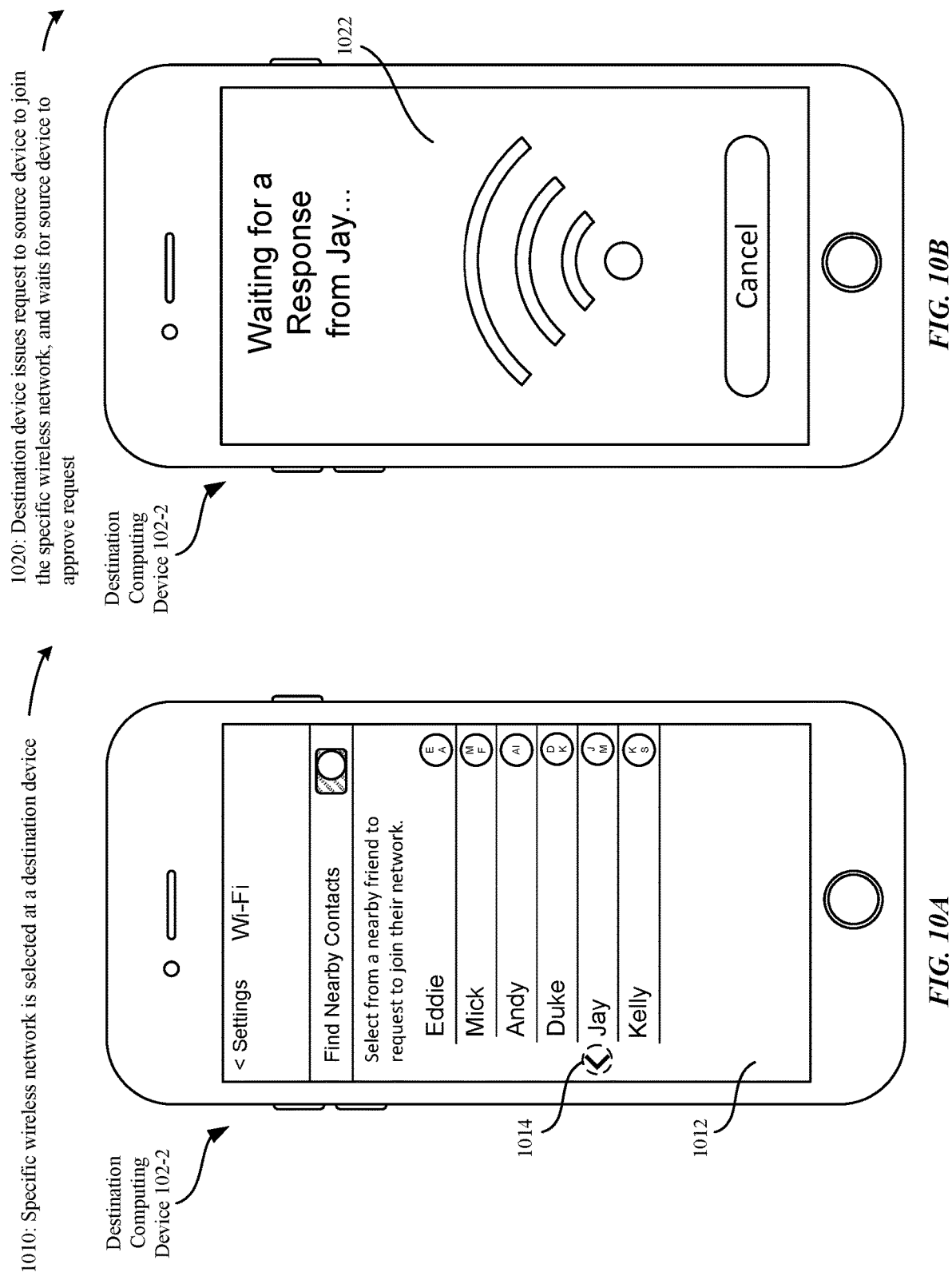
FIGS. 10A-10D illustrate conceptual diagrams of example user interfaces that can be configured to service a request to access any wireless network, according to some embodiments.

FIGS. 10A-10D illustrate conceptual diagrams of example user interfaces that can be implemented at different computing devices—e.g., 102-1,2—to service a request to access any wireless network, according to some embodiments. As illustrated in FIG. 10A, at step 1010, a user interface 1012 of a computing device—e.g., a destination computing device 102-2—can present a list of nearby computing devices 102 (and subsets of their respective user information 120) that are recognizable to the destination computing device 102-2. Consider, for example, that the list of nearby computing devices 102 presented at the user interface 1012 are also within proximity to the destination computing device 102-2 (e.g., satisfy a requisite RSSI level, etc.).

FIG. 10A illustrates that the user interface 1012 can be configured to receive a selection 1014 of a source computing device 102-1 from among the list of nearby computing devices 102. For example, as illustrated in FIG. 10A, the user interface 1012 can receive the selection 1014 of the source computing device 102-1 that is recognizable as ("Jay"). In turn, the destination computing device 102-2 can transmit a request to the source computing device 102-1 to access any wireless network 130.

FIG. 10B illustrates at step 1020, a user interface 1022 of the destination computing device 102-2 in conjunction with transmitting the request to the user ("Jay") of the source computing device 102-1. The user interface 1022 can inform the user of the destination computing device 102-2 that an acceptance of the request is not yet received, and will continue waiting for the source computing device 102-1 to accept the request.

Figures 10C, 10D:
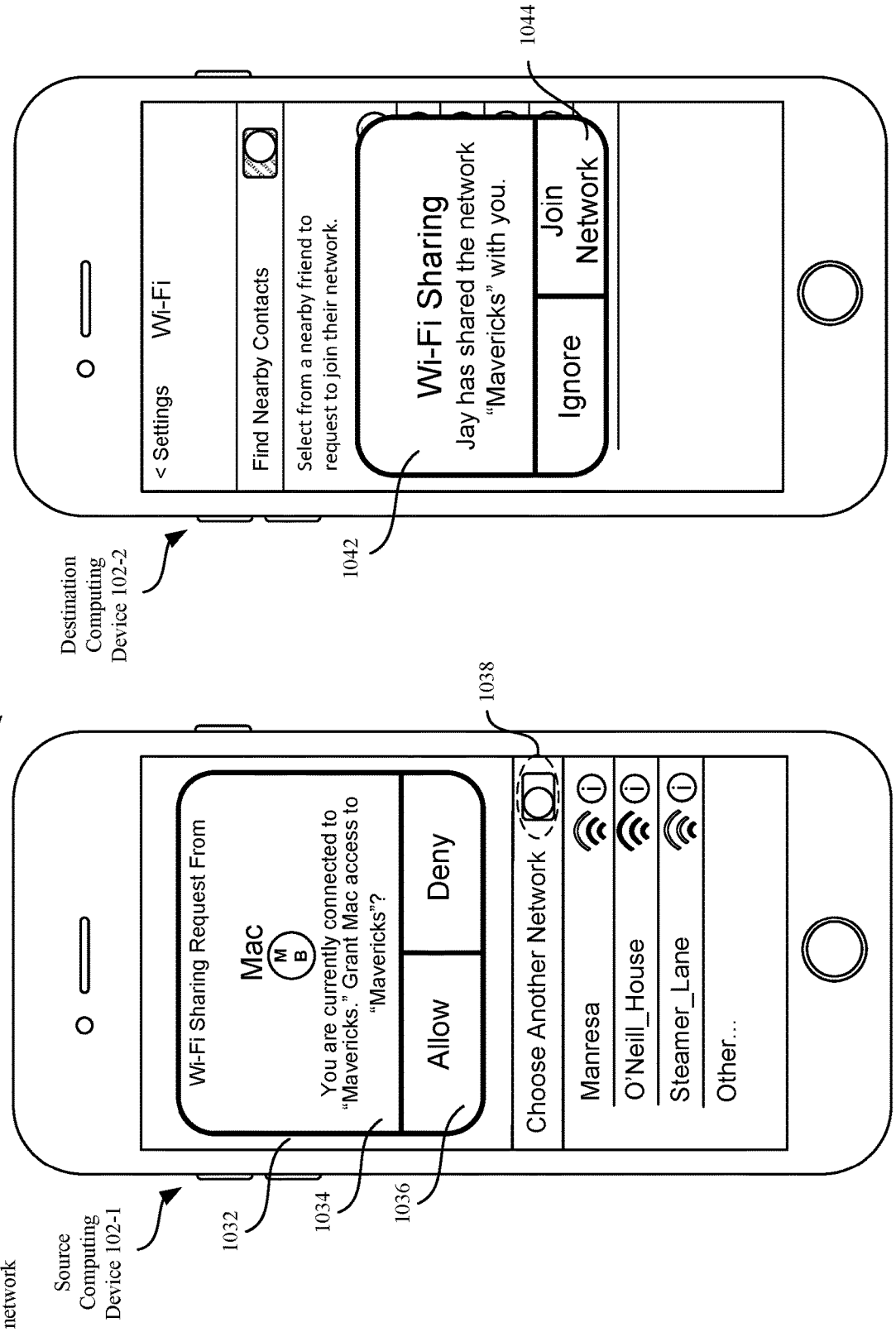

Turning now to the source computing device 102-1 as illustrated in step 1030 of FIG. 10C, the source computing device 102-1 can receive the request from the destination computing device 102-2. In response, the source computing device 102-1 can present a user interface 1032 that displays a notification 1034 to inquire whether the user of the source computing device 102-1 allows or denies a user ("Mac") of the destination computing device 102-2 to access an active wireless network ("Mavericks"). Additionally, the user interface 1032 can present a list of suggested alternative wireless networks 1038 ("Manresa," "O'Neill_House," "Steamer_Lane," or "Other") that the destination computing device 102-2 should access. In this manner, the user ("Jay") can select from either the active wireless network ("Mavericks") or from among the list of suggested alternative wireless networks 1038. Moreover, the list of suggested alternative wireless networks 1038 can present a respective signal strength for each of the alternative wireless networks to facilitate the user ("Jay") to make the selection. In turn, the user ("Jay") of the source computing device 102-1 can select an allow icon 1036 to send an inquiry to the destination computing device 102-2 to access the specific wireless network ("Mavericks").

Returning to the destination computing device 102-2 as illustrated in step 1040 of FIG. 10D, the destination computing device 102-2 can receive the acceptance from the source computing device 102-1. In turn, a user interface 1042 of the destination computing device 102-2 indicates to the user ("Mac") that the source computing device 102-1 has granted access to the specific wireless network ("Mavericks"). In turn, the user ("Jay") can select the join network icon 1044 to enable the destination computing device 102-2 to access this specific wireless network. It is noted that the user interfaces 1012, 1022, 1032, and 1042 illustrated in FIGS. 10A-10D are merely exemplary and that any user interface can be implemented at the computing devices 102-1,2 to provide the same or similar functionality.

Figure 11:
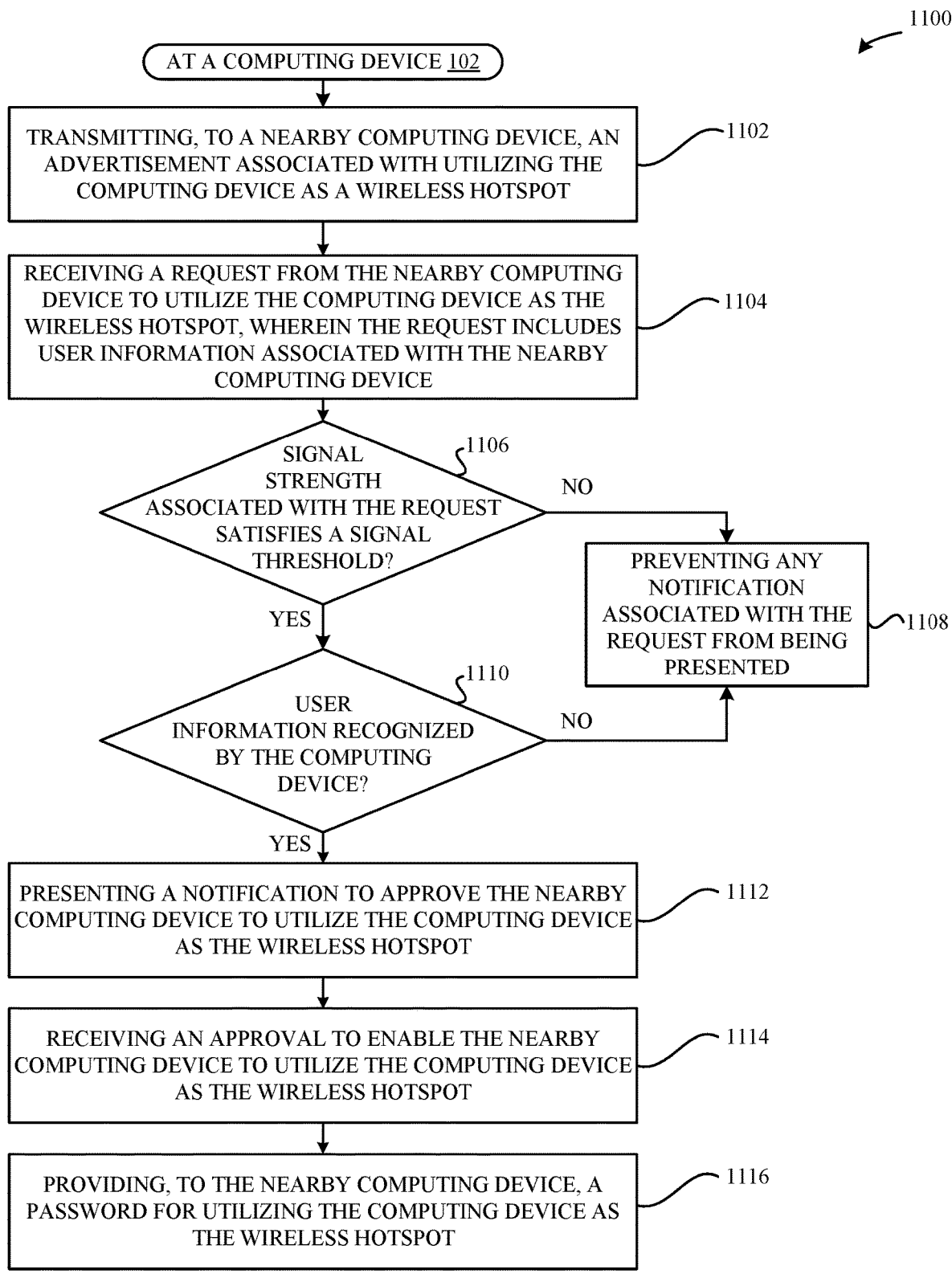
FIG. 11 illustrates a method for enabling a computing device to service a request to access a wireless hotspot, according to some embodiments.

FIG. 11 illustrates a method 1100 for servicing a request issued by a nearby computing device to utilize a computing device as a wireless hotspot, according to some embodiments. As illustrated in FIG. 11, the method 1100 begins at step 1102, where the computing device—e.g., a computing device 102-1—transmits an advertisement to a nearby computing device—e.g., the nearby computing device 102-2—to utilize the computing device 102-1 as a wireless hotspot. This can occur, for example, subsequent to the computing device 102-1 establishing a cellular data network connection. According to some examples, the computing device 102-1 can include a cellular communications component that is capable of establishing the cellular data network connection.

According to some examples, the computing device 102-1 can be associated with user information 120. In particular, the computing device 102-1 can utilize a hash algorithm (to which the nearby computing device 102-2 also has access to) to generate a unique hash value for the advertisement and the user information 120 that can be transmitted to the nearby computing device 102-2 as a hashed message. In turn, upon receiving the hashed message, the nearby computing device 102-2 can refer to a hash table that provides a correlation of the unique hash value to the user information 120 associated with the computing device 102-1 to identify the hashed advertisement as being provided by a known computing device 102 (e.g., a friend, a relative, a colleague, etc.). According to other examples, the computing device 102-1 can transmit the advertisement as an encrypted message. In particular, prior to transmitting the advertisement, the computing device 102-1 can provide the nearby computing device 102-2 with a device key 124 (e.g., an encryption key) associated with the computing device 102-1. Subsequently, when the nearby computing device 102-2 receives the encrypted message, the nearby computing device 102-2 can attempt to decrypt the contents of the encrypted message using the device keys 124 that are known (i.e., previously stored by) the nearby computing device 102-2. In either case, the privacy of the computing device 102-1 is enhanced as irrelevant/unknown computing devices 102 are unable to access the contents of the message.

In turn, at step 1104, the computing device 102-1 can receive a request from the nearby computing device 102-2 to utilize the computing device 102-1 as the wireless hotspot, where the request includes user information 120 associated with the nearby computing device 102-2.

At step 1106, the computing device 102-1 can determine whether a signal strength associated with the request satisfies a signal threshold. As previously described herein, the sharing manager 110 of the computing device 102-1 can interface with the wireless communications components to determine whether the signal strength of the request satisfies a requisite RSSI level to process the request. If the computing device 102-1 determines that the signal strength associated with the request does not satisfy the signal threshold, then the computing device 102-1 can prevent any notification associated with the request from being presented to a user of the computing device 102-1, as indicated by step 1108. Beneficially, the user of the computing device 102-1 is prevented from being bothered by unknown computing devices 102.

Alternatively, in step 1110, in response to the computing device 102-1 determining that the signal strength of the request satisfies the requisite RSSI level, the computing device 102-1 can determine whether the user information 120 included in the request is recognized by the computing device 102-1. In particular, the computing device 102-1 can identify whether a pre-existing relationship exists with the nearby computing device 102-2 by comparing the user information 120 included in the request to the contacts 122 managed by the computing device 102-1. Upon determining that the user information 120 is not included in the contacts 122, the computing device 102-1 can prevent any notification associated with the request from being presented to a user of the computing device 102-1, as indicated by step 1108.

Otherwise, at step 1112, when the computing device 102-1 determines that the user information 120 is included in its contacts 122, the computing device 102-1 can present a notification to inquire about whether the user of the computing device 102-1 approves of granting the nearby computing device 102-2 access to utilize the computing device 102-1 as the wireless hotspot. In one example, the notification presented to the user can include a contact card having, for example, a first name, a photo, etc., to inform the user of an identity of the nearby computing device 102-2 (and the user who presumably is operating it).

At step 1114, the computing device 102-1 can receive an approval from the user to enable the nearby computing device 102-2 to utilize the computing device 102-1 as the wireless hotspot. In turn, as indicated by step 1116, the computing device 102-1 can provide authentication credentials 136 (e.g., a password, etc.), which can be used by the nearby computing device 102-2 to authenticate with and gain access to the wireless hotspot.

Figure 12:
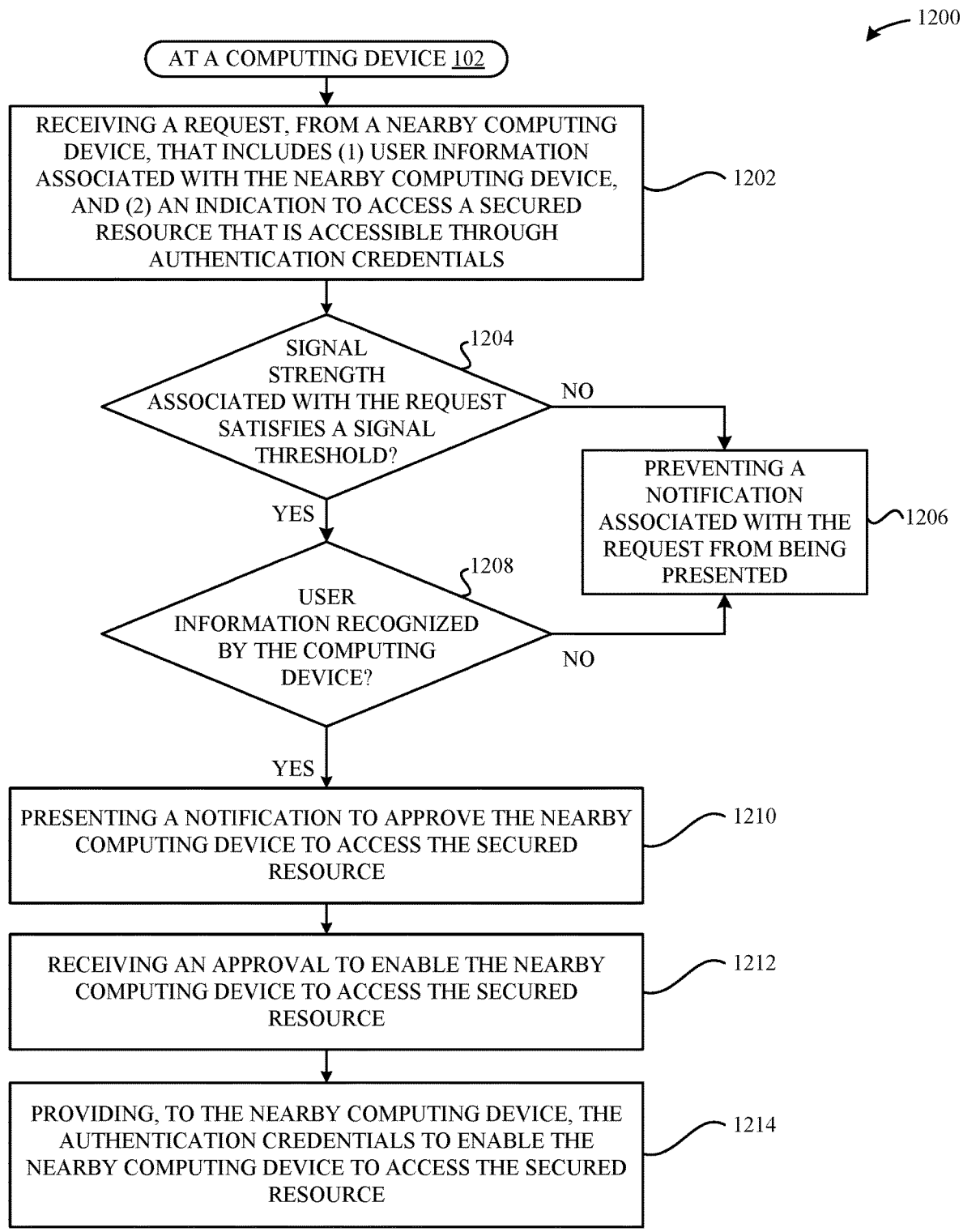
FIG. 12 illustrates a method for enabling a computing device to access a secured resource, according to some embodiments.

FIG. 12 illustrates a method 1200 for servicing a request by a nearby computing device to gain access to a secured resource that is managed by a computing device 102-1, according to some embodiments. As illustrated in FIG. 12, the method 1200 begins at step 1202 where the computing device—e.g., the computing device 102-1—receives a request from a nearby computing device—e.g., a nearby computing device 102-2—to access the secured resource through authentication credentials, where the request includes user information 120 associated with the nearby computing device 102-2 and an indication to access the secured resource. According to some examples, the nearby computing device 102-2 can attempt to access the secured resource via a secured application that is established at the nearby computing device 102-2 and/or an encrypted website. In particular, the secured resource can refer to a user account associated with an online bank account, a user account associated with a social network profile, a user account associated with a digital media item service, and the like.

According to some embodiments, the computing device 102-1 can receive the request from the nearby computing device 102-2 when the nearby computing device 102-2 presents a user interface that prompts for authentication credentials (e.g., user name, password, passcode, security question/answer, etc.) in order for the nearby computing device 102-2 to access the secured resource. In conjunction with presenting the user interface, the nearby computing device 102-2 can transmit the request to the computing device 102-1 to access the secured resource. According to some examples, the request can be transmitted to the computing device 102-1 as a hashed message, whereupon the computing device 102-1 can refer to a hash table that provides a correlation of the unique hash value to the user information 120 associated with the nearby computing device 102-2 to identify the hashed message as being provided by a known computing device 102 (e.g., a friend, a relative, a colleague, etc.). According to other examples, the request can be transmitted to the computing device 102-1 as an encrypted message, whereupon the computing device 102-1 can attempt to decrypt the contents of the encrypted message using the device keys 124 that are known (i.e., previously stored by) the computing device 102-1. In either case, the privacy of the nearby computing device 102-2 is enhanced as irrelevant/unknown computing devices 102 are unable to access the contents of the message.

At step 1204, the computing device 102-1 can determine whether a signal strength associated with the request satisfies a signal threshold. As previously described herein, the sharing manager 110 of the computing device 102-1 can interface with the wireless communications components to determine whether the signal strength of the request satisfies a requisite RSSI level to process the request. If the computing device 102-1 determines that the signal strength associated with the request does not satisfy the signal threshold, then the computing device 102-1 can prevent any notification associated with the request from being presented to a user of the computing device 102-1, as indicated by step 1206. This can beneficially prevent the user of the computing device 102-1 from being bothered by unknown/irrelevant computing devices 102.

Alternatively, in response to the computing device 102-1 determining that the signal strength of the request satisfies the requisite RSSI level, the computing device 102-1 can determine whether the user information 120 included in the request is recognized by the computing device 102-1, as indicated by step 1208. In particular, the computing device 102-1 can identify whether a pre-existing relationship exists with the nearby computing device 102-2 by comparing the user information 120 included in the request to the contacts 122 managed by the computing device 102-1. Upon determining that the user information 120 is not included in the contacts 122, the computing device 102-1 can prevent any notification associated with the request from being presented to a user of the computing device 102-1, as indicated by step 1206.

Otherwise, at step 1210, when the computing device 102-1 determines that the user information 120 is included in its contacts 122, the computing device 102-1 can present a notification to inquire about whether the user of the computing device 102-1 approves of granting the nearby computing device 102-2 access to the secured resource. In one example, the notification presented to the user can include a contact card having, for example, a first name, a photo, etc., to inform the user of an identity of the nearby computing device 102-2 (and the user who presumably is operating it).

At step 1212, the computing device 102-1 can receive an approval from the user to enable the nearby computing device 102-2 to access the secured resource. In turn, as indicated by step 1214, the computing device 102-1 can provide authentication credentials 136 (e.g., a user name, a password, etc.), which can be used by the nearby computing device 102-2 to authenticate with and gain access to the secured resource. According to some examples, the authentication credentials 136 can be bundled with a temporal limit indication such that the authentication credentials 136 will expire after a predetermined amount of time.

Figure 13:
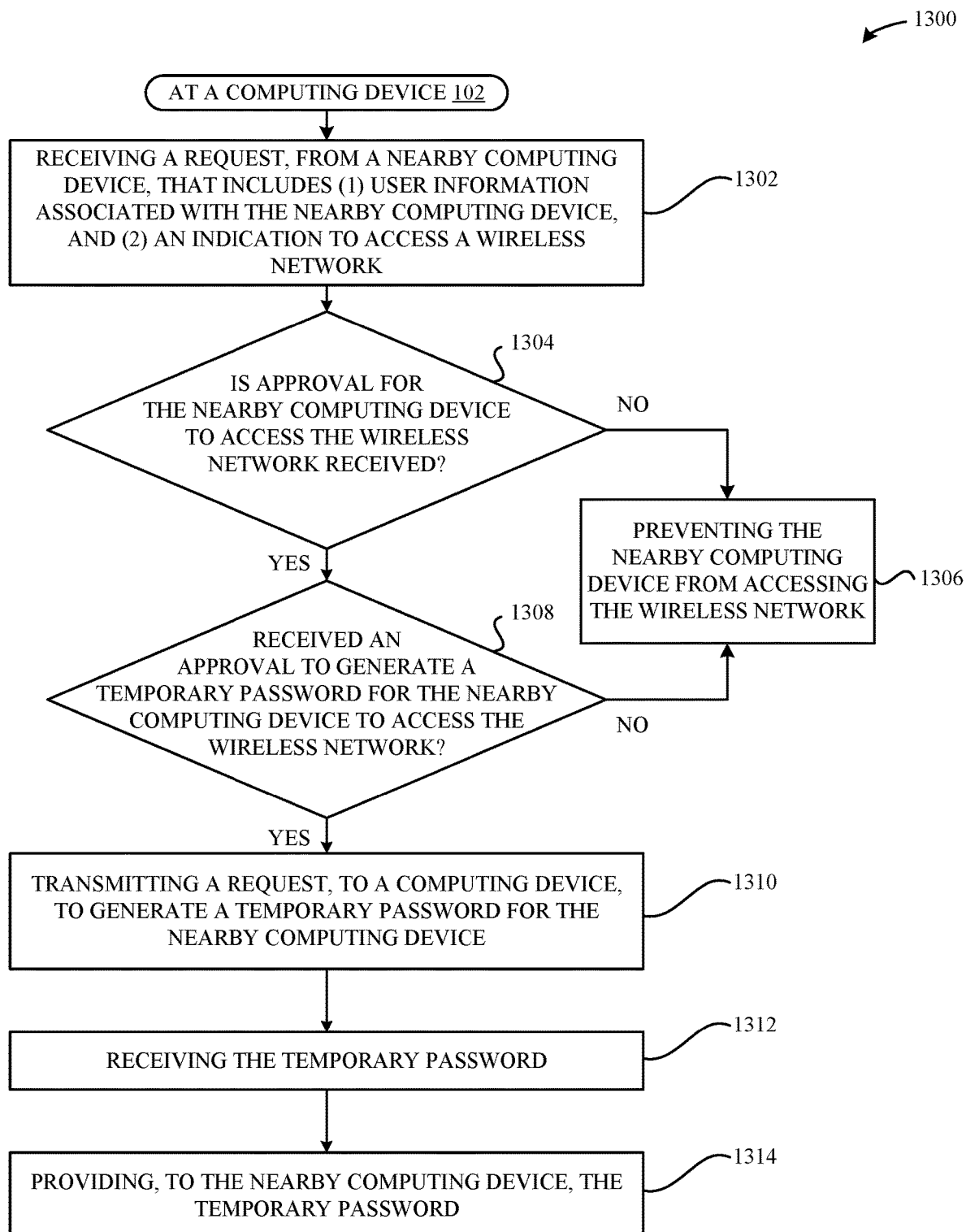
FIG. 13 illustrates a method for servicing a request issued by a nearby computing device to access a wireless network by providing the nearby computing device with a temporary password, according to some embodiments.

FIG. 13 illustrates a method 1300 for servicing a request issued by a nearby computing device to access a wireless network by providing the nearby computing device with a temporary password, according to some embodiments. As illustrated in FIG. 13, the method 1300 begins at step 1302, where a computing device—e.g., a computing device 102-1—receives a request from a nearby computing device—e.g., a nearby computing device 102-2—that includes user information 120 associated with the nearby computing device 102-2 and an indication that the nearby computing device 102-2 is seeking to access a wireless network 130.

According to some examples, the request can be transmitted to the computing device 102-1 as a hashed message, whereupon the computing device 102-1 can refer to a hash table that provides a correlation of a unique hash value of the user information 120 associated with the nearby computing device 102-2 to identify the hashed message as being provided by a known computing device 102 (e.g., a friend, a relative, a colleague, etc.). According to other examples, the request can be transmitted to the computing device 102-1 as an encrypted message, whereupon the computing device 102-1 can attempt to decrypt the contents of the encrypted message using the device keys 124 that are known (i.e., previously stored by) the computing device 102-1. In either case, the privacy of the nearby computing device 102-2 is enhanced as irrelevant/unknown computing devices 102 are unable to access the contents of the message.

According to some examples, upon receiving the request, the computing device 102-1 can determine whether a signal strength associated with the request satisfies a signal threshold. As previously described herein, if the computing device 102-1 determines that the signal strength associated with the request does not satisfy the signal threshold, then the computing device 102-1 can prevent any notification associated with the request from being presented to a user of the computing device 102-1. Additionally, the computing device 102-1 can determine whether the user information 120 included within the request is included in its contacts 122. In response to determining that the user information 120 is included in its contacts 122, the computing device 102-1 can present a notification to inquire about whether the user of the computing device 102-1 approves of granting the nearby computing device 102-2 access to the wireless network 130.

Subsequent to providing the notification to the user of the computing device 102-1, at step 1304, the computing device 102-1 can determine whether approval is received from the user to enable the nearby computing device 102-2 to access wireless network 130. If the computing device 102-1 determines that the approval from the user has not been received, then the computing device 102-1 can prevent the nearby computing device 102-2 from accessing the wireless network 130, as indicated by step 1306.

Alternatively, at step 1308, in response to the computing device 102-1 determining that the approval from the user is received, then the computing device 102-1 can determine whether approval is received from the user to generate a temporary password for the nearby computing device 102-2 to access the wireless network 130. In particular, subsequent to receiving the approval from the user, the computing device 102-1 can present a notification to inquire about whether the user desires to restrict an amount of time that the nearby computing device 102-2 has access to the wireless network 130.

In turn, as indicated by step 1310, the computing device 102-1 can transmit a request to a computing device to generate a temporary password for the nearby computing device 102-2 to access the wireless network 130. According to some examples, the computing device can refer to one or more server devices to which the computing device 102-1 can interface with directly. According to other examples, the computing device can refer to a wireless router that is associated with the wireless network 130 to which the computing device 102-1 can interface with directly. According to other examples, the computing device can refer to the computing device 102-1 itself.

At step 1312, the computing device 102-1 can receive the temporary password from the computing device. According to some embodiments, the temporary password can be retrieved from a collection of pre-existing temporary passwords that are established at the computing device and purposed specifically for guests to access the wireless network 130. In particular, when the temporary passwords are at least one of generated, received from the computing device, or transmitted to the nearby computing device 102-2, the temporary passwords can be bundled with a bit flag (e.g., temporal limit indication). For example, the temporal limit indication can stipulate that the temporary password will remain valid for use by the nearby computing device 102-2 for a period of only 48 hours. In this manner, after the period of 48 hours lapses, the computing device can render the temporary password invalid for accessing the wireless network 130. According to some embodiments, the temporary passwords can be generated by the computing device in response to receiving the request from the computing device 102-1. In particular, the temporary passwords can be bundled with the bit flag that provides instructions for the temporary password to expire after the nearby computing device 102-2 is no longer using the password, such as when the nearby computing device 102-2 has not accessed the wireless network 130 for a predetermined amount of time (e.g., 24 hours). According to some embodiments, the computing device, such as a wireless router associated with the wireless network 130, can regulate access to the wireless network 130 by continually updating a complete list of authorized passwords that can be used by the nearby computing device 102-2 to access the wireless network 130. In response to the computing device 102-1 requesting a temporary password, the wireless router can generate and provide the computing device 102-1 with the temporary password while also updating the complete list of authorized passwords with the recently generated temporary password. The wireless router can be configured to establish a temporal time limit that stipulates how long the temporary password will remain valid. Subsequent to the expiration of the temporal time limit, the wireless router can be configured to remove the temporary password from the complete list of authorized passwords.

Subsequently, at step 1314, the computing device 102-1 can directly or indirectly (e.g., via the computing device) provide the nearby computing device 102-2 with the temporary password to enable the nearby computing device 102-2 to access the wireless network 130.

Figure 14:
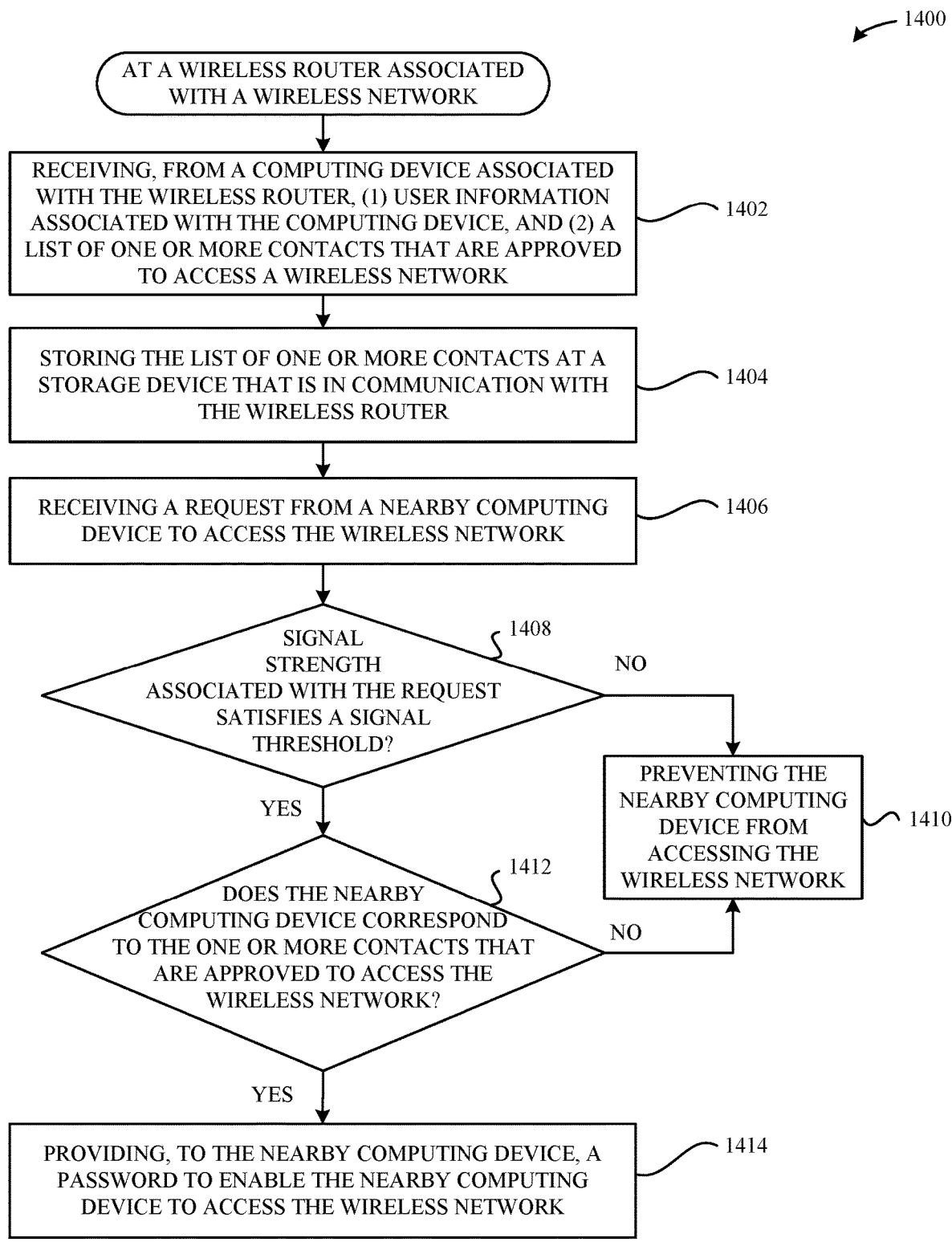
FIG. 14 illustrates a method for enabling a wireless router to provide a computing device with access to a wireless network, according to some embodiments.

FIG. 14 illustrates a method 1400 for enabling a wireless router to provide a nearby computing device with access to a wireless network, according to some embodiments. As illustrated in FIG. 14, the method 1400 begins at step 1402, where the wireless router associated with a wireless network 130 receives a request from a computing device—e.g., a computing device 102-1—where the request includes user information 120 associated with the computing device 102-1 and a list of one or more contacts 122 that are approved by a user of the computing device 102-1 to access the wireless network 130. This can occur, for example, when the user of the computing device 102-1 desires to grant a nearby computing device—e.g., the nearby computing device 102-2—access to the wireless network 130, but is not in geographical proximity to the wireless network 130 to be capable of servicing a request by the nearby computing device 102-2 to access the wireless network 130. According to some embodiments, the wireless router can utilize the user information 120 to determine whether the request was provided by a known computing device 102 (i.e., a user having authority to grant computing devices 102 access to the wireless network 130).

In turn, at step 1404, in response to determining that the computing device 102-1 is known or recognized, the wireless router can store the list of the one or more contacts 122 that are approved to access the wireless network 130 at a storage device that is in communication with the wireless network 130. Additionally, the computing device 102-1 can establish the list of the one or more contacts 122 that are approved to access the wireless network 130 through a user account, e.g., a user ID associated with a single sign-on service that is associated with the computing device 102-1, in order to enable the computing device 102-1 and/or the wireless router to retrieve the list of contacts 122 whom are approved to access the wireless network 130. Accordingly, in some examples, the wireless router may not require that the computing device 102-1 provide the wireless router with the list of the one or more contacts as the wireless router can instead retrieve this list from the user account.

Subsequently, at step 1406, the wireless router can receive a request from the nearby computing device 102-2 to access the wireless network 130. According to some embodiments, the request includes user information 120 associated with the nearby computing device 102-2 and an indication to access the wireless network 130. According to some examples, the request can be transmitted to the wireless router as a hashed message. According to some examples, the request can be transmitted to the wireless router as an encrypted message.

At step 1408, the wireless router can determine whether a signal strength associated with the request satisfies a signal threshold. In some examples, the wireless router can be capable of establishing a geo-fence having a physical proximity threshold. The wireless router can determine whether a signal strength of the request satisfies a requisite RSSI level to process the request. If the wireless router determines that the signal strength associated with the request does not satisfy the signal threshold, then the wireless router can prevent the nearby computing device 102-2 from accessing the wireless network 130, as indicated by step 1410.

Alternatively, at step 1412, in response to the wireless router determining that the signal strength of the request satisfies the requisite RSSI level, the wireless router can determine whether the user information 120 included in the request corresponds to the one or more contacts 122 that are approved to access the wireless network 130. In particular, the wireless router can compare the user information 120 included in the request to the contacts 122 provided in the list of the one or more contacts. Upon determining that the user information 120 is not included in the contacts 122, the wireless router can prevent the nearby computing device 102-2 to access the wireless network 130, as indicated by step 1410.

Otherwise, at step 1414, when the wireless router determines that the user information 120 provided in the request is included in the list of the one or more contacts that are approved to access the wireless network 130, the wireless network can provide authentication credentials 136 (e.g., a user name, a password, etc.), which can be used by the nearby computing device 102-2 to authenticate with and gain access to the wireless network 130. According to some embodiments, and as described herein, the wireless router can be capable of providing the nearby computing device 102-2 with a temporary password that can be bundled with a temporal limit indication such that the temporary password will remain valid for use by the nearby computing device 102-2 for a limited duration of time.

Figure 15:
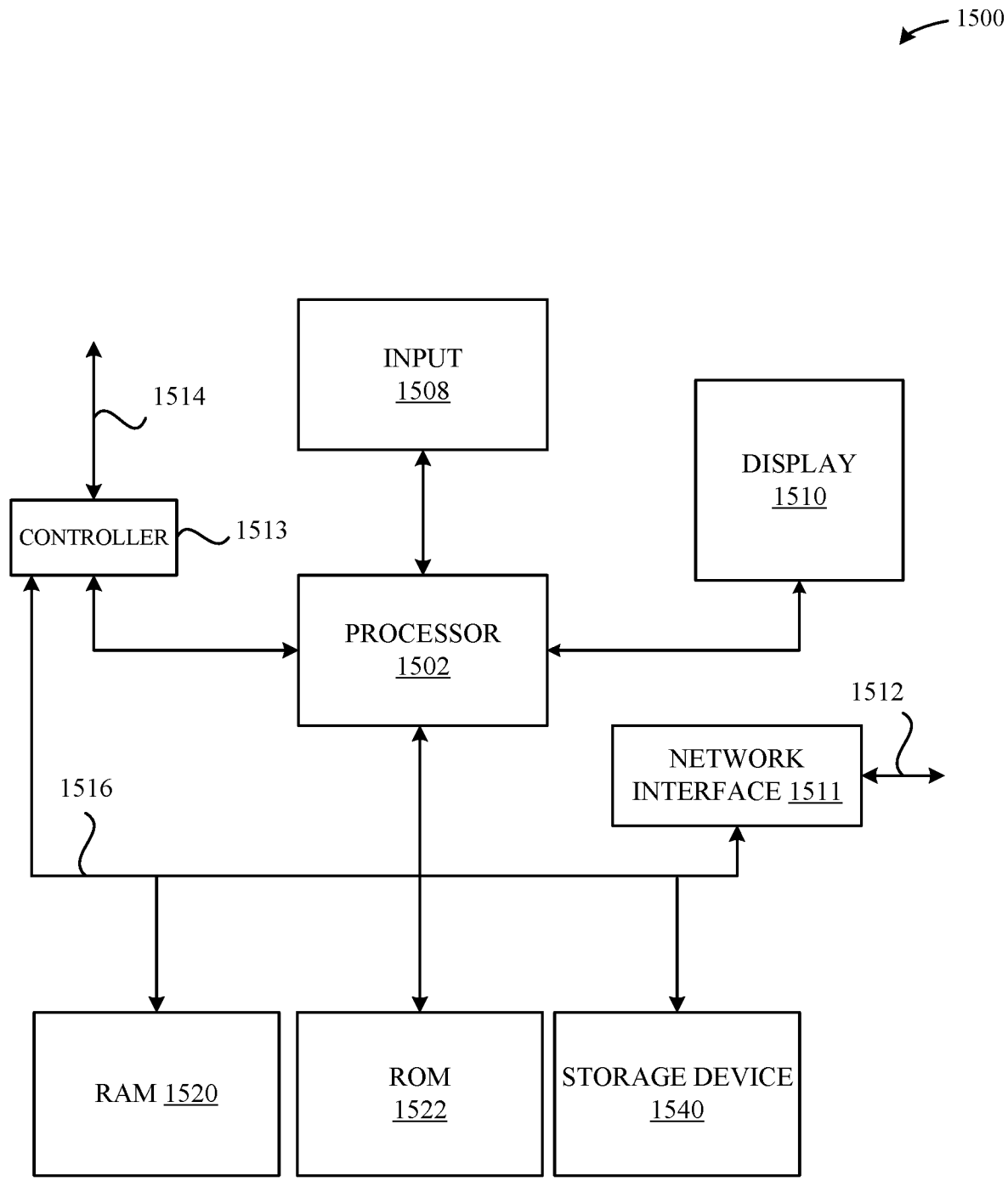
FIG. 15 illustrates a detailed view of a computing device that can be configured to implement the various techniques described herein, according to some embodiments.

FIG. 15 illustrates a detailed view of a computing device 1500 that can represent the different computing devices of FIG. 1 used to implement the various techniques described herein, according to some embodiments. For example, the detailed view illustrates various components that can be included in the computing devices (e.g., 102-1 through 102-N) described in conjunction with FIG. 1. As illustrated in FIG. 15, the computing device 1500 can include a processor 1502 that represents a microprocessor or controller for controlling the overall operation of the computing device 1500. The computing device 1500 can also include a user input device 1508 that allows a user of the computing device 1500 to interact with the computing device 1500. For example, the user input device 1508 can take a variety of forms, such as a button, keypad, dial, touch screen, audio input interface, visual/image capture input interface, input in the form of sensor data, and so on. Still further, the computing device 1500 can include a display 1510 that can be controlled by the processor 1502 (e.g., via a graphics component) to display information to the user. A data bus 1516 can facilitate data transfer between at least a storage device 1540, the processor 1502, and a controller 1513. The controller 1513 can be used to interface with and control different equipment through an equipment control bus 1514. The computing device 1500 can also include a network/bus interface 1511 that couples to a data link 1512. In the case of a wireless connection, the network/bus interface 1511 can include a wireless transceiver.

As noted above, the computing device 1500 also includes the storage device 1540, which can comprise a single disk or a collection of disks (e.g., hard drives). In some embodiments, storage device 1540 can include flash memory, semiconductor (solid state) memory or the like. The computing device 1500 can also include a Random-Access Memory (RAM) 1520 and a Read-Only Memory (ROM) 1522. The ROM 1522 can store programs, utilities or processes to be executed in a non-volatile manner. The RAM 1520 can provide volatile data storage, and stores instructions related to the operation of applications executing on the computing device 1500.

Figure 16A:
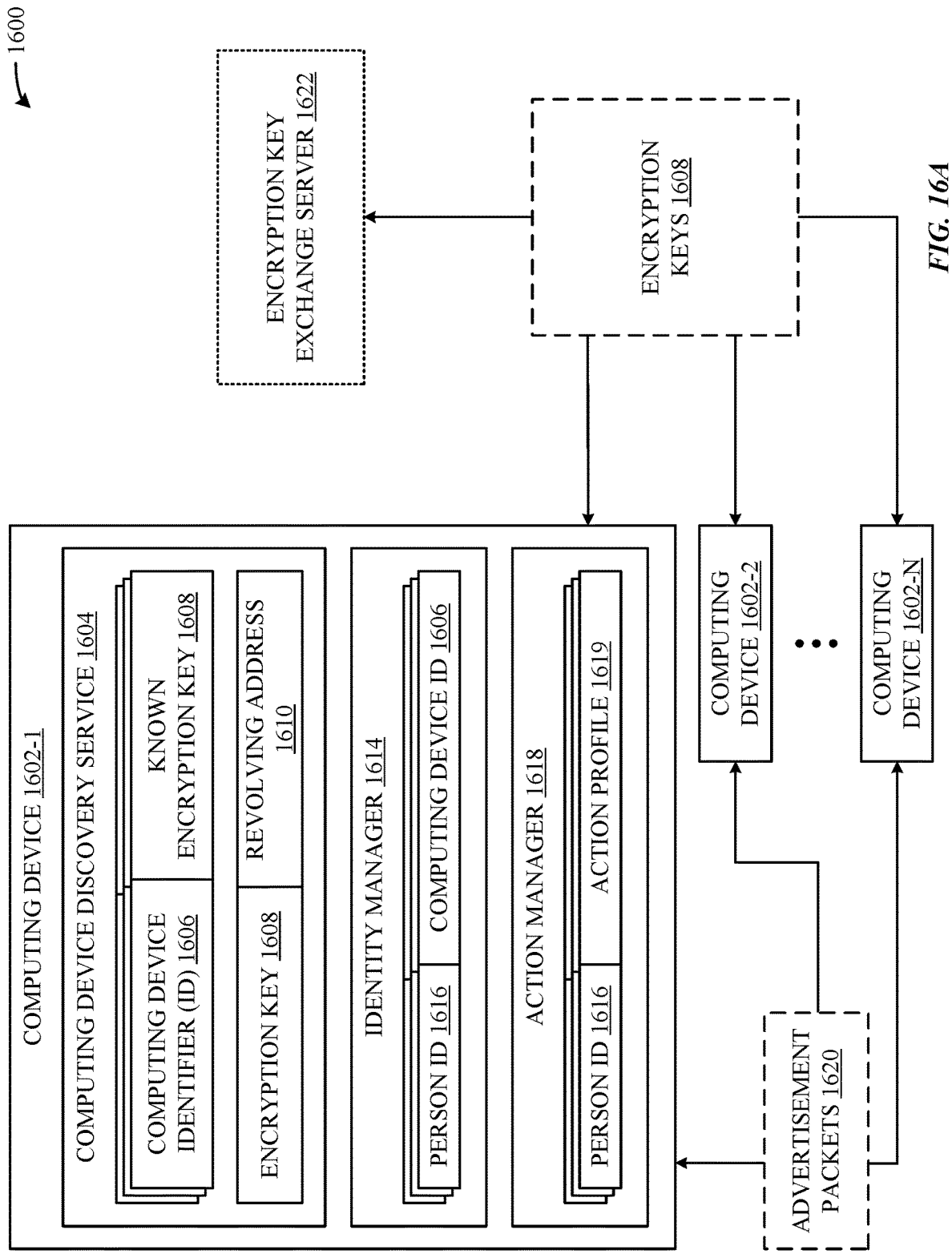
FIG. 16A illustrates a block diagram of various computing devices that can be configured to identify when they are in proximity to one another, according to some embodiments.

Additionally, FIG. 16A illustrates a block diagram 1600 of various computing devices 1602 that can be configured to identify when they are in proximity to one another, according to some embodiments. As shown in FIG. 16A, each computing device 1602 can include a computing device discovery service 1604, an identity manager 1614, and an action manager 1618. It is noted that these software entities can be separated into additional entities or combined into fewer entities without departing from the scope of this disclosure. According to some embodiments, and as described in greater detail herein, these software entities can execute on each of the computing devices 1602 and cause advertisement packets 1620 to be periodically transmitted by the computing device 1602. In particular, the advertisement packets 1620 can be specific to the computing device 1602, and can be detected and processed by nearby computing devices 1602—if any—that have been authorized to identify when the computing device 1602 is in proximity. In turn, the nearby computing device 1602 can perform at least one action in response to detecting that the computing device 1602 is in proximity to the nearby computing device 1602.

To implement the foregoing techniques, the computing device discovery service 1604 (executing on a given computing device 1602) can be configured to generate and/or manage an encryption key 1608 that is specific to the computing device 1602. According to some embodiments, and as described in greater detail herein, the encryption key 1608 can be dynamic in nature and replaced with an updated encryption key 1608 under appropriate scenarios—e.g., when modifying the computing devices 1602 that are authorized to detect when the computing device 1602 is nearby. Additionally, the computing device 1602 can be configured to manage a revolving address 1610 that is utilized as a basis for transmitting the advertisement packets 1620. According to some embodiments, the revolving address 1610 can be any arbitrary value, e.g., a randomly-generated number, a number derived from a communications address associated with the computing device 1602, and so on. According to some embodiments, and as described in greater detail herein, the revolving address 1610 can be dynamic in nature, e.g., the revolving address 1610 can be updated on a periodic basis (e.g., every fifteen minutes). Beneficially, these periodic updates can make it difficult for malicious parties to track the computing devices 1602.

As shown in FIG. 16A, the computing device discovery service 1604 (e.g., executing on a first computing device 1602) can be configured to manage an entry (e.g., using any data structure) for each computing device 1602 that the first computing device 1602 is authorized to detect when in proximity. In particular, each entry associates at least (1) a computing device ID 1606 (that corresponds to a particular computing device 1602) with (2) a "known" encryption key 1608 (that also corresponds to the particular computing device 1602). It is noted that the known encryption key 1608 for a given computing device 1602 represents the encryption key 1608 that is generated/managed by the computing device 1602 and provided to other computing devices 1602 that are authorized to detect when the given computing device 1602 is in proximity.

As described in greater detail herein, any known approach for sharing encryption keys 1608 between computing devices 1602 can be implemented without departing from the scope of this disclosure. For example, the encryption keys 1608 can be shared by way of an encryption key exchange server 1622 that is configured to communicate with the computing devices 1602 and orchestrate the manner in which the encryption keys 1608 are shared. In another example, the encryption keys 1608 can be shared directly between computing devices 1602 without involvement of the encryption key exchange server 1622. A more detailed breakdown of the manner in which the encryption keys 1608 can be shared between the computing devices 1602 is described below in greater detail in conjunction with FIGS. 16B-16C.

According to some embodiments, and as described in greater detail herein, each computing device 1602 can be configured to utilize its respective encryption key 1608 to periodically generate and transmit advertisement packets 1620 that are specific to the computing device 1602. In this regard, when a computing device 1602 receives an advertisement packet 1620 from a nearby computing device 1602, the computing device 1602 can iterate through its known encryption keys 1608 to identify a known encryption key 1608—if any—that (1) corresponds to the nearby computing device 1602, and (2) can be used to verify the advertisement packet 1620. In turn, the computing device 1602 can identify the computing device ID 1606 that corresponds to the identified known encryption key 1608 (associated with the nearby computing device 1602). In this regard, the computing device 1602 is able to understand, at a high level, that the nearby computing device 1602 is in proximity. According to some embodiments, and as described in greater detail herein, such an understanding can provoke the computing device 1602 to (1) identify a specific person who is associated with the nearby computing device 1602, and (2) whether any action should be taken by the computing device 1602.

Additionally, and as shown in FIG. 16A, the identity manager 1614 can be configured to manage a number of entries (e.g., using any data structure), where each entry associates at least (1) a person ID 1616 (that corresponds to a specific individual) with (2) a computing device ID 1606 (that is associated with the specific individual). According to some embodiments, this data can be established in conjunction with sharing encryption keys 1608 between the computing devices 1602. For example, a first individual authorizing a second individual to identify when the first individual is in proximity to the second individual can involve: (1) a provision of the respective known encryption keys 1608 (of all the computing devices 1602 belonging to the first individual) to all the computing devices 1602 (belonging to the second individual), and (2) a provision of the person ID 1616 (belonging to the first individual) to all the computing devices 1602 (belonging to the second individual). In this manner, the computing devices 1602 belonging to the second individual are able to populate their respective device discovery services 1604/identity managers 1614 with the information illustrated in FIG. 16A, thereby enabling the computing devices 1602 to detect when the computing devices 1602 of the first individual are in proximity.

It is noted that the foregoing scenario is merely exemplary, and that the embodiments do not require individuals to enable all of their computing devices 1602 to be discovered by all of the computing devices 1602 of authorized individuals. On the contrary, the embodiments can enable specific computing devices 1602 of an individual to be selected as discoverable by (1) all devices of a different individual, or (2) specific devices of the different individual, without departing from the scope of this disclosure.

According to some embodiments, the computing device discovery service 1604 can be configured to interface with the identity manager 1614 any time a computing device ID 1606 of a known/nearby computing device 1602 is identified (as described herein). In particular, the computing device discovery service 1604 can be configured to provide the computing device ID 1606 to the identity manager 1614 so that the identity manager 1614 can effectively locate a person ID 1616 that corresponds an individual associated with the computing device ID 1606 (e.g., an owner of the computing device 1602 that corresponds to the computing device ID 1606). In turn, and according to some embodiments, the identity manager 1614 can be configured to provide the person ID 1616 to the action manager 1618 to enable the action manager 1618 to identify an action profile 1619 (if any) that is assigned to the person ID 1616.

According to some embodiments, an action profile 1619 can represent a collection of parameters that dictate how the computing device 1602 should respond when a known computing device 1602 (associated with the person ID 1616) is within proximity. For example, the collection of parameters can indicate that an alert should be displayed on the computing device 1602 indicating that the individual who corresponds to the person ID 1616 is in proximity. In another example, the collection of parameters can indicate that specific settings of the computing device 1602—e.g., notification settings—should be updated. It is noted that the foregoing examples are not meant to represent an exhaustive list, and that any known category of action—at any level of granularity—can be defined by a given action profile 1619 without departing from the scope of this disclosure.

Accordingly, FIG. 16A illustrates a high-level overview of an example architecture that can be utilized to enable computing devices 1602 to be aware of one another under proximity conditions while preserving privacy. A more detailed explanation of the manner in which encryption keys 1608 can be exchanged between the computing devices 1602 will now be described below in greater detail in conjunction with FIGS. 16B-16C.

Figure 16B:
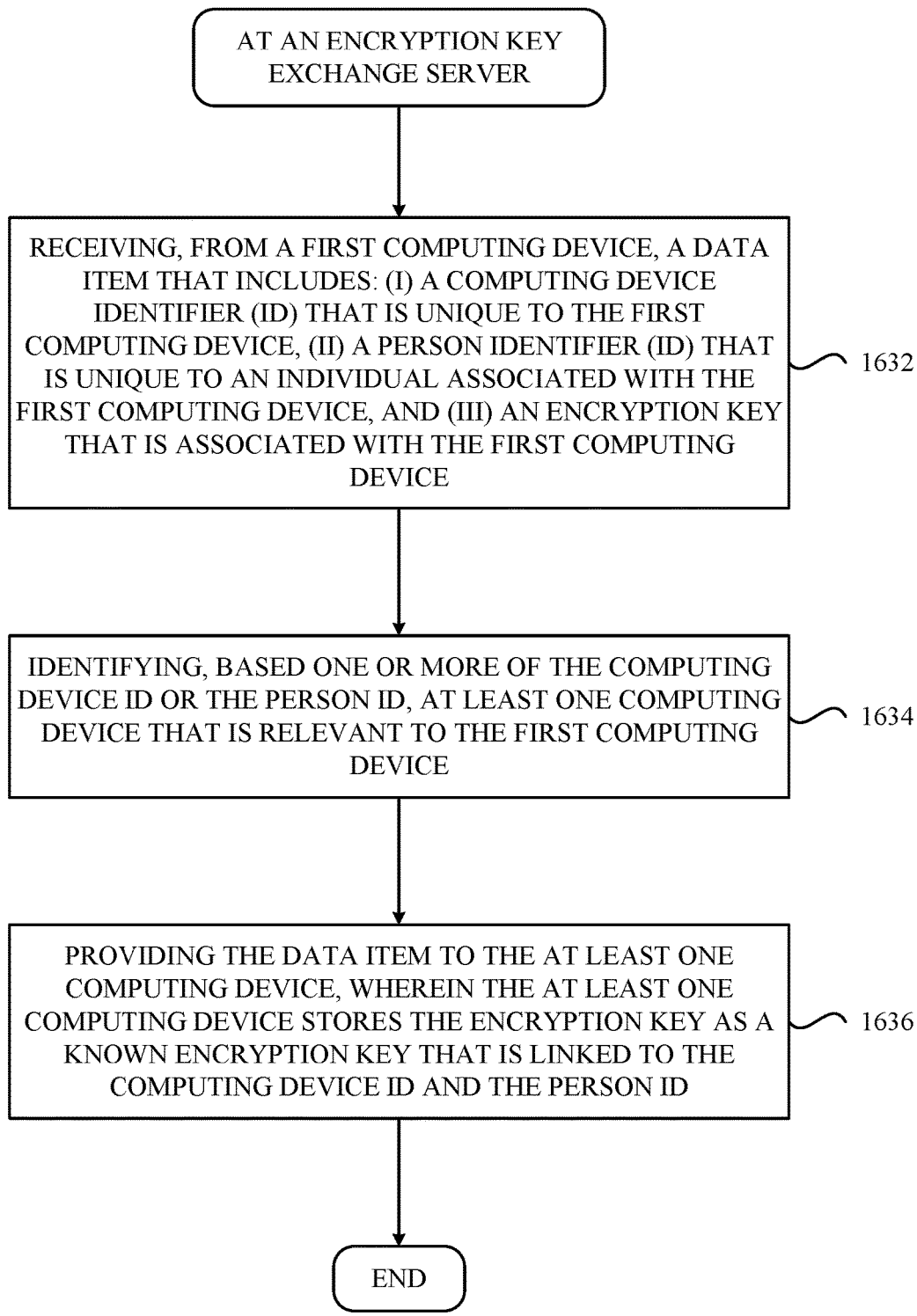
FIG. 16B illustrates a method for enabling computing devices to exchange encryption keys with one another by way of an encryption key exchange server, according to some embodiments.

FIG. 16B illustrates a method 1630 for enabling computing devices 1602 to exchange encryption keys 1608 with one another by way of the encryption key exchange server 1622, according to some embodiments. In particular, the method 1630 can be implemented by the encryption key exchange server 1622 to enable the computing devices 1602 to indirectly exchange encryption keys 1608 with one another, according to some embodiments. As shown in FIG. 16B, the method 1630 begins at step 1632, where the encryption key exchange server 1622 receives, from a first computing device 1602, a data item that includes: (i) a computing device ID 1606 that is unique to the first computing device 1602, (ii) a person ID 1616 that is unique to an individual associated with the first computing device 1602, and (iii) an encryption key 1608 that is associated with the first computing device 1602.

It is noted that the first computing device 1602 can be configured to provide the data item to the encryption key exchange server 1622 in response to any condition being satisfied at the encryption key exchange server 1622, the first computing device 1602, and/or elsewhere. For example, the encryption key exchange server 1622 can possess information associated with the first computing device 1602—e.g., the computing device ID 1606, the person ID 1616, etc.— such that the encryption key exchange server 1622 can identify when it is appropriate to query the computing device 1602 for the data item. This can occur, for example, when the encryption key exchange server 1622 receives a request to add the person ID 1616 to a family account that is associated with at least one different person ID 1616. In turn, the encryption key exchange server 1622 can be configured to parse a data structure (not illustrated in FIG. 16A) that identifies the computing device IDs 1606 for all the computing devices 1602 that are associated with the person ID 1616. Subsequently, the encryption key exchange server 1622 can query each of the computing devices 1602 for their respective data items, and forward their respective data items to all the computing devices 1602 associated with the at least one different person ID 1616. Additionally, the encryption key exchange server 1622 can be configured to query all the computing devices 1602 associated with the at least one different person ID 1616 for their respective data items, and forward their respective data items to the computing devices 1602 associated with the person ID 1616.

It is noted that the foregoing scenario is exemplary, and that any approach for authorizing the exchange of encryption keys 1608 between computing devices 1602 can be implemented by the encryption key exchange server 1622 without departing from the scope of this disclosure. For example, a first user operating a first computing device 1602 can navigate through their contacts (e.g., via a user interface displayed on the first computing device 1602) to identify a second user that the first user would like to be aware of when the second user is in proximity to the first user. In turn, the first computing device 1602 can issue a request to the encryption key exchange server 1622 that includes the person ID 1616 (and/or one or more computing device IDs 1606, if available) associated with the second user. Subsequently, the encryption key exchange server 1622 can utilize the information included in the request to prompt the second user for permission to enable the first user to be aware of their proximity. This can involve, for example, the encryption key exchange server 1622 identifying all (or a subset) of the computing devices 1602 associated with the second user, and causing the computing devices 1602 to display a prompt (e.g., via user interfaces displayed at the computing devices 1602) that indicates the first user would like to be aware of when the second user is in proximity to the first user. In turn, the second user can select all (or a subset) of the computing devices 1602 associated with the second user that the first computing device 1602 is authorized to be aware of when the computing devices 1602 are in proximity to the first computing device 1602.

In another example, the encryption key exchange server 1622 can be configured to analyze the interactions between users to identify conditions in which it is prudent to suggest that users authorize one another to be aware of their proximities. For example, the encryption key exchange server 1622 can be configured to analyze interactions that take place between a first individual and a second individual, and suggest that they authorize one another to be aware of their proximities. In yet another example, the encryption key exchange server 1622 can analyze existing relationships between individuals to identify conditions to provide suggestions. For example, information about an employment relationship between a first individual and a second individual can indicate that it would be beneficial for the individuals to be aware of when they are in proximity. In another example, hierarchical relationship information between a group of individuals—e.g., a small, medium, or large business—can indicate that it would be beneficial for different ones of the individuals to be aware of when they are in proximity. Again, it is noted that the foregoing examples are merely exemplary, and that the encryption key exchange server 1622 can identify any condition in which it can be beneficial for individuals to share their proximities with one another. It is additionally noted that the computing devices 1602 can perform the same and/or additional analyses as the encryption key exchange server 1622 without departing from the scope of this disclosure.

Returning now to the method 1630, at step 1634, the encryption key exchange server 1622 identifies, based one or more of the computing device ID 1606 or the person ID 1616, at least one computing device 1602 that is relevant to the first computing device 1602. At step 1636, the encryption key exchange server 1622 provides the data item to the at least one computing device 1602, where the at least one computing device 1602 stores the encryption key 1608 as a known encryption key 1608 that is linked to the computing device ID 1606 and the person ID 1616.

It is noted that all or a subset of the method 1630 can be repeated in conjunction with permission changes, updates to the encryption keys 1608, and so on. For example, it can be necessary for a first computing device 1602 to update its encryption key 1608 on a periodic basis, in response to a compromising event, and so on. When this occurs, the first computing device 1602 can generate and provide an updated encryption key 1608 to the encryption key exchange server 1622 with a request to replace a corresponding old encryption key 1608 with the updated encryption key 1608. In turn, the encryption key exchange server 1622 can identify second computing devices 1602 that store the old encryption key 1608, and provide the updated encryption key 1608 to the second computing devices 1602. In this manner, the second computing devices 1602 can remain capable of identifying when the first computing device 1602 is in proximity.

Additionally, it is noted that the encryption key exchange server 1622 can be configured to cause first computing devices 1602 (of a first user) to delete known encryption keys 1608 associated with second computing devices 1602 (of a second user) when the second user deauthorizes the first user from having permission to identify when the second user is in proximity. For example, when a user associated with a family account is removed from the family account, the remaining users on the family account should no longer be authorized to identify when the user is in proximity. Accordingly, to implement these changes, the encryption key exchange server 1622 can be configured to cause the computing devices 1602 belonging to the remaining users on the family account to delete the encryption keys 1608 associated with the computing devices 1602 belonging to the user being removed from the family account.

Figure 16C:
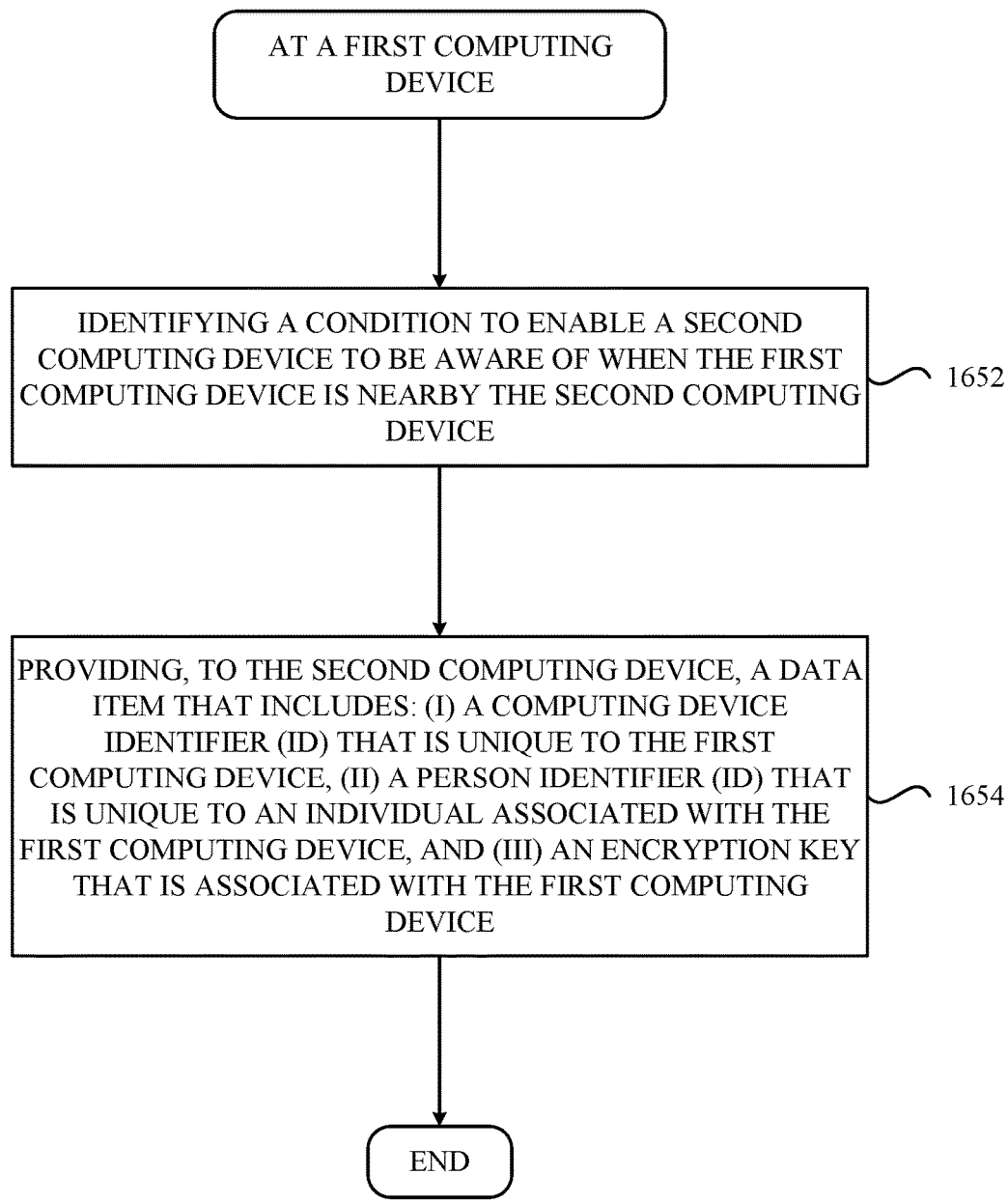
FIG. 16C illustrates a method for enabling computing devices to directly exchange encryption keys with one another, according to some embodiments.

Accordingly, FIG. 16B sets forth a server-centric technique for enabling computing devices 1602 to exchange encryption keys 1608 with one another. However, as previously noted herein, the computing devices 1602 can also be capable of sharing encryption keys 1608 without the involvement of the encryption key exchange server 1622. In this regard, FIG. 16C illustrates a method 1650 for enabling computing devices 1602 to directly exchange encryption keys 1608 with one another, according to some embodiments. As shown in FIG. 16C, the method 1650 begins at step 1652, where the first computing device 1602 identifies a condition—e.g., the conditions described above in conjunction with FIG. 16B—to enable a second computing device 1602 to be aware of when the first computing device 1602 is nearby the second computing device 1602. At step 1654, the first computing device 1602 provides, to the second computing device 1602, a data item that includes: (i) a computing device ID 1606 that is unique to the first computing device 1602, (ii) a person ID 1616 that is unique to an individual associated with the first computing device 1602, and (iii) an encryption key 1608 that is associated with the first computing device 1602. In turn, and as described herein, the second computing device 1602 can save the various components of the data item so that the second computing device 1602 becomes capable of detecting the proximity of the first computing device 1602.

It is noted that the first computing device 1602 can be configured to provide the data item to the second computing device 1602 using any known method of transmitting data without departing from the scope of this disclosure. For example, the first/second computing devices 1602 can utilize Bluetooth, Near Field Communication (NFC), WiFi, Ultra-wideband (UWB), and/or cellular, without departing from the scope of this disclosure.

Accordingly, FIGS. 16B-16C provide a detailed explanation of the manner in which encryption keys 1608 can be exchanged between the computing devices 1602 by way of the encryption key exchange server 1622, according to some embodiments. Additionally, a more detailed explanation of the manner in which advertisement packets 1620 can be transmitted and analyzed will now be described below in conjunction with FIGS. 17A-17B.

Figure 17A:
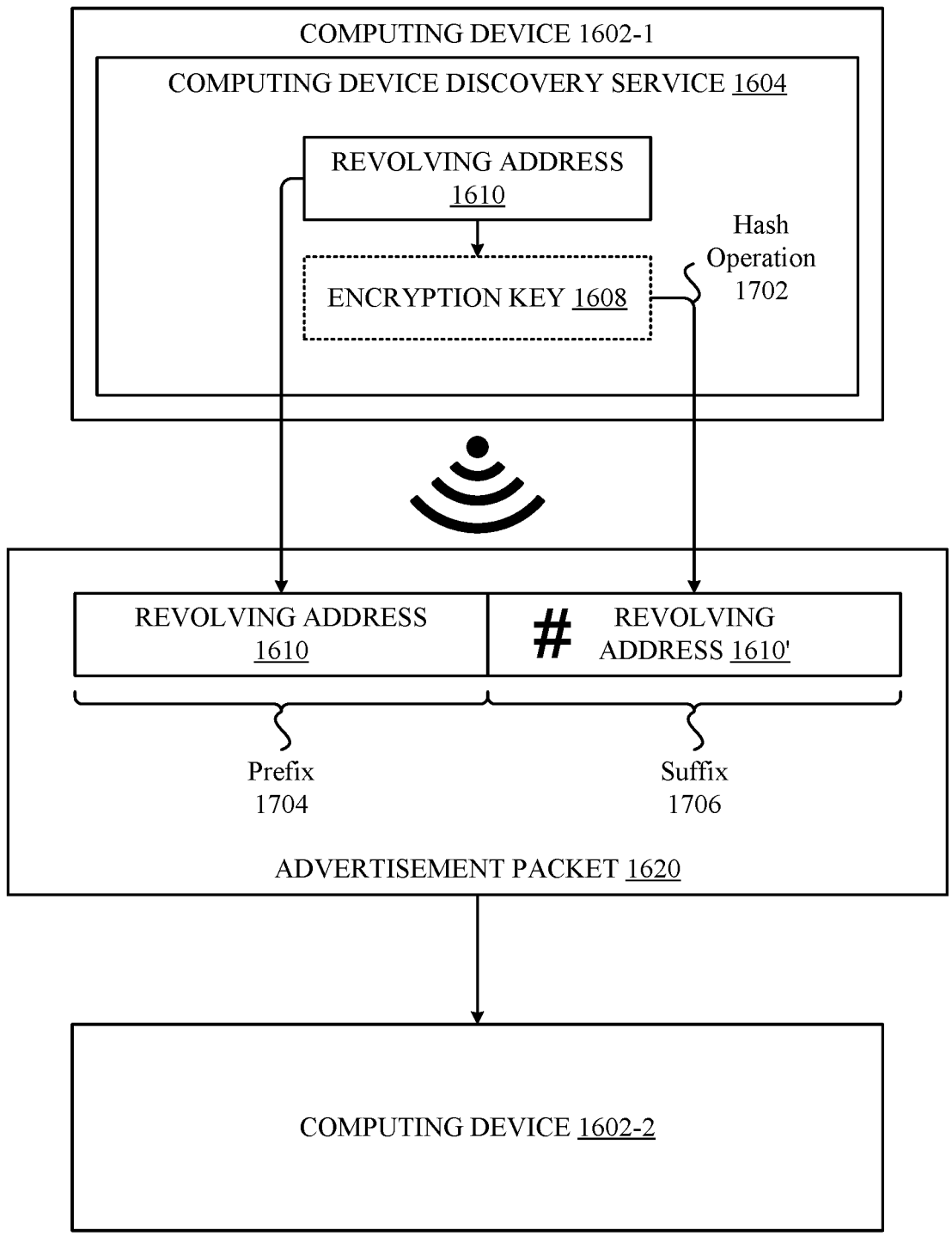
FIG. 17A illustrates a conceptual diagram of a computing device transmitting an advertisement packet, according to some embodiments.

FIG. 17A illustrates a conceptual diagram 1700 of a computing device 1602-1 transmitting an advertisement packet 1620, according to some embodiments. As shown in FIG. 17A, the computing device 1602-1 can utilize its encryption key 1608 and revolving address 1610 to generate the advertisement packet 1620. In particular, the computing device 1602-1 can utilize its encryption key 1608 to perform a hash operation 1702 on the revolving address 1610 to generate a suffix 1706. According to some embodiments, the suffix 1706 can represent all or a portion of the value produced by the hash operation 1702, e.g., the first three (3) bytes of the value produced by the hash operation 1702. In any case, the suffix 1706 can be combined with a prefix 1704—i.e., the revolving address 1610—to form the advertisement packet 1620, which can be received and analyzed by any nearby computing devices 1602 that are capable of detecting the advertisement packet 1620 (e.g., a computing device 1602-2). It is noted that the information included in the advertisement packet 1620 illustrated in FIG. 17A is exemplary and that other variations can be implemented without departing from the scope of this disclosure. For example, the prefix 1704 and the suffix 1706 can be reversed. In another example, when the revolving address 1610 represents a current network address associated with the computing device 1602-1, the prefix 1704 can be omitted, as the advertisement packet 1620 will include the revolving address 1610 in another field of the advertisement packet 1620.

According to some embodiments, the computing device 1602-2 can be configured to verify that the advertisement packet 1620 satisfies at least one condition prior to analyzing the advertisement packet 1620. For example, the computing device 1602-2 can (1) verify that the advertisement packet 1620 is received with a signal strength that satisfies a threshold, and/or (2) verify the overall completeness of the advertisement packet 1620. For example, the computing device 1602-2 can disregard advertisement packets 1620 that are received with a low signal strength and/or fragmented, as such advertisement packets 1620 indicate that a proximity of the computing device 1602 transmitting the advertisement packets 1620 should not yet be analyzed.

Additionally, it is noted that the computing device 1602-1 can be configured to transmit the advertisement packets 1620 in accordance with any approach without departing from the scope of this disclosure. In particular, the computing device 1602-1 can be configured to generate and transmit an advertisement packet 1620 in accordance with a fixed periodic rate, one or more conditions being satisfied, and so on. For example, the computing device 1602-1 can transmit an advertisement packet 1620 every second as long as a battery level of the computing device 1602-1 satisfies a threshold. In another example, the computing device 1602-1 can be configured to cease transmission of advertisement packets 1620 when a privacy mode is engaged, e.g., when the computing device 1602-1 is within a geographical boundary, when the computing device 1602-1 is operating in a particular mode (e.g., active phone call), and so on.

Additionally, it is noted that the computing device 1602-1 can adjust the manner in which advertisement packets 1620 are transmitted to achieve an effective boundary at which other computing devices 1602 are able to detect the computing device 1602-1. For example, the computing device 1602-1 can vary a power level at which the advertisement packets 1620 are transmitted in accordance with a desired proximity threshold, the type of communications interface being used to transmit the advertisement packets 1620, and so on.

In any case, when the computing device 1602-2 receives the advertisement packet 1620, and the advertisement packet 1620 satisfies the foregoing conditions, the computing device 1602-2 can begin analyzing the advertisement packet 1620 to identify whether the advertisement packet 1620 is transmitted by a computing device 1602 that is known to the computing device 1602-2. According to some embodiments, this can involve the computing device 1602-2, for each of its known encryption keys 1608: (1) performing the same hash operation 1702 on the prefix 1704 of the advertisement packet 1620, and (2) comparing the value produced by the hash operation 1702 to determine whether the value matches the suffix 1706 of the advertisement packet 1620.

According to some embodiments, the computing device 1602-2 can prioritize the manner in which the different known encryption keys 1608 managed by the computing device 1602-2 are applied against the advertisement packet 1620. For example, the known encryption keys 1608 associated the computing devices 1602 with which the computing device 1602-2 most frequently comes into contact can be accessed in a prioritized manner to reduce the overall amount of time/work that might otherwise take place when attempting to authenticate the advertisement packets 1620 in a random or standard order. In another example, the encryption keys 1608 that are associated with important individuals can be prioritized. It is noted that the foregoing examples are not meant to be limiting, and that the encryption keys 1608 can be prioritized using any approach without departing from the scope of this disclosure.

In any case, when a known encryption key 1608 that produces a match is found, the computing device 1602-2 identifies a computing device ID 1606 that corresponds to the known encryption key 1608. In turn, the computing device 1602-2 can utilize the computing device ID 1606 to identify a corresponding person ID 1616. Subsequently, the computing device 1602-2 can utilize the person ID 1616 to identify an action profile 1619—if any—that corresponds to the person ID 1616, and proceed in accordance with the action profile 1619. This can involve, for example, identifying actions defined in the action profile 1619 that should be carried out when a proximity "start" event occurs in association with the computing device 1602-1.

Additionally, and although not illustrated in FIG. 17A, the computing device 1602-2 can be configured to monitor whether the computing device 1602-1 continues to remain in proximity to the computing device 1602-2, e.g., by analyzing additional advertisement packets 1620 transmitted by the computing device 1602-1, by periodically pinging the computing device 1602-1 through a communications channel formed after the proximity start event, and so on. In this regard, when the computing device 1602-2 identifies that the computing device 1602-1 no longer satisfies the physical proximity threshold relative to the computing device 1602-2, the computing device 1602-2 can deactivate the respective action profile 1619 at the computing device 1602-2. This can involve, for example, identifying actions defined in the action profile 1619 that should be carried out when a proximity "end" event occurs in association with the computing device 1602-1.

Accordingly, FIG. 17A sets forth a manner in which the computing devices 1602 can transmit and analyze advertisement packets 1620 in accordance with the techniques set forth herein, according to some embodiments. A more detailed explanation of the manner in which the computing devices 1602 can transmit and analyze advertisement packets 1620 will now be described below in greater detail in conjunction with FIG. 17B.

Figure 17B:
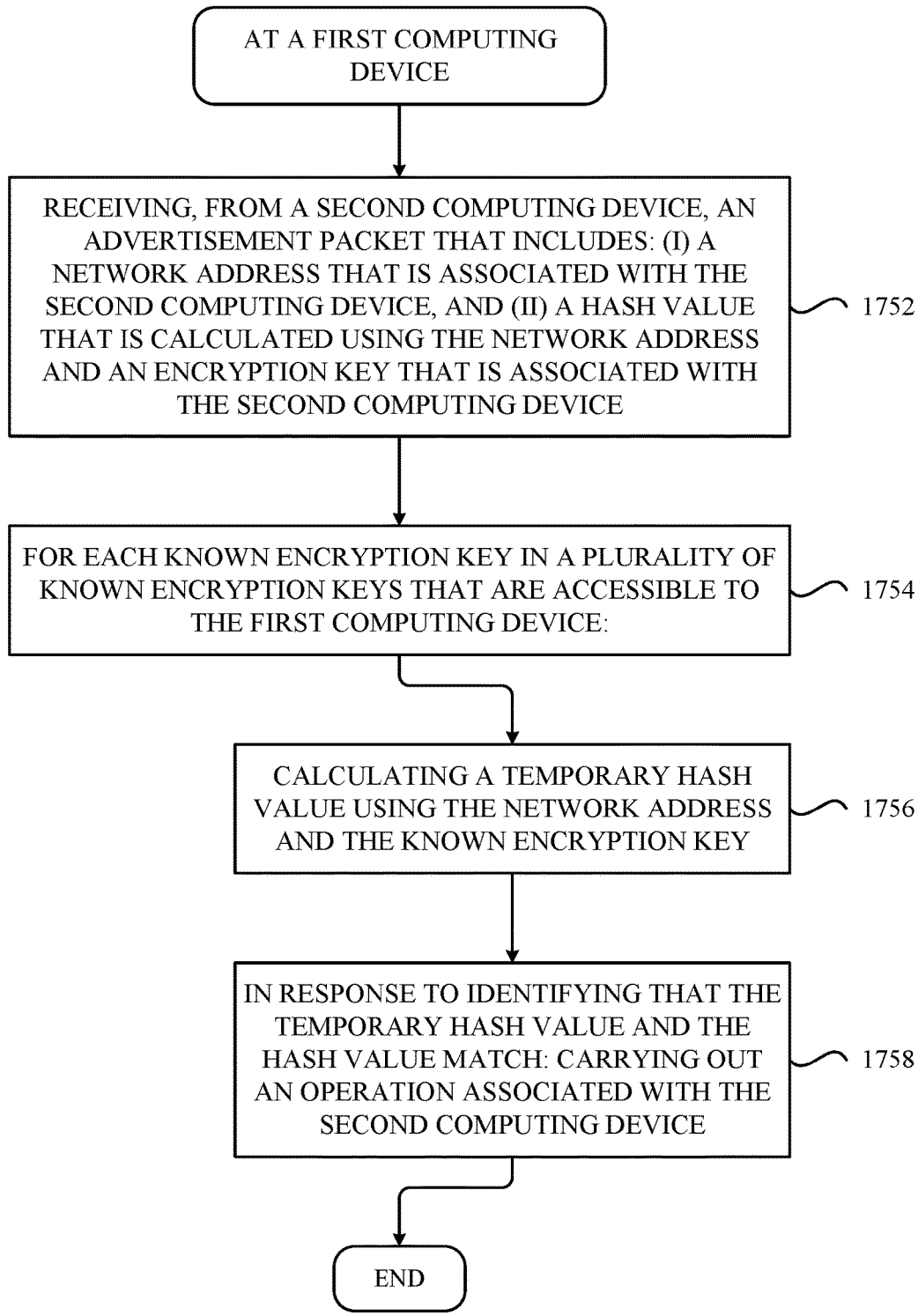
FIG. 17B illustrates a method for transmitting and analyzing advertisement packets, according to some embodiments.

FIG. 17B illustrates a method 1750 for transmitting and analyzing advertisement packets 1620, according to some embodiments. As shown in FIG. 17B, the method 1750 begins at step 1752, where the first computing device 1602 receives, from a second computing device 1602, an advertisement packet 1620 that includes: (i) a network address (e.g., a revolving address 1610) that is associated with the second computing device 1602, and (ii) a hash value that is calculated using the revolving address 1610 and an encryption key 1608 that is associated with the second computing device 1602 (e.g., as described above in conjunction with FIG. 17A). At step 1754, the first computing device 1602 executes steps 1756-1758 for each known encryption key 1608 in a plurality of known encryption keys 1608 that are accessible to the first computing device 1602. In particular, at step 1756, the first computing device 1602 calculates a temporary hash value using the revolving address 1610 and the known encryption key 1608 (e.g., as also described above in conjunction with FIG. 17A). At step 1758, the first computing device 1602, in response to identifying that the temporary hash value and the hash value match: carries out an operation associated with the second computing device 1602 (e.g., as also described above in conjunction with FIG. 17A).

Figure 18:
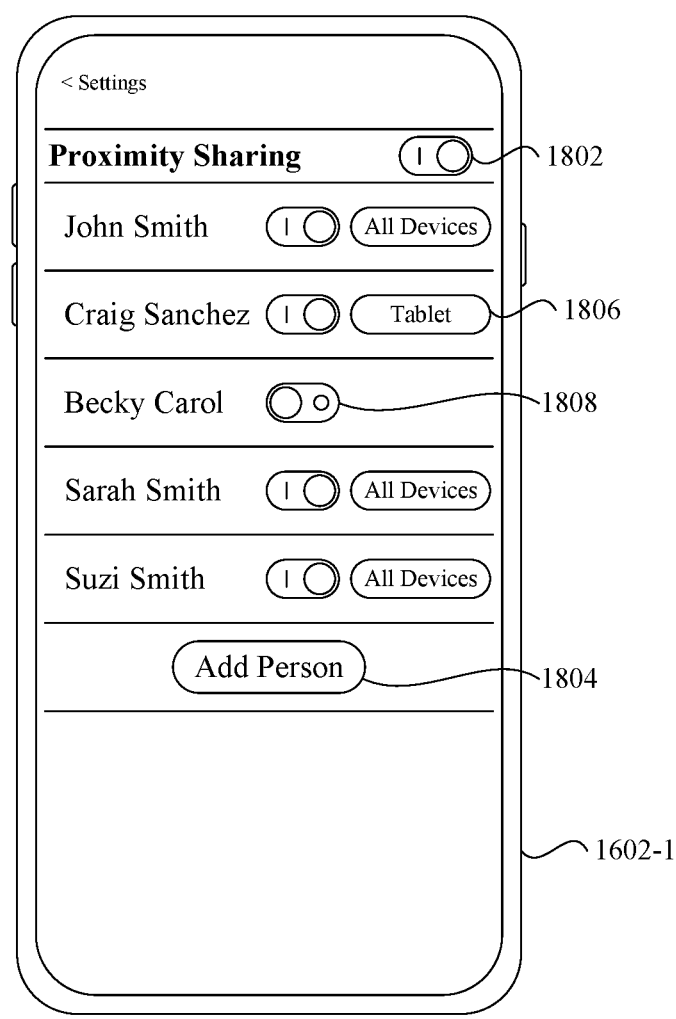
FIG. 18 provides an illustration of an example user interface that can be utilized to adjust the manner in which users can authorize other users to be aware of their proximities to one another, according to some embodiments.

Accordingly, FIGS. 17A-17B provide a detailed explanation of the manner in which advertisement packets 1620 can be transmitted and analyzed, according to some embodiments. Additionally, FIG. 18 provides an illustration of an example user interface 1800 that can be utilized to adjust the manner in which users can authorize other users to be aware of their proximities to one another, according to some embodiments. As shown in FIG. 18, the example user interface 1800—which can be displayed on a computing device 1602-1—can include a toggle switch 1802 that toggles whether any individuals (at all) are permitted to identify when a user of the computing device 1602-1 is in proximity to them. As illustrated in FIG. 18, when the toggle switch 1802 is activated, different people can be added using a button 1804, and authorization for existing people can be toggled off and on using respective toggle buttons 1808.

Additionally, the user interface 1800 can include respective buttons 1806 for each individual that enable the user to specify particular ones of his or her computing devices 1602 that the computing devices 1602 of the individual are permitted to detect. For example, in FIG. 18, John Smith is permitted to be aware of when all computing devices 1602—including the computing device 1602-1—are in proximity of John Smith's computing devices 1602. In another example, Craig Sanchez is only permitted to be aware of when a tablet device of the user (e.g., a computing device 1602-2) is in proximity of Craig Sanchez's computing devices 1602. It is noted that finer-granularity levels of control can be provided without departing from the scope of this disclosure. For example, the user interface can also enable the user of the computing device 1602-1 to select specific computing devices 1602 belonging to John Smith—e.g., only John Smith's mobile device—that are authorized to identify when selected computing devices 1602 belonging to the user of the computing device 1602-1 are in proximity. In some embodiments, this can involve requesting permission to view a list of the computing devices 1602 belonging to John Smith, where, in turn, the user can select specific ones of the computing devices 1602 belonging to John Smith that are authorized to detect the presence of selected computing devices 1602 belonging to the user of the computing device 1602-1.

Although not illustrated in FIG. 18, it should be understood that additional user interface controls can be incorporated into the example user interface to further-enable the management of people and their assigned permissions. For example, a user can swipe left on any user element that represents a person to expose a button that enables the person to be deleted.

Figure 19:
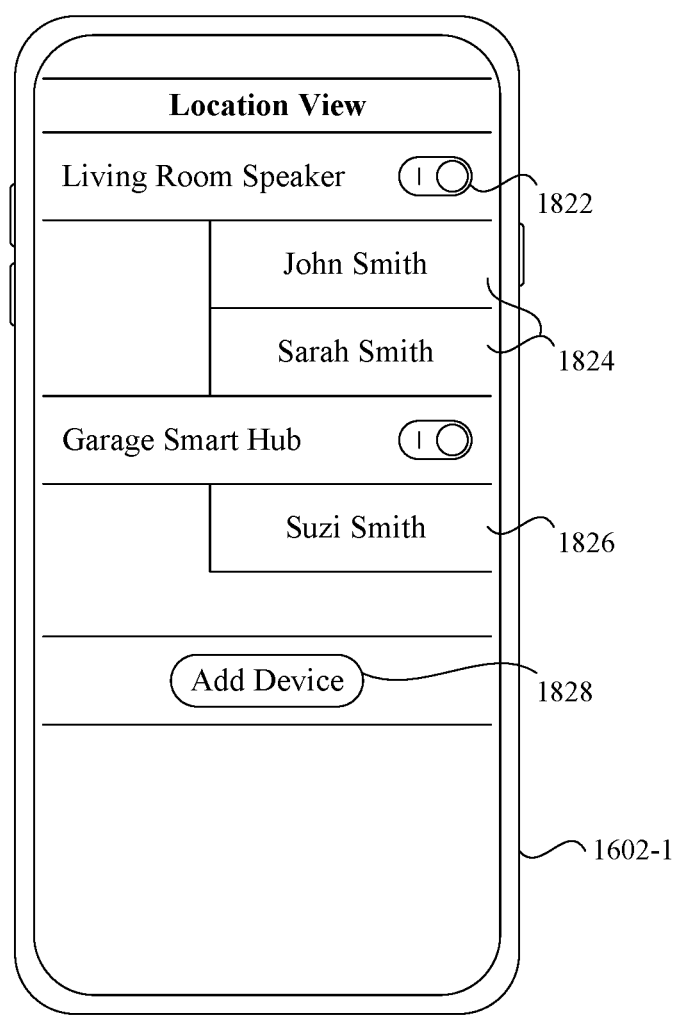
FIG. 19 provides an illustration of an example user interface that can be utilized to identify approximate locations of users based on their proximity to known computing devices, according to some embodiments.

Additionally, FIG. 19 provides an illustration of an example user interface 1820 that can be utilized to identify approximate locations of users based on their proximity to known computing devices 1602, according to some embodiments. As shown in FIG. 19, the example user interface 1820—which can be displayed on a computing device 1602-1—can include respective toggle switches 1822 for computing devices 1602 that are known to the computing device 1602-1. According to some embodiments, the computing devices 1602 listed in the user interface 1820 can be filtered to include those that are largely immobile—e.g., electronic peripheral devices including smart speakers, smart hubs, and the like—such that a generalized location of other computing devices 1602 that are in proximity to those computing devices 1602 can be understood. It is noted, however, that any computing device 1602 with which the computing device 1602-1 is associated and is authorized to interact can be listed in the user interface 1820.

According to some embodiments, when the toggle switch 1822 for a known computing device 1602 is switched to an active position, the computing device 1602-1 can be configured to display individuals who are associated with computing devices 1602 and are in proximity to the known computing device 1602. For example, as shown in FIG. 19, the individuals "John Smith" and "Sarah Smith" are in proximity to the computing device 1602 "Living Room Speaker", which is reflected within the user interface 1820 by user interface elements 1824. As also shown in FIG. 19, the individual "Suzi Smith" is in proximity to the computing device 1602 "Garage Smart Hub", which is reflected within the user interface 1820 by the user interface element 1826. Additional computing devices 1602 can be added to the user interface 1820 using the button 1828.

Additionally, it is noted that the permission/authorization techniques described herein can be implemented to ensure that the user interface 1820 only displays information about individuals who have authorized the computing device 1602-1 (and the owner/user thereof) to know about their location. For example, within the context of FIG. 19, the computing device 1602-1 (and the owner/user thereof) has been permitted by John Smith, Sarah Smith, and Suzi Smith to identify when those individuals are not just in proximity to the computing device 1602-1—but are also in proximity to other computing devices 1602 with which the computing device 1602-1 is associated, including the living room speaker and the garage smart hub. In this regard, when the computing device 1602-1 is authorized to detect when John, Sarah, and Suzi Smith are in proximity to the computing device 1602-1, the computing device 1602-1 can obtain the encryption keys 1608 associated with the computing devices 1602 associated with those individuals. In turn, the computing device 1602-1 can forward the encryption keys 1608 to the computing devices 1602 associated with the computing device 1602-1—i.e., the living room speaker and the garage smart hub—such that those devices are capable of detecting when John, Sarah, and Suzi Smith are in proximity to the living room speaker and the garage smart hub.

It is additionally noted that although the embodiments set forth herein generally discuss the sharing of WiFi information, the various computing devices described herein can be configured to share any form of information between one another—e.g., contact information, photos, videos, documents, files, etc.—without departing from the scope of this disclosure.

The embodiments set forth herein include an additional technique for filtering nearby/known computing devices based on an orientation of a computing device relative to the other computing devices, according to some embodiments. It is noted that the computing device can utilize any of the discovery techniques set forth herein to enable the computing device to identify one or more computing devices (if any) that are nearby and known to the computing device. In turn, the computing device can filter the one or more computing devices based on an orientation of the computing device relative to the one or more computing devices. It is noted that a computing device can be configured to include any hardware—e.g., Ultra-wideband (UWB) components that enables the computing device to identify its orientation relative to other computing devices. However, is noted that the use of UWB hardware is merely exemplary, and that any other hardware components (and/or combinations thereof) can be utilized to enable the computing device to make the same (or similar) orientation-based determinations.

In any case, a first step of an example scenario of orientation-based filtering can involve a computing device discovering that five different computing devices are nearby and known to the computing device—e.g., computing devices belonging to Sarah Green, Herbert Williams, Ingrid Solomund, Rebecca Vortune, and Alyssa Ternola. As a brief aside, it should be understood that the foregoing users have "opted-in" to participate in the proximity-based features described herein. Additionally, it should be understood that users can easily opt-in or opt-out of any of the features described herein without departing from the scope of this disclosure. For example, a user interface can prompt a first user and a second user to consent to the first user and/or second user being notified when any computing devices associated with the respective first and second users enter into proximity to one another. In turn, the first user and/or the second user can opt-out of this capability so that the proximity-based features will not be triggered when the computing devices associated with the respective first and second users enter into proximity to one another.

In any case, when the aforementioned computing device discovers the five different computing devices, the computing device can generate a user interface that enables a user of the computing device to observe a list of the nearby users. According to some embodiments, the user interface can include a user interface element that, when selected, causes the computing device to filter the list of the nearby users based on a direction in which the computing device is pointed. In particular, the filter enables the list of nearby users to be actively updated based on the current direction in which the computing device is pointed relative to the computing devices of the nearby users. Additionally, the user interface can include a user interface element that, when selected, causes the computing device to perform a particular action in association with at least one of the nearby users, e.g., sharing one or more files with the nearby users, sending an email to the nearby users, and the like.

According to some embodiments, a second step can involve the computing device updating the user interface in response to the user selecting the option to filter based on the orientation of the computing device. In one example, the computing device is oriented toward the computing device belonging to Ingrid Solomund, and the list of nearby users is correspondingly updated to include only Ingrid Solomund. At this juncture, the user of the computing device has the option to select Ingrid Solumund via a user interface element, and subsequently cause the computing device to perform a particular action in association with Ingrid Solomund through the selection of another user interface element.

As a brief aside, it is noted that various settings can be adjusted to provide orientation-based functionality that is intuitive and sensible. In one example, the overall directional scope can be expanded to decrease the overall sensitivity of the orientation of the computing device relative to the other computing devices. Conversely, the overall directional scope can be narrowed to increase the overall sensitivity of the orientation of the computing device relative to the other computing devices. In another example, a distance threshold can be increased to enable the computing device to identify additional computing devices that might otherwise be ignored by the computing device. Conversely, the distance threshold can be decreased to prevent the computing device from detecting computing devices that are considered to be too far away to be of interest. It is noted that such configurations are merely exemplary, and that any other configurations related to the computing devices and their orientations to one another can be adjusted without departing from the scope of this disclosure.

At the conclusion of the second step, the user chooses to not perform any action associated with Ingrid Solomund, and instead reorients the computing device toward other individuals. This notion is captured in a third step, where the computing device is newly-oriented toward the computing devices of Rebecca Vortune and Alyssa Ternola. At this juncture, the user of the computing device has the option to select Rebecca Vortune and/or Alyssa Ternola via user interface elements, and subsequently cause the computing device to perform a particular action in association with these individuals through the selection of another user interface element. In turn, at a fourth step, the user of the computing device selects both Rebecca Vortune and Alyssa Ternola via user interface elements. Subsequently, the computing device can perform an action associated with these individuals in response to the user selecting a user interface element (e.g., transferring files, sending an email, etc.).

Accordingly, the foregoing techniques illustrate an example scenario in which nearby/known computing devices can be filtered based on an orientation of a computing device relative to the other computing devices, according to some embodiments.

Figure 20A:
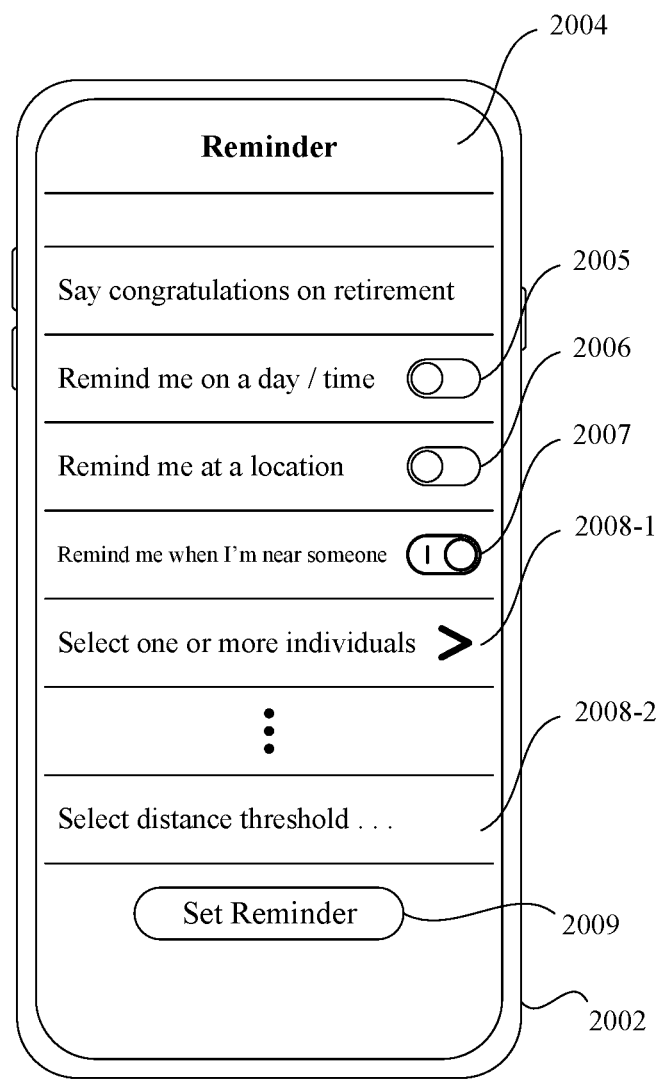
FIGS. 20A-20C illustrate a sequence diagram of a technique for triggering a reminder on a computing device when one or more computing devices of a particular user are in proximity to the computing device, according to some embodiments.
Figure 20B:
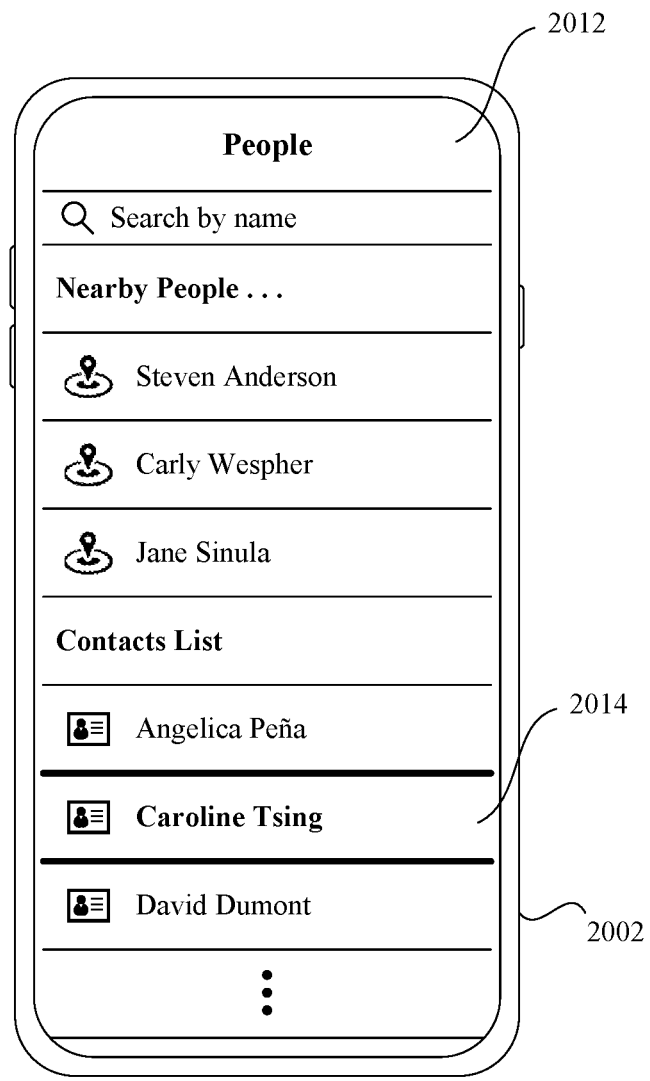
Figure 20C:
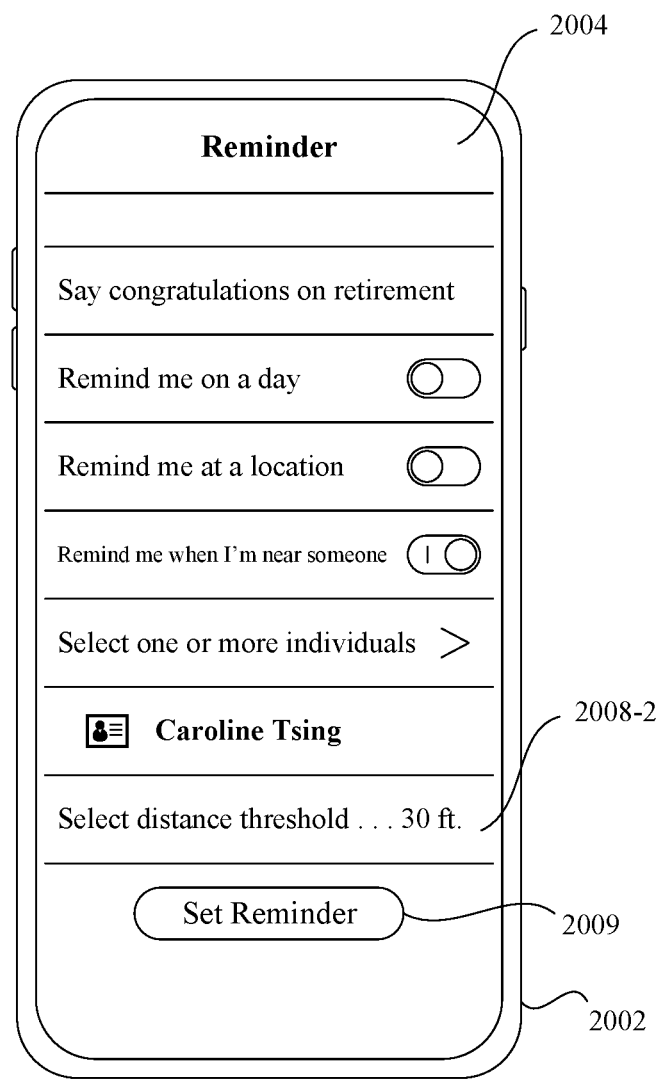

FIGS. 20A-20C illustrate a sequence diagram of a technique for triggering a reminder on a computing device when one or more computing devices of a particular user are in proximity to the computing device, according to some embodiments. As shown in FIG. 20A, a first step 2000 can involve a computing device 2002 displaying a user interface 2004 that enables parameters for a reminder to be input to the computing device 2002. According to some embodiments, the user interface 2004 can include a subject field for the reminder—which, as shown in FIG. 20A, has been assigned the string value "Say congratulations on retirement". Additionally, the user interface 2004 can include a user interface element 2005 that enables the reminder to be triggered based on the satisfaction of a temporal condition, i.e., based on a date and time. Moreover, the user interface 2004 can include a user interface element 2006 that enables the reminder to be triggered based on the satisfaction of a geographical proximity condition, i.e., based on the computing device 2002 arriving at a particular area (e.g., a work location, a home location, a particular address, etc.). Additionally, the user interface 2004 can include a user interface element 2007 that enables the reminder to be triggered when the computing device 2002 comes into proximity of a nearby computing device belonging to a particular user. Additionally, the user interface 2004 can include a user interface element 2009 to set the reminder when all relevant parameters for the reminder have been established.

As shown in FIG. 20A, the user interface element 2007 is selected, which causes additional user interface elements to be displayed within the user interface 2004. In particular, the additional user interface elements include a user interface element 2008-1 that enables one or more individuals to be selected, as well as a user interface element 2008-2 that enables a distance threshold to be established. Accordingly, a second step 2010 illustrated in FIG. 20B involves the computing device 2002 displaying a user interface 2012 in response to a selection of the user interface element 2008-1, which enables the selection of one or more individuals. As shown in FIG. 20B, the user interface 2012 can enable a user to search for individuals by name (e.g., in an address book that is accessible to the computing device 2002). Additionally, the user interface 2012 can display a list of nearby people, which can be determined by the computing device 2002 in accordance with the discovery techniques set forth herein. Additionally, the user interface 2012 can display a list of contacts (e.g., those included in the aforementioned address book). It is noted that the user interface 2012 is merely exemplary and should not be construed as limiting in any fashion. On the contrary, the user interface 2012 can include additional contacts organized in any manner for selection, e.g., groups of contacts organized based on categories (e.g., "work team", "family", etc.).

In any case, the second step 2010 involves a selection 2014 of Caroline Tsing, which causes a third step 2020 to be executed, which is illustrated in FIG. 20C. As shown in FIG. 20C, the user interface 2004 is displayed and updated to reflect that Caroline Tsing has been selected as the individual, such that any proximity to Caroline Tsing—specifically, any proximity between the computing device 2002 (or associated computing device) and any computing device associated with Caroline Tsing—should trigger the reminder at the computing device 2002 (or associated computing device). Additionally, and as shown in FIG. 20C, a distance threshold of thirty feet is associated with the reminder via the user interface element 2008-2. It is noted that this distance threshold is exemplary and that any other distance threshold at any level of granularity can be established without departing from the scope of this disclosure.

Finally, at the conclusion of the third step 2020 in FIG. 20C, the reminder is set via the user interface element 2009. Thereafter, the computing device 2002 (or associated computing device) will trigger the reminder when any computing device associated with Caroline Tsing comes within thirty feet of the computing device 2002 (or associated computing device).

Figure 21:
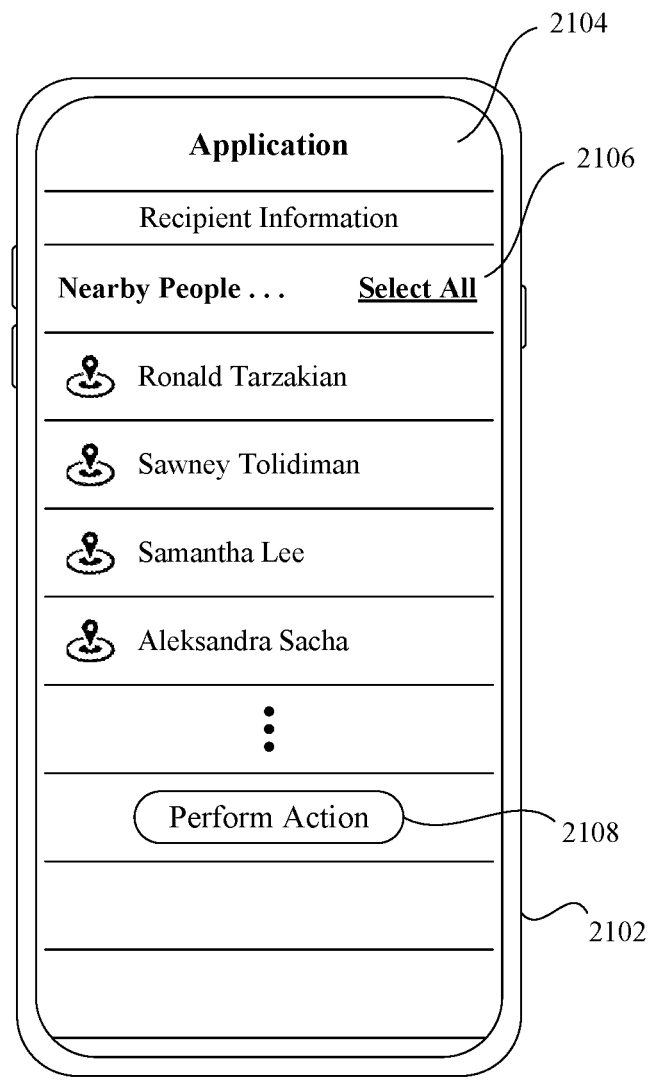
FIG. 21 illustrates a conceptual diagram of a technique for grouping nearby computing devices for selection, according to some embodiments.

Additionally, FIG. 21 illustrates a conceptual diagram 2100 of a technique for grouping nearby computing devices for selection, according to some embodiments. As shown in FIG. 21, a computing device 2102 can generate a user interface 2104 that displays a list of nearby people, which can be determined by the computing device 2102 in accordance with the discovery techniques set forth herein. As also shown in FIG. 21, the user interface 2104 can include a user interface element 2106 to select all of the nearby people that are displayed within the user interface 2104. This can be useful, for example, when a user of the computing device 2102 meets with family, friends, co-workers, etc., and would like to perform some action (via the user interface element 2108) in association with those individuals (e.g., share one or more files with the individuals, send an email to the individuals, and the like).

It is noted that additional grouping techniques can be implemented within the user interface 2104 without departing from the scope of this disclosure. In particular, the nearby people can be filtered into two or more sub-groups based on commonalities. For example, an individual may attend a work event with her family and her co-workers, such that the user interface 2104 displays (1) her nearby family members, and (2) her nearby co-workers. In this scenario, the user interface 2104 can display the nearby family members in a sub-group with a first respective "Select All" option and can also display the nearby co-workers in a sub-group with a second respective "Select All" option. In this regard, the individual can easily share information with relevant individuals, e.g., family pictures with all nearby family members, and co-worker pictures with all nearby co-workers.

Additionally, it is noted that the various hardware components described herein—e.g., the Bluetooth, Near Field Communication (NFC), WiFi, Ultra-wideband (UWB), and/or cellular components—can be configured to implement the various discovery techniques in a partial or complete manner without departing from the scope of this disclosure. For example, any of the aforementioned components can be configured to implement the techniques independent of the central processing unit(s) included in the computing device. Such a configuration can enable the computing device to remain in low-power mode (e.g., a locked/sleep state) while continuing to enable the discovery techniques to function. This approach can lead to considerable power savings in that the central processing unit(s) can remain in a low-power state for as long as possible, and subsequently transition into a higher-power state when appropriate. For example, one or more of the radio components can cause the central processing unit(s) to enter into a higher-power state when the one or more radio components determine that a nearby/known computing device is present. In turn, the central processing units(s) can determine whether any actions need to be taken—e.g., displaying a reminder that is linked to the proximity of the nearby/known computing device—and perform the actions. Subsequently, the central processing unit(s) can return to a low-power state (when appropriate), whereupon the radio components can continue providing the discovery capabilities described herein.

As described above, one aspect of the present technology is the gathering and use of data available from various sources to improve the operational efficiency of computing devices. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve the operational efficiency of computing devices. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, the operational efficiency of computing devices can be improved based on non-personal information data or a bare minimum amount of personal information, other non-personal information available, or publicly available information.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

We claim:

1. A method for securely identifying relevant computing devices that are nearby, the method comprising, at a first computing device that manages a plurality of known encryption keys:
    receiving, from a second computing device, an advertisement packet that includes:
        (i) a network address that is associated with the second computing device, and
        (ii) a hash value that is calculated using the network address and an encryption key that is associated with the second computing device;
    calculating one or more respective temporary hash values using the network address and the plurality of known encryption keys; and
    in response to identifying that a respective temporary hash value of the one or more respective temporary hash values matches the hash value:
        carrying out an operation associated with the second computing device.

2. The method of claim 1, wherein each known encryption key in the plurality of known encryption keys is an encryption key that is associated with a respective computing device, and each known encryption key is associated with a computing device identifier (ID) that is unique to the respective computing device.

3. The method of claim 2, wherein each computing device ID is associated with a person identifier (ID) that is unique to a particular individual.

4. The method of claim 3, wherein each known encryption key of the plurality of known encryption keys is associated with a priority value that is initially based on a relationship type between an individual associated with the first computing device and the particular individual that is linked to the known encryption key.

5. The method of claim 4, further comprising, in response to identifying that the temporary hash value and the hash value match:
updating an ordering of the plurality of known encryption keys to cause the known encryption key used to calculate the temporary hash value to be prioritized when generating other temporary hash values in response to receiving other advertisement packets.

6. The method of claim 1, further comprising:
adding the network address into a cache to indicate that the second computing device has been identified by the first computing device, wherein the network address is removed from the cache:
after a threshold period of inactivity is satisfied, and/or
an updated encryption key is received as a replacement for the encryption key that is associated with the second computing device.

7. The method of claim 6, further comprising:
receiving, from the second computing device, a supplemental advertisement packet that includes:
(i) the network address associated with the second computing device, and
(ii) the hash value that is calculated using the network address and the encryption key that is associated with the second computing device; and
in response to determining that the network address is included in the cache:
carrying out the operation associated with the second computing device.

8. The method of claim 6, wherein updating the encryption key that is associated with the second computing device comprises:
receiving the updated encryption key;
removing, from the plurality of known encryption keys, the known encryption key that corresponds to encryption key that is associated with the second computing device; and
adding the updated encryption key as a new known encryption key into the plurality of known encryption keys.

9. The method of claim 1, wherein the network address is periodically updated based on a threshold amount of time.

10. The method of claim 1, wherein the advertisement packet is transmitted using Bluetooth technology, and the encryption key that is associated with the second computing device is distinct from an identity resolving key (IRK) utilized by Bluetooth hardware included in the second computing device.

11. A method for enabling computing devices to exchange encryption keys with one another by way of a server computing device, the method comprising, at the server computing device:
receiving, from a first computing device, a data item that includes:
(i) a computing device identifier (ID) that is unique to the first computing device,
(ii) a person identifier (ID) that is unique to an individual associated with the first computing device, and
(iii) an encryption key that is associated with the first computing device;
identifying, based one or more of the computing device ID or the person ID, at least one computing device that is relevant to the first computing device; and
providing the data item to the at least one computing device, wherein the at least one computing device stores the encryption key as a known encryption key that is linked to the computing device ID and the person ID.

12. The method of claim 11, wherein the individual associated with the first computing device is also associated with the at least one computing device.

13. The method of claim 11, further comprising, prior to receiving the data item from the first computing device:
identifying (i) that the individual associated with the first computing device is part of a family account, and (ii) that an individual associated with the at least one computing device is also part of the family account; and
issuing a request to the first computing device to provide the data item.

14. The method of claim 13, further comprising, subsequent to providing the data item to the at least one computing device:
receiving an indication that the individual associated with the first computing device is no longer part of the family account; and
causing the at least one computing device to delete all information established in response to receiving the data item.

15. The method of claim 11, further comprising, subsequent to providing the data item to the at least one computing device:
receiving, from the first computing device, an updated data item that includes:
(i) the computing device ID that is unique to the first computing device,
(ii) the person ID that is unique to the individual associated with the first computing device, and
(iii) an updated encryption key that is associated with the first computing device;
identifying, based one or more of the computing device ID or the person ID, that the at least one computing device is relevant to the first computing device; and
providing the data item to the at least one computing device, wherein the at least one computing device replaces the encryption key with the updated encryption key as a known encryption key that is linked to the computing device ID and the person ID.

16. The method of claim 11, wherein identifying at least one computing device that is relevant to the first computing device is further based on one or more of:
a frequency at which interactions take place between the individual associated with the first computing device and an individual associated with the at least one computing device, wherein the interactions include one or more of phone calls, emails, text messages, chats, or appointments; or
whether the first computing device has permitted the at least one computing device to access a geographical location of the first computing device.

17. A method for enabling computing devices to directly exchange encryption keys with one another, the method comprising, at a first computing device:
- identifying a condition to enable a second computing device to be aware of when the first computing device is nearby the second computing device;
- providing, to the second computing device, a data item that includes:
  - (i) a computing device identifier (ID) that is unique to the first computing device,
  - (ii) a person identifier (ID) that is unique to an individual associated with the first computing device, and
  - (iii) an encryption key that is associated with the first computing device; and
- periodically generating advertisement packets that include:
  - (i) a network address that is associated with the first computing device, and
  - (ii) a hash value that is calculated using the network address and the encryption key that is associated with the first computing device.

18. The method of claim 17, wherein the condition is triggered based on one or more of a frequency at which interactions take place between the individual associated with the first computing device and an individual associated with the second computing device, and the interactions include one or more of: phone calls, emails, text messages, chats, or appointments.

19. The method of claim 18, further comprising, prior to providing the data item to the second computing device:
- displaying, at the first computing device, and indication that the second computing device will become capable of identifying when the first computing device is nearby the second computing device; and
- receiving approval from a user of the first computing device.

20. The method of claim 17, wherein the data item further includes (iv) a public key that is associated with the first computing device, wherein the public key can be utilized by the second computing device to decrypt information that (i) is transmitted by the first computing device, and (ii) is encrypted using a counterpart private key of which the first computing device is in possession.

21. The method of claim 17, wherein the data item is associated with an expiration policy that causes the second computing device to delete all information associated with the data item when the expiration policy is satisfied.

22. The method of claim 17, wherein the first computing device and the second computing device communicate using one or more of the following communications technologies: Bluetooth, Near Field Communication (NFC), WiFi, Ultra-wideband (UWB), and/or cellular.

* * * * *